United States Patent [19]

Pelley

[11] Patent Number: 5,194,952
[45] Date of Patent: Mar. 16, 1993

[54] VIDEO PROCESSING SYSTEM HAVING IMPROVED TRANSITION CONTROL AND DISPLAY

[75] Inventor: Allan M. Pelley, Milpitas, Calif.

[73] Assignee: Abekas Video Systems, Inc., Redwood City, Calif.

[21] Appl. No.: 678,011

[22] Filed: Mar. 28, 1991

[51] Int. Cl.$^5$ .................... H04N 5/262; H04N 5/265
[52] U.S. Cl. .................................. 358/183; 358/182
[58] Field of Search ............... 358/160, 22, 181, 182, 358/183, 185

[56] References Cited

U.S. PATENT DOCUMENTS

| | | | |
|---|---|---|---|
| 4,121,253 | 10/1978 | McCoy | 358/182 X |
| 4,205,346 | 5/1980 | Ross | 358/182 X |
| 4,782,392 | 11/1988 | Haycock | 358/183 |
| 4,823,183 | 4/1989 | Jackson et al. | 358/183 |
| 4,916,540 | 4/1990 | Kosaka | 358/160 |
| 4,967,277 | 10/1990 | Chaplin | 358/183 |

*Primary Examiner*—Victor R. Kostak
*Assistant Examiner*—Mark R. Powell
*Attorney, Agent, or Firm*—Limbach & Limbach

[57] ABSTRACT

A digital video processing system can generate a linear input signal which is representative of a linear transition between video signals. The system can also generate a non-linear signal representative of a non-linear transition and display the non-linear signal. Finally, the system can receive the linear input signal and convert it into the non-linear signal.

4 Claims, 67 Drawing Sheets

Microfiche Appendix Included
(1576 Microfiche, 20 Pages)

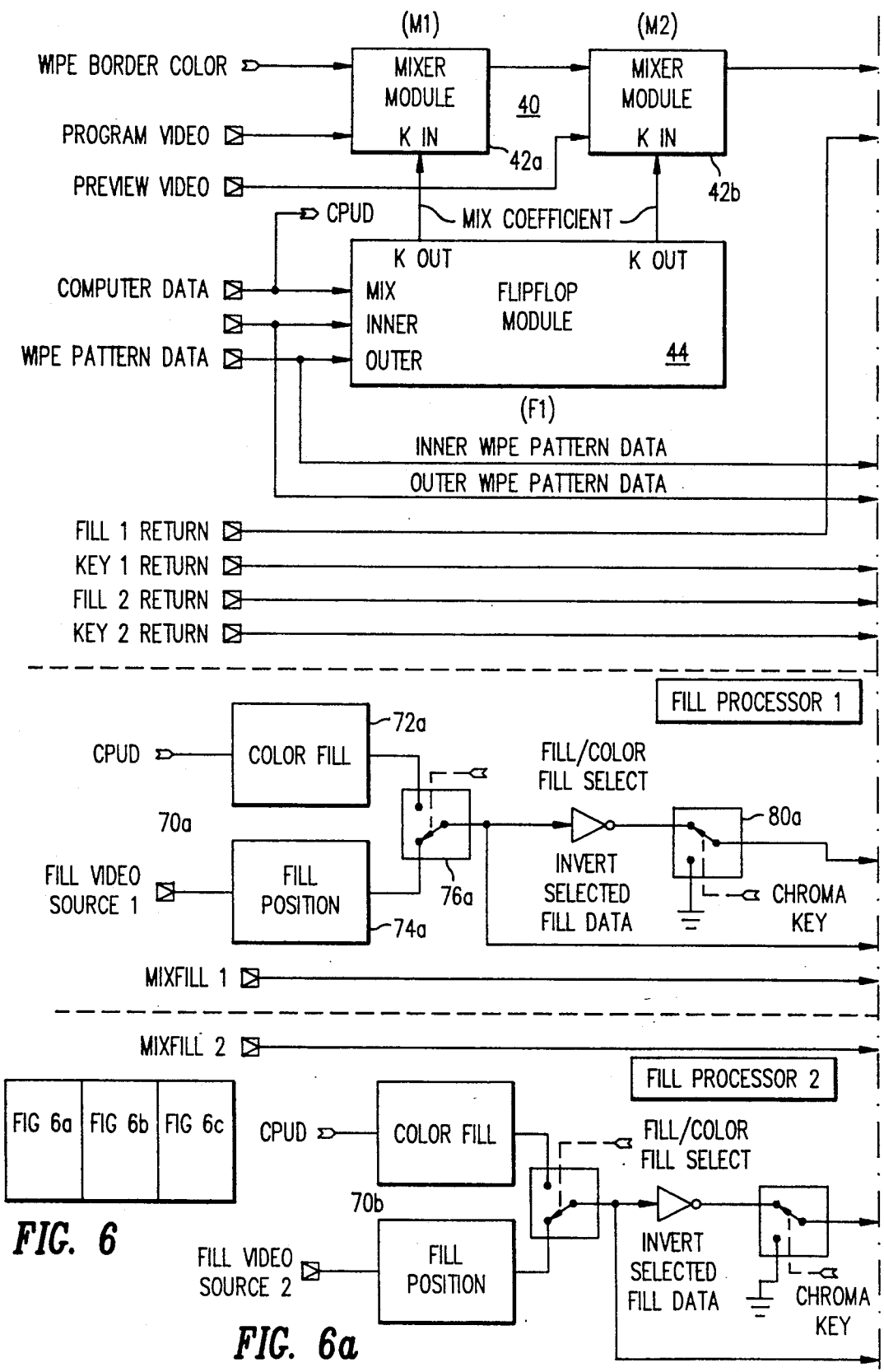

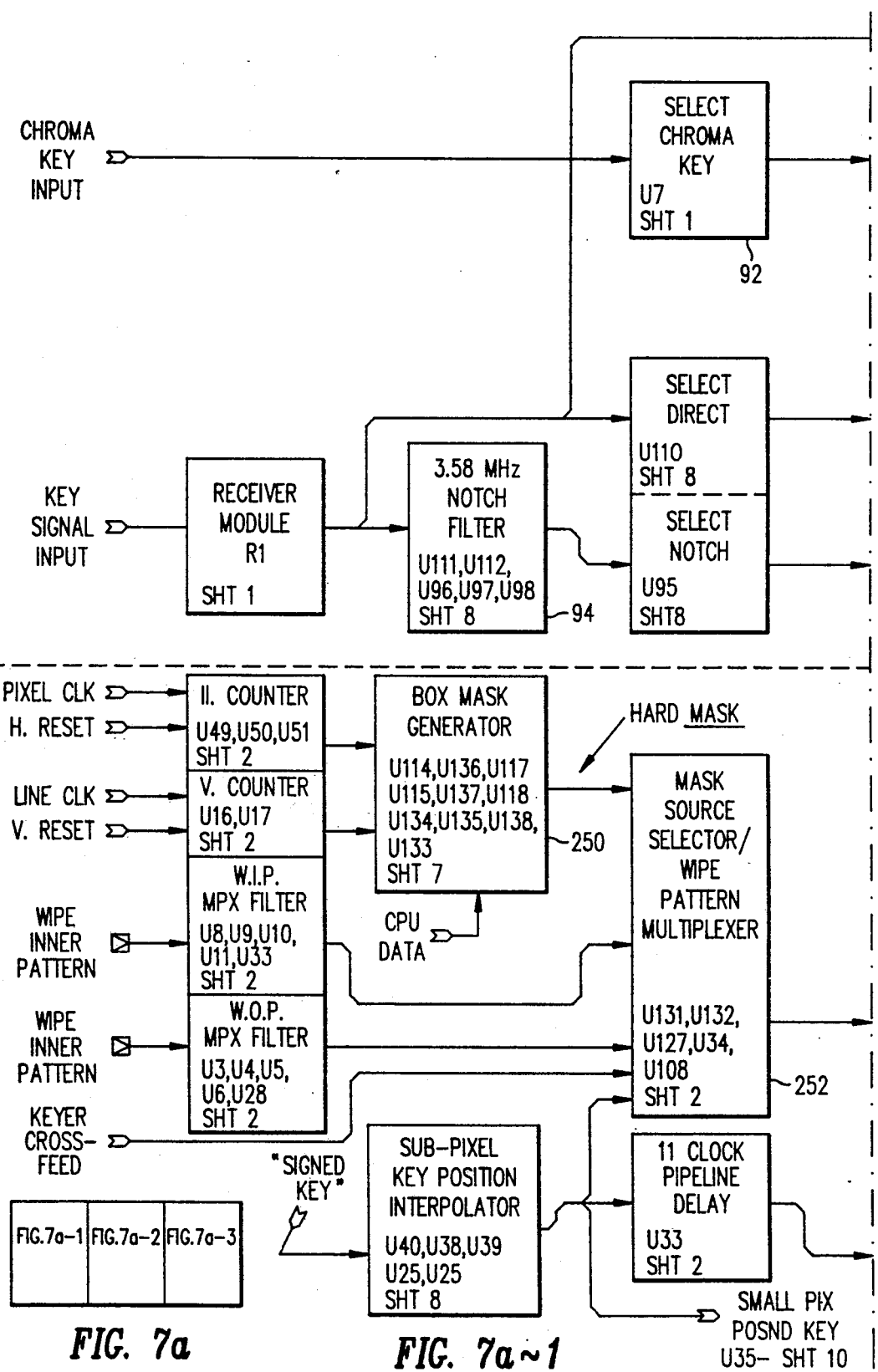

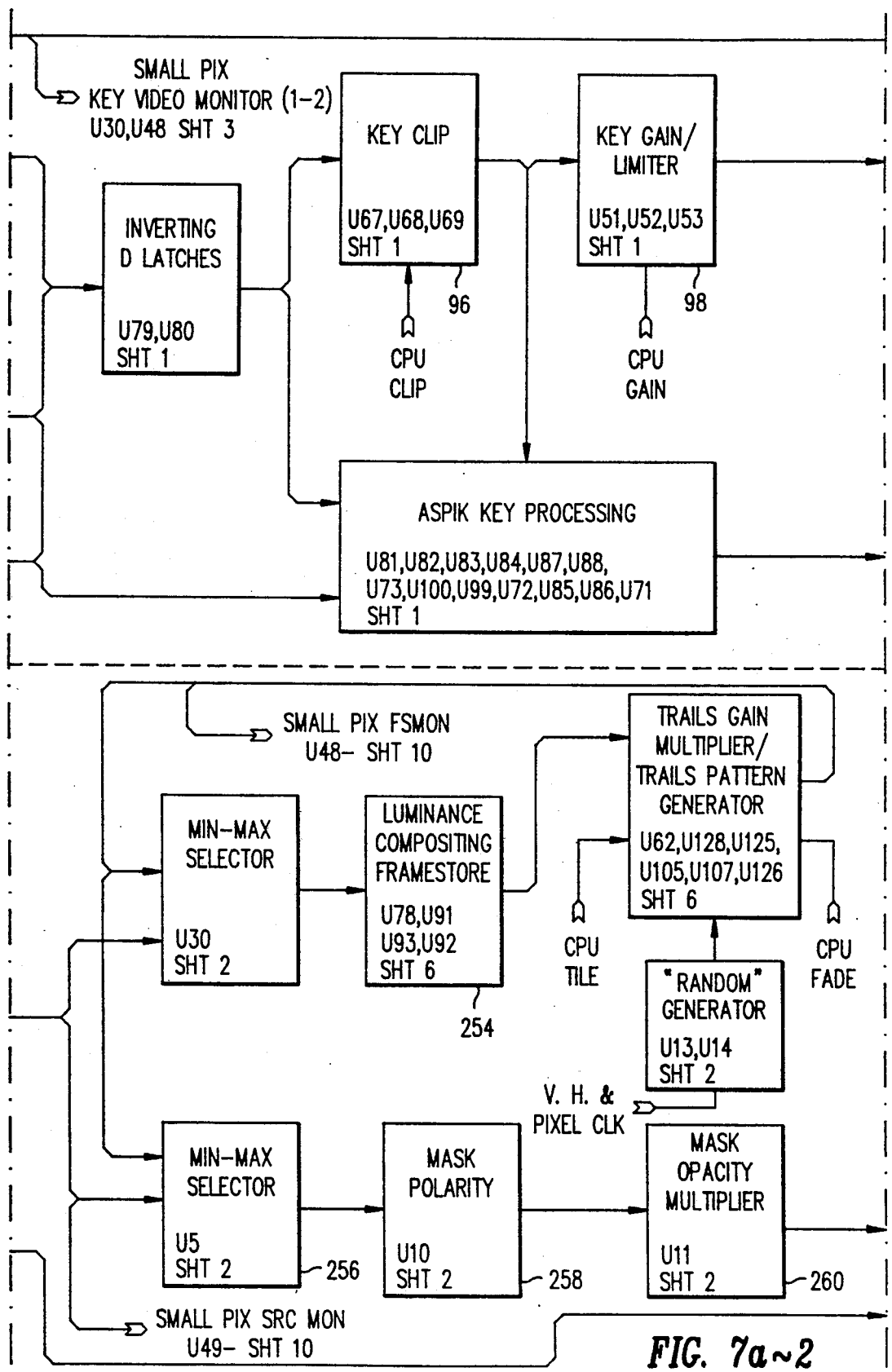
FIG. 7a~2

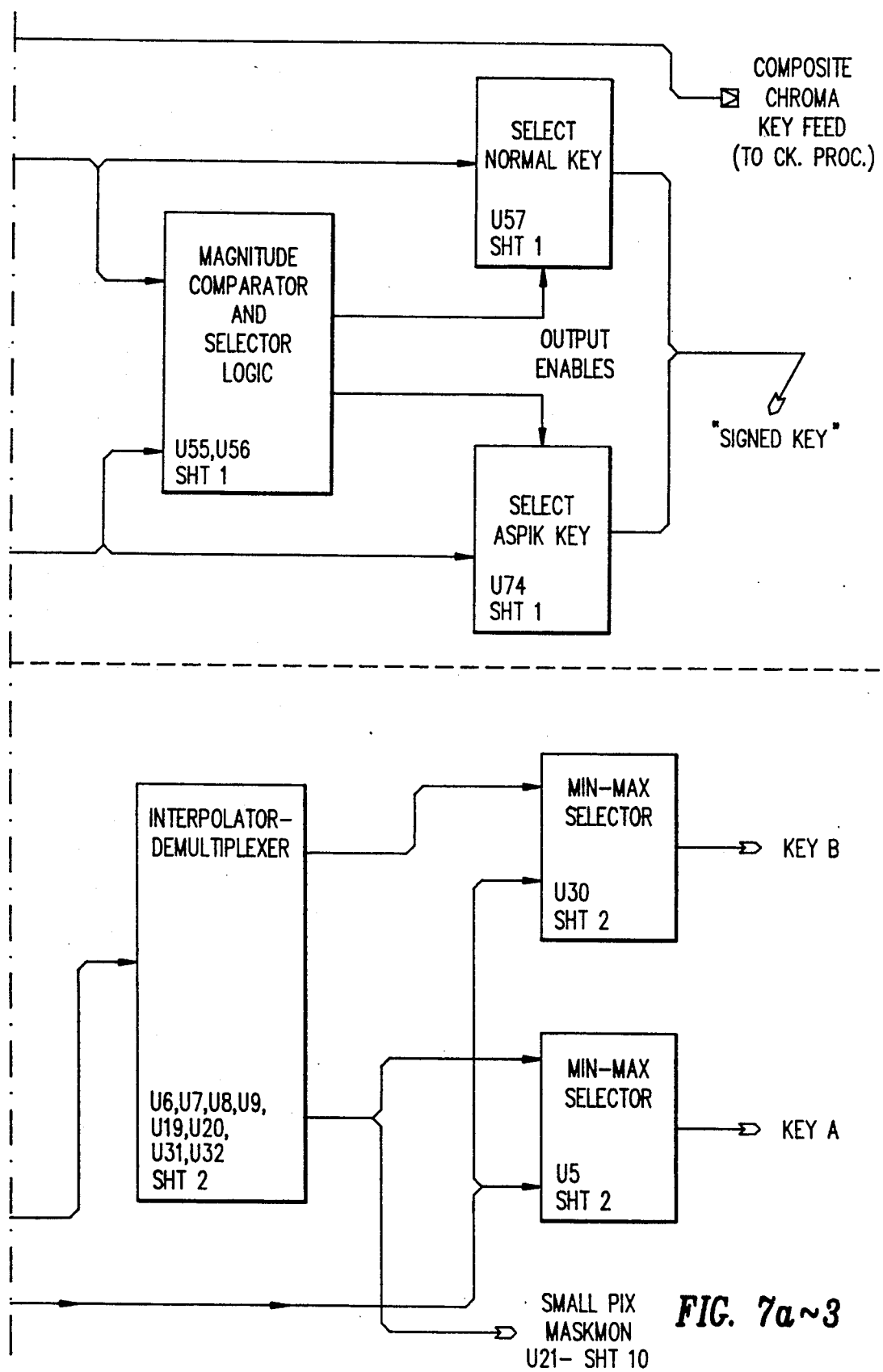
FIG. 7a~3

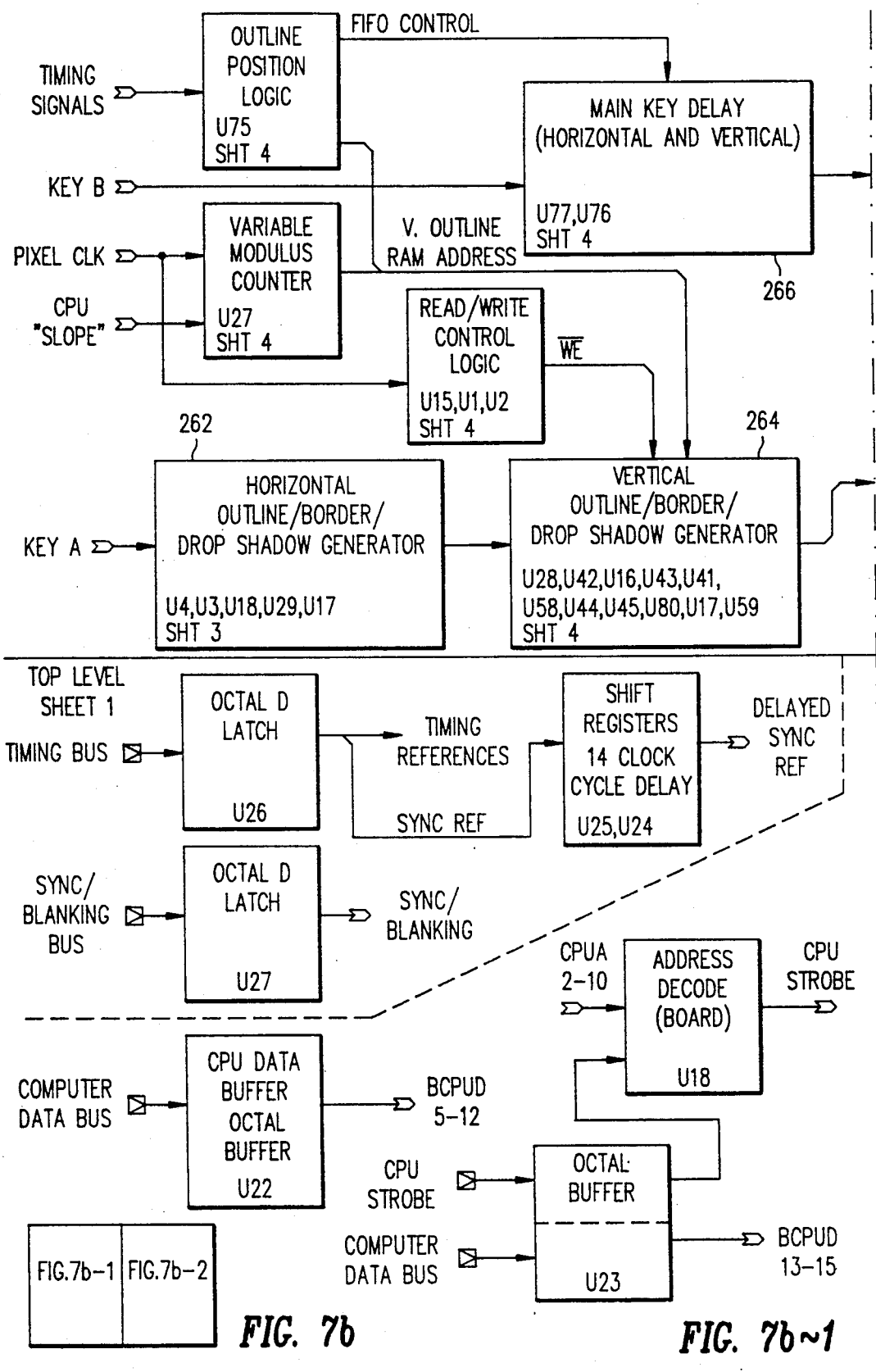
FIG. 7b        FIG. 7b~1

*FIG. 7c~1*

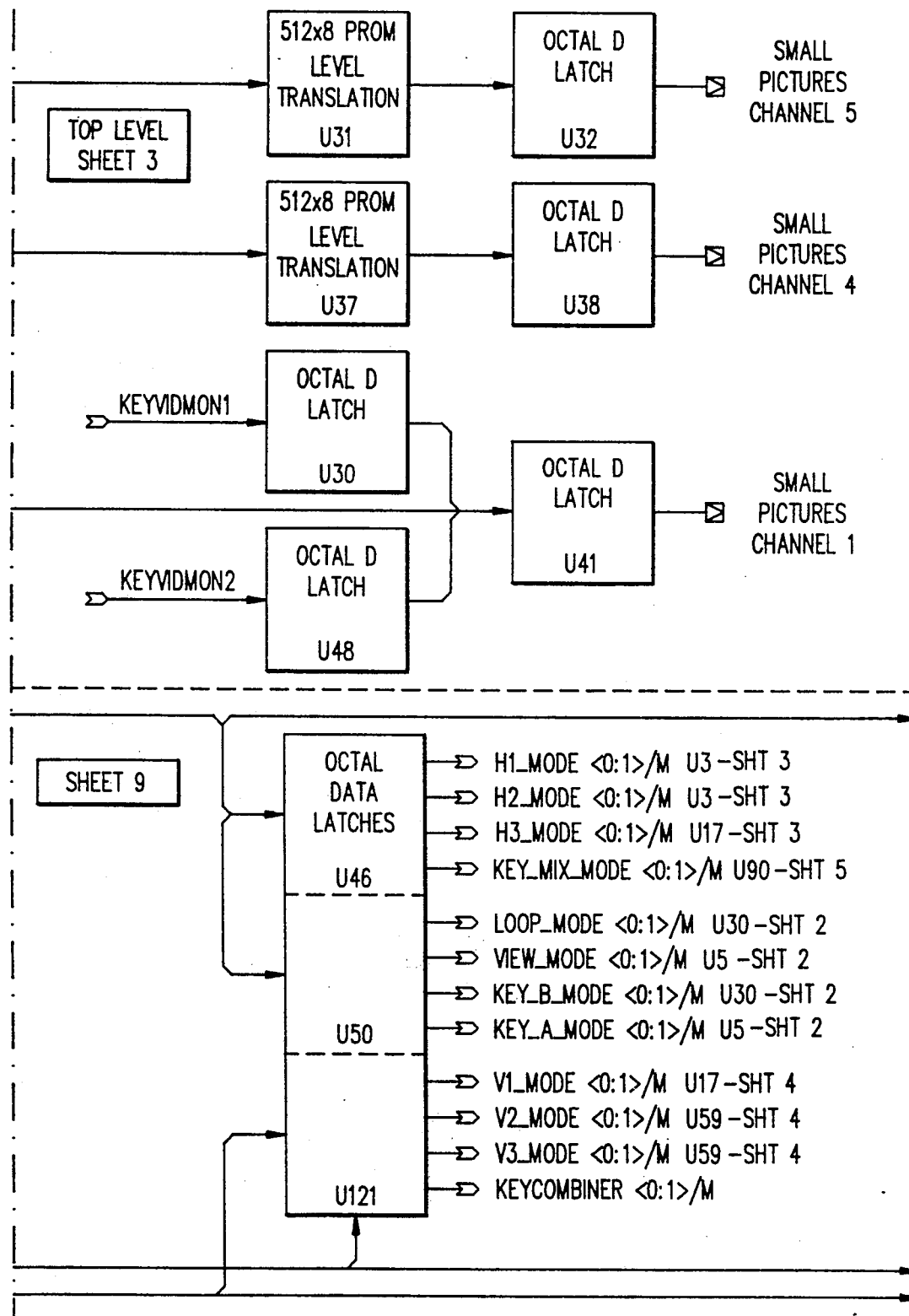
FIG. 7c~2

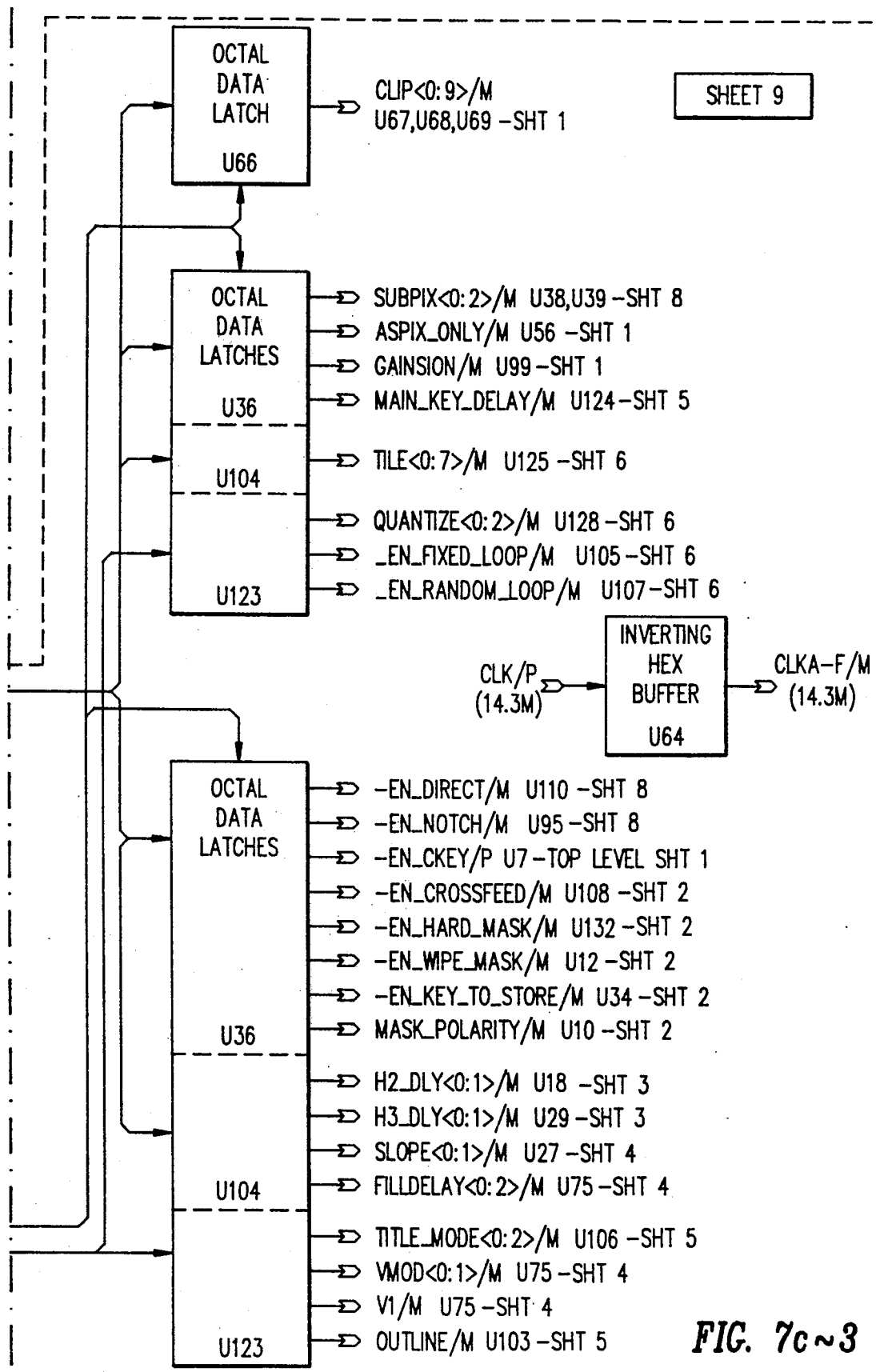
FIG. 7c~3

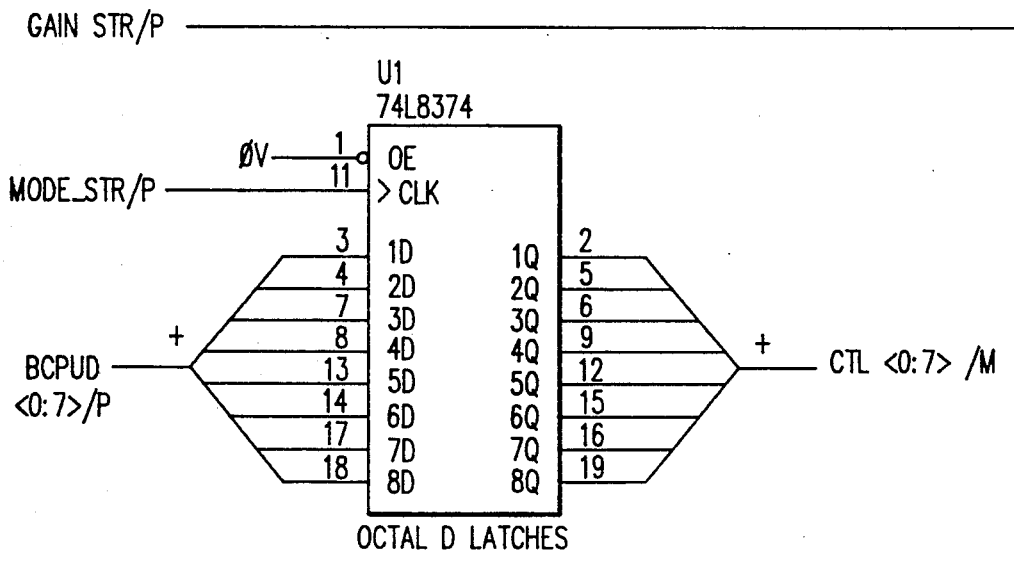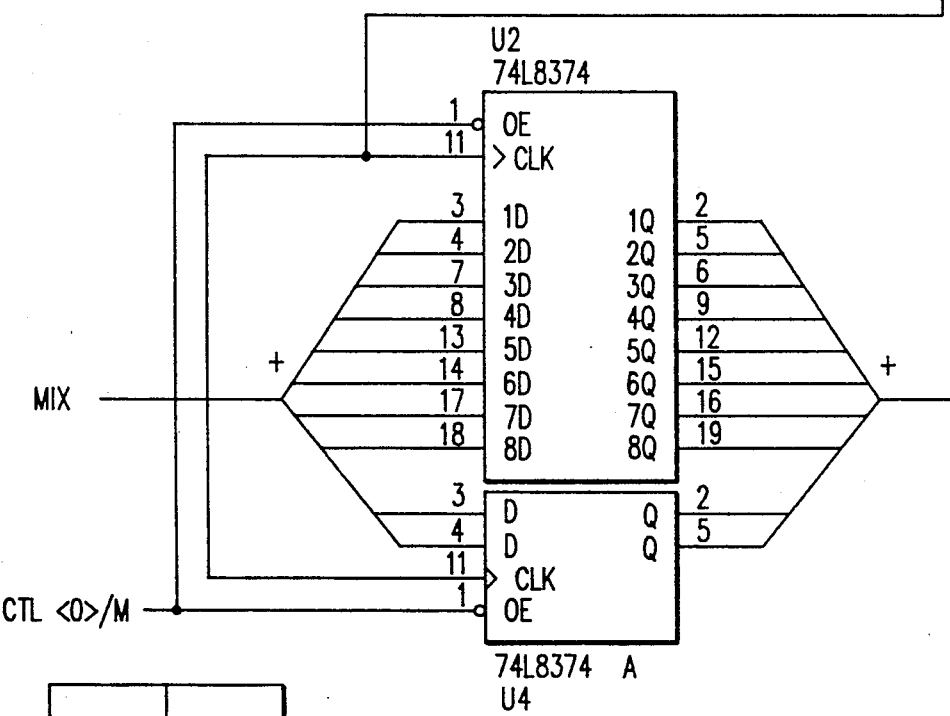
FIG. 11a
FIG. 11

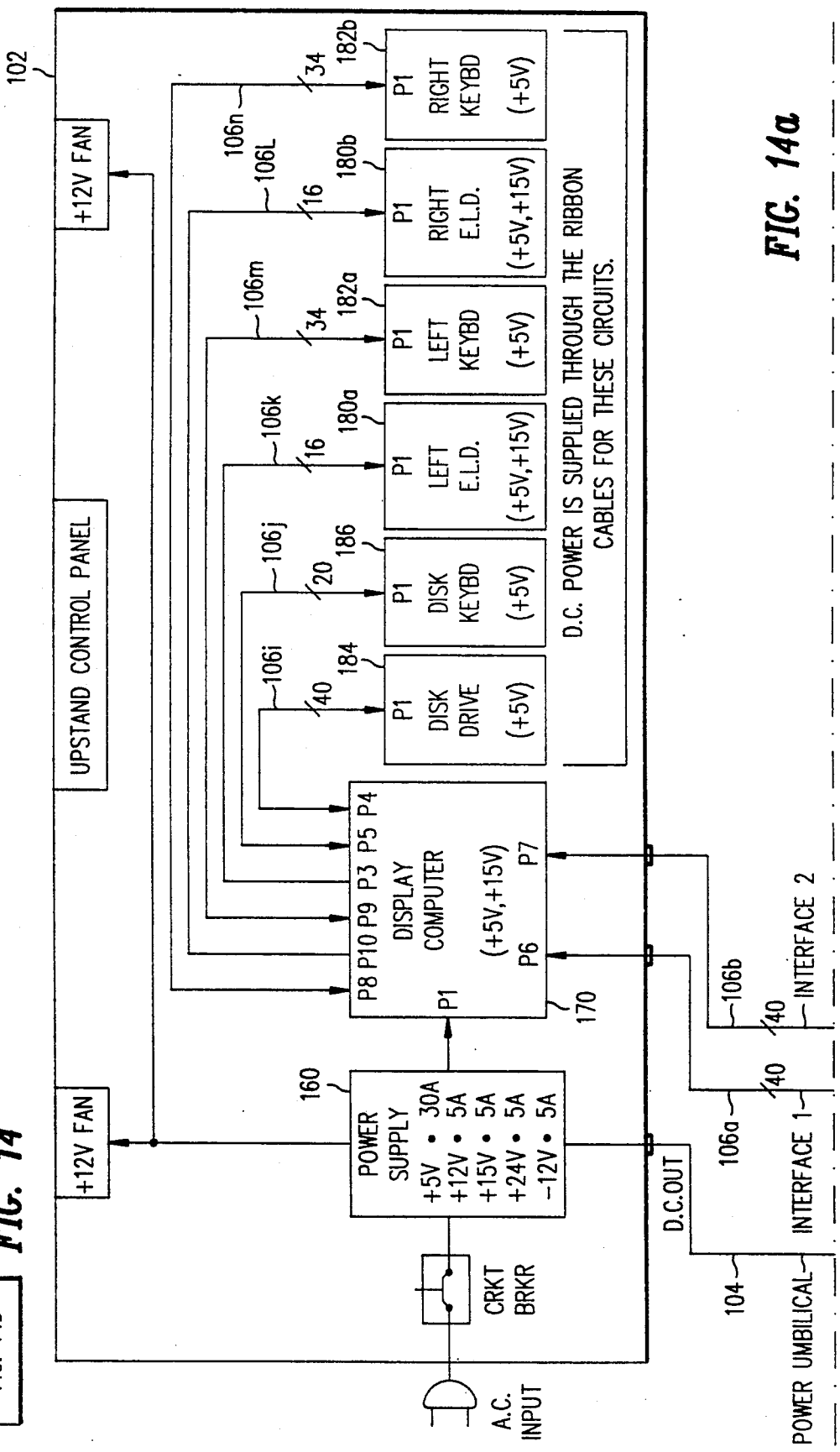

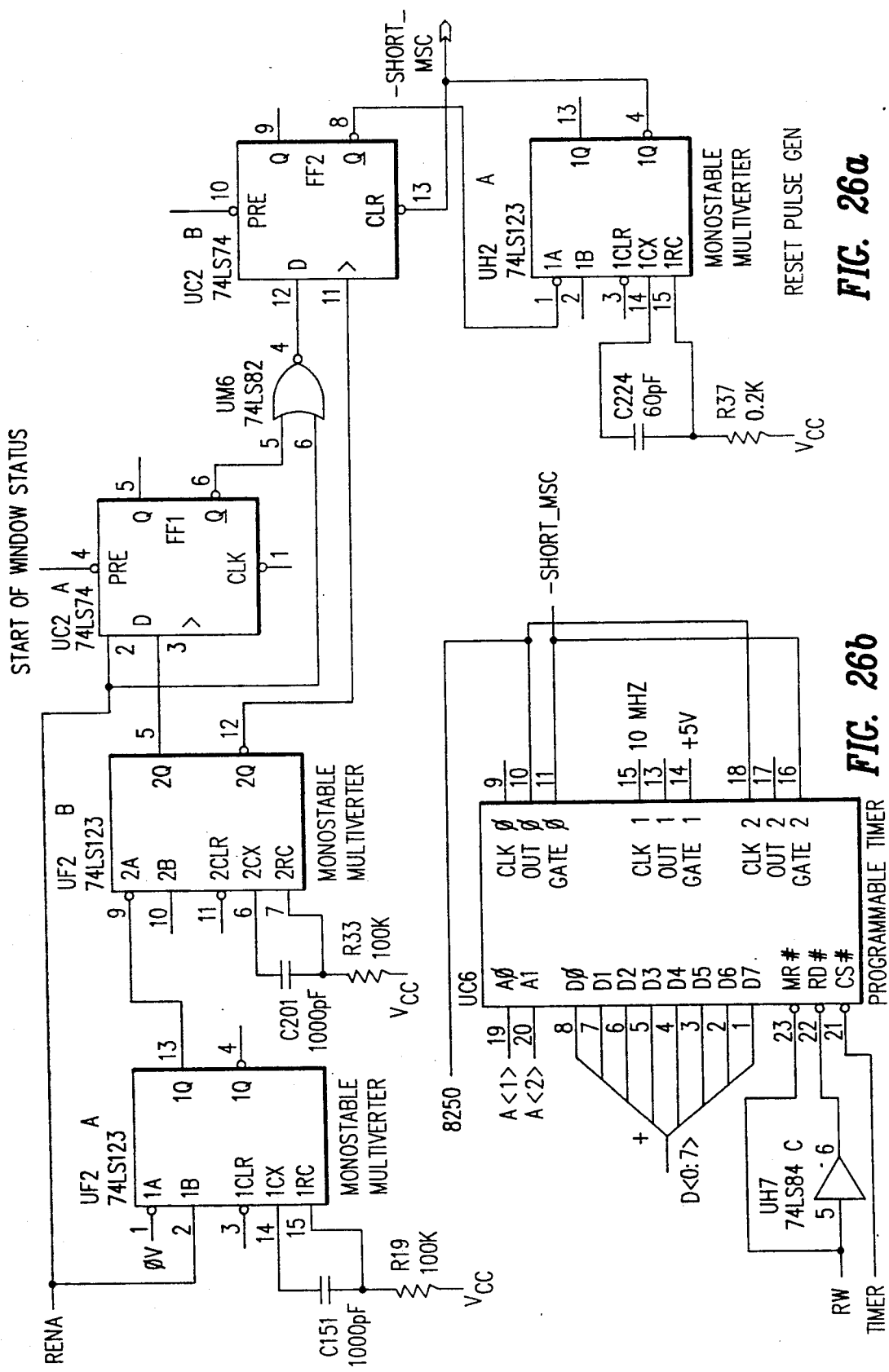

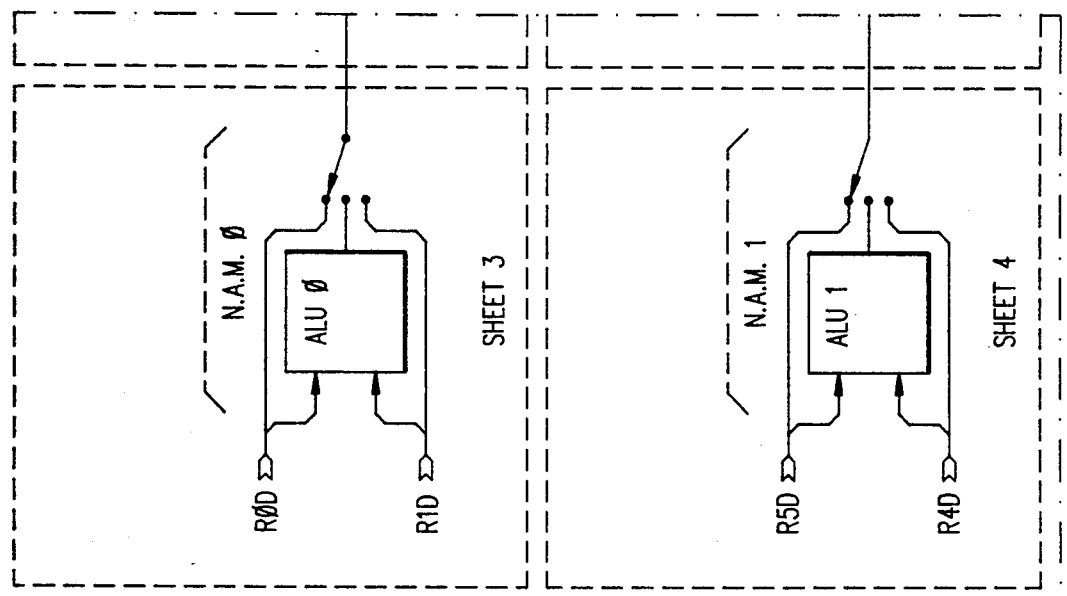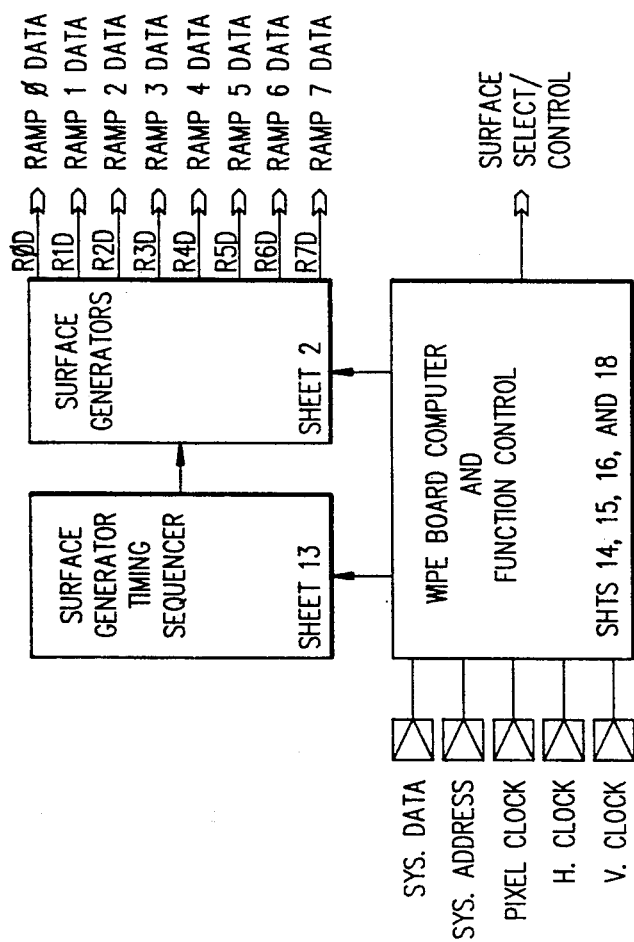
*FIG. 27a-1*
*FIG. 27a*

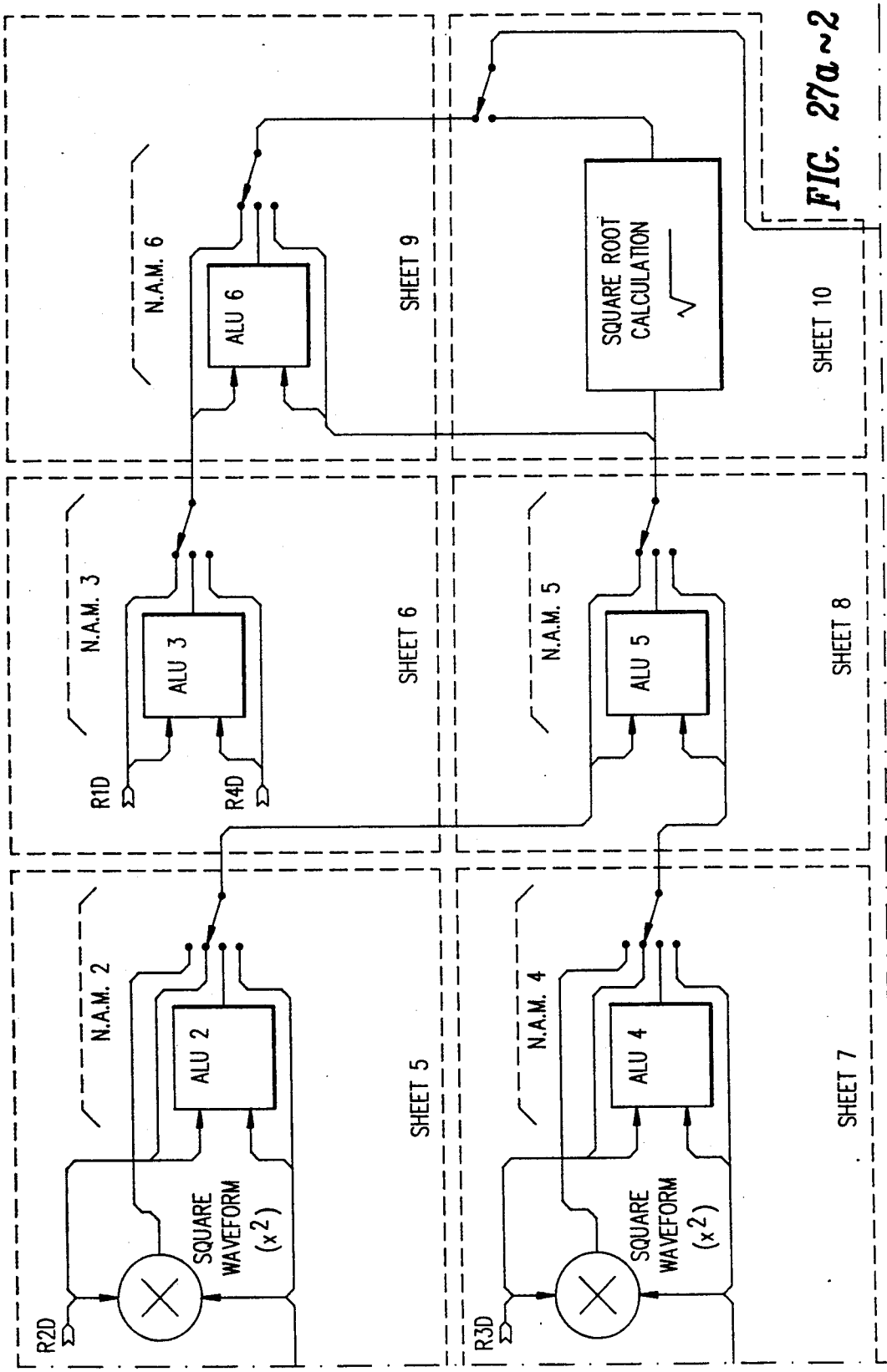
FIG. 27a~2

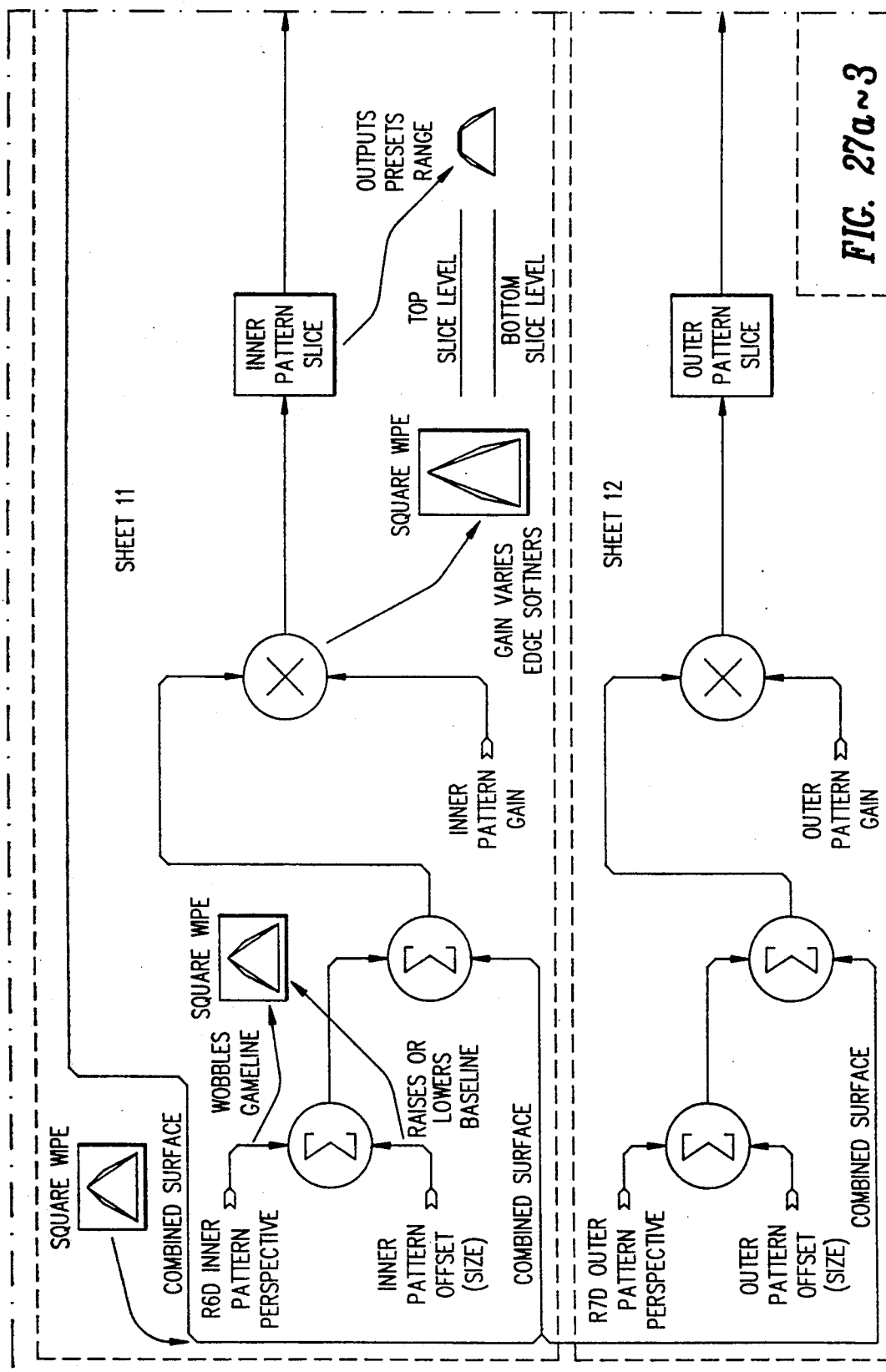

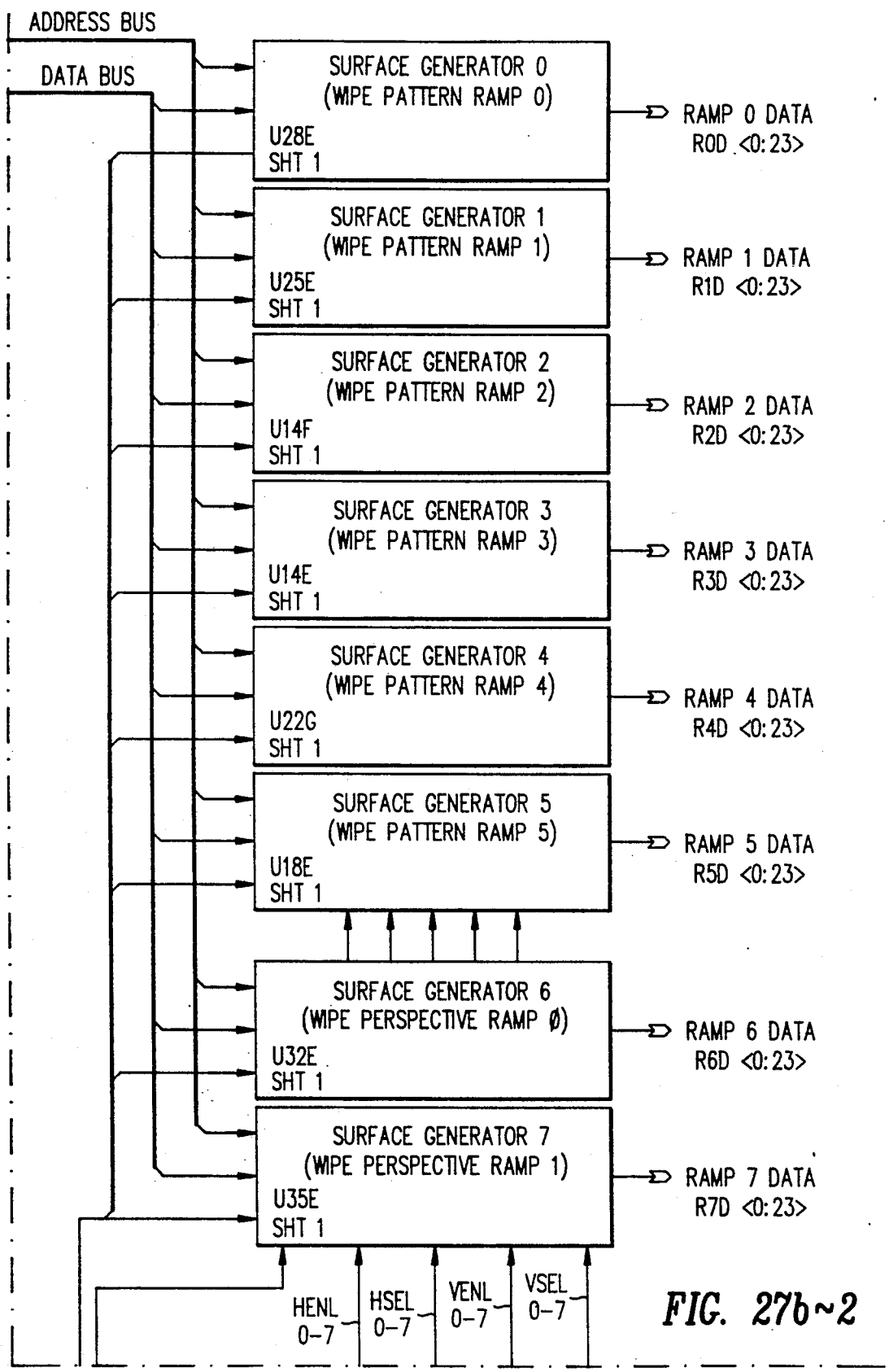
FIG. 27b~2

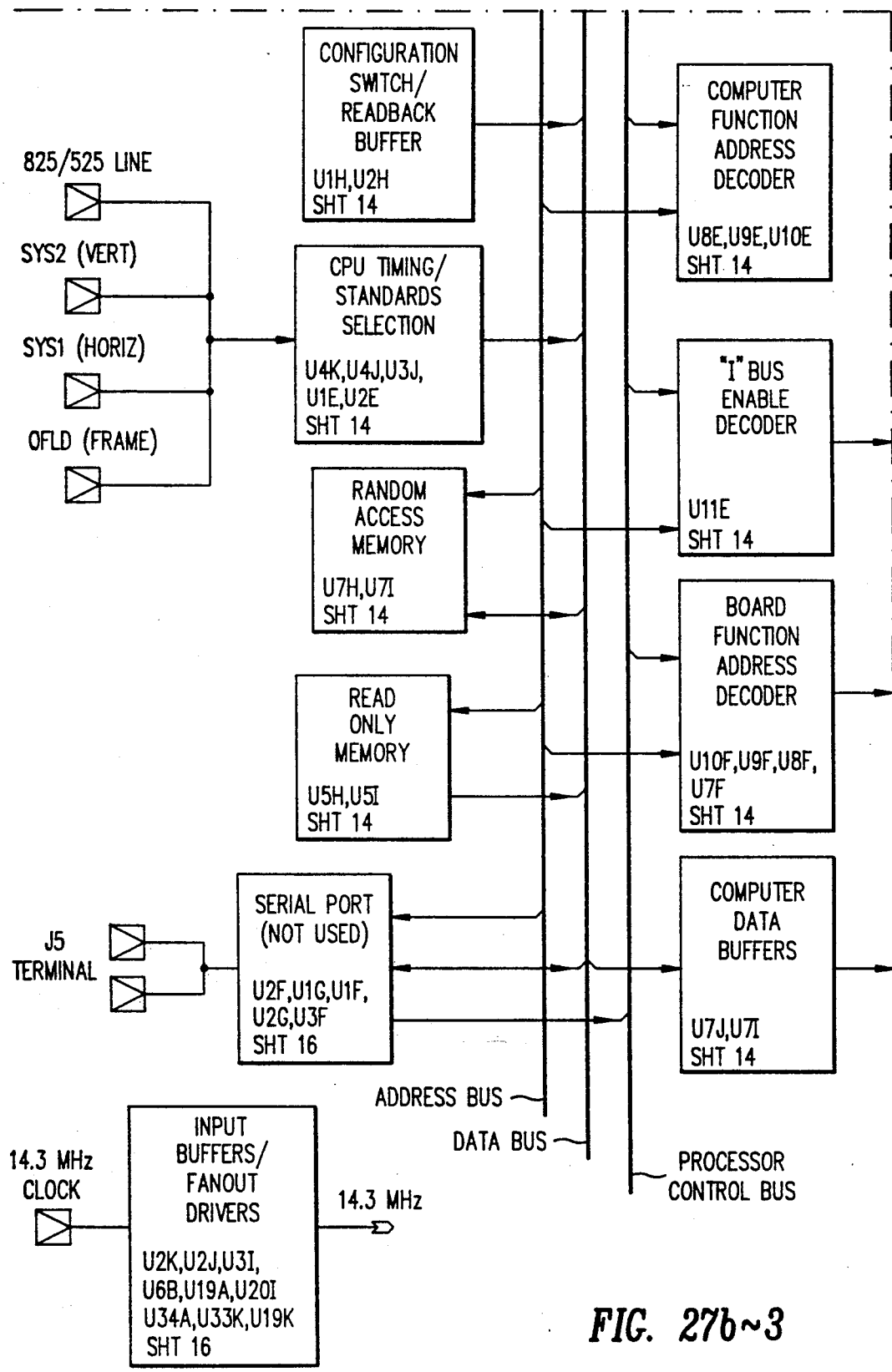
FIG. 27b~3

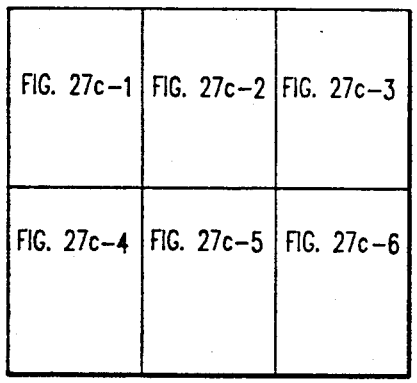
FIG. 27c
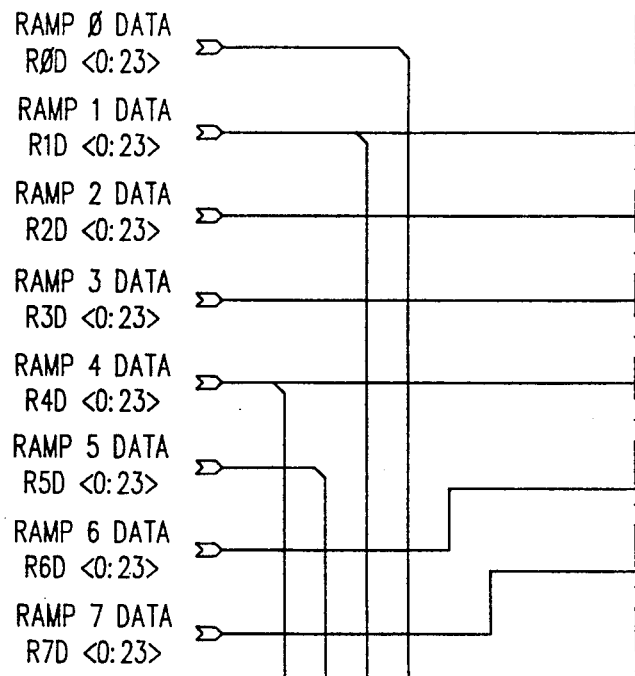
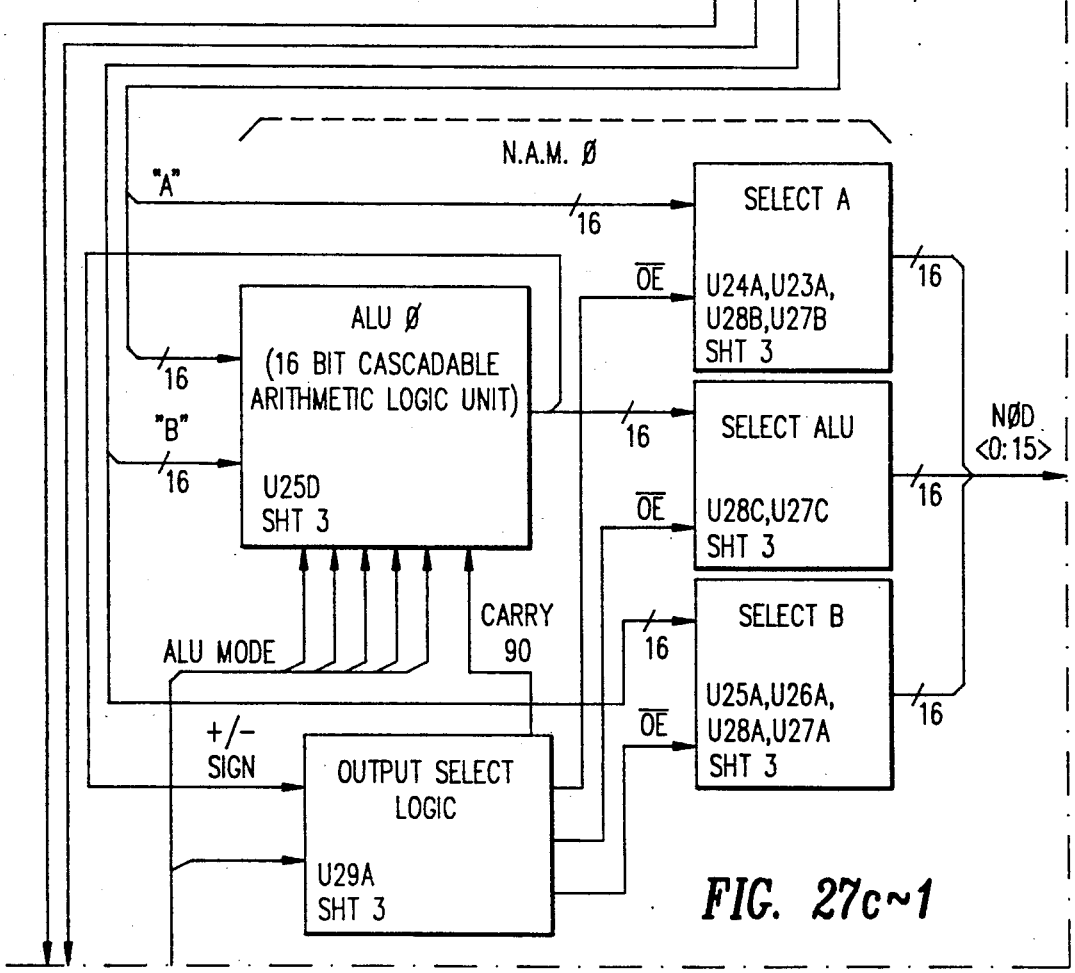
FIG. 27c~1

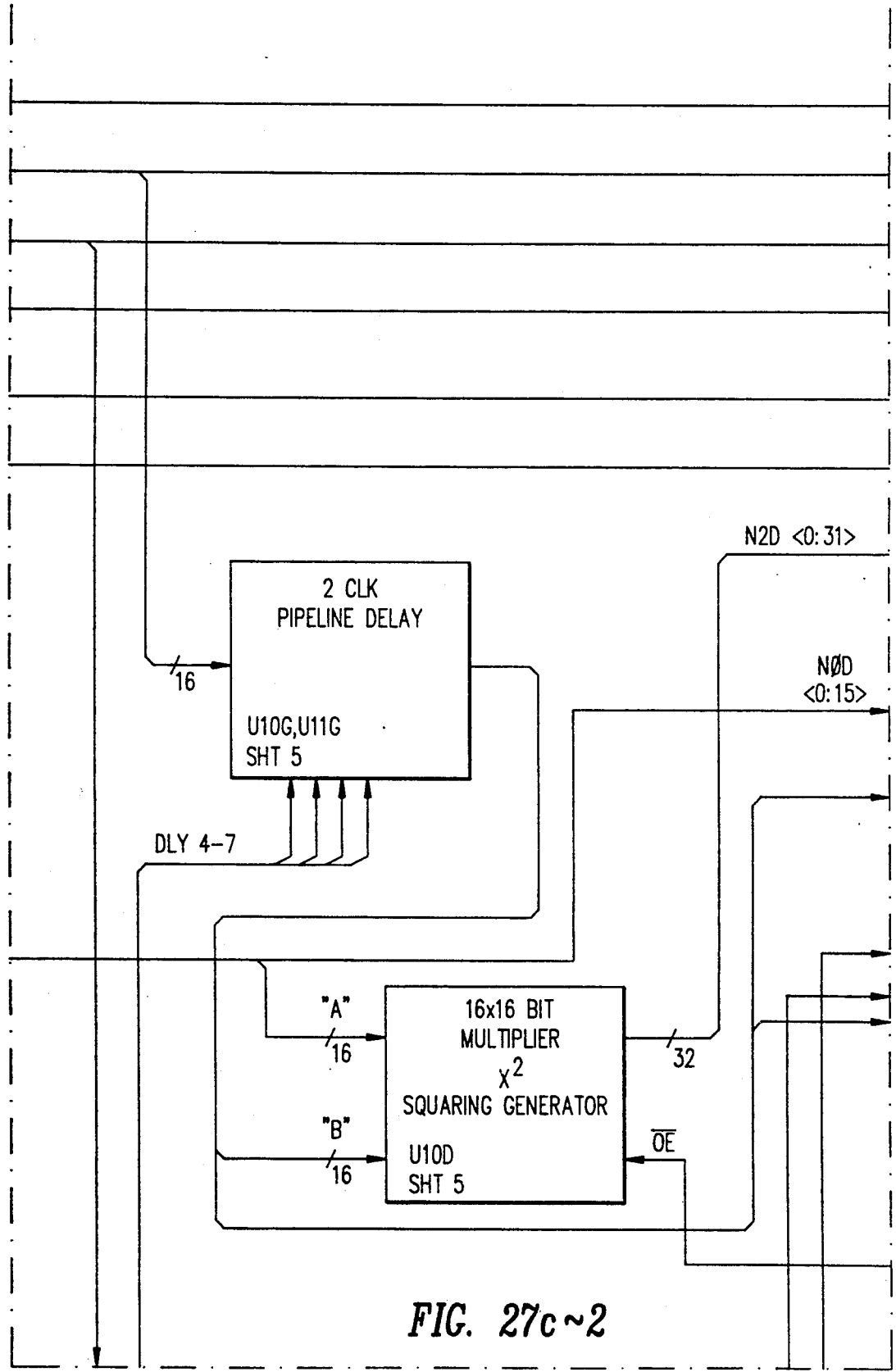
FIG. 27c~2

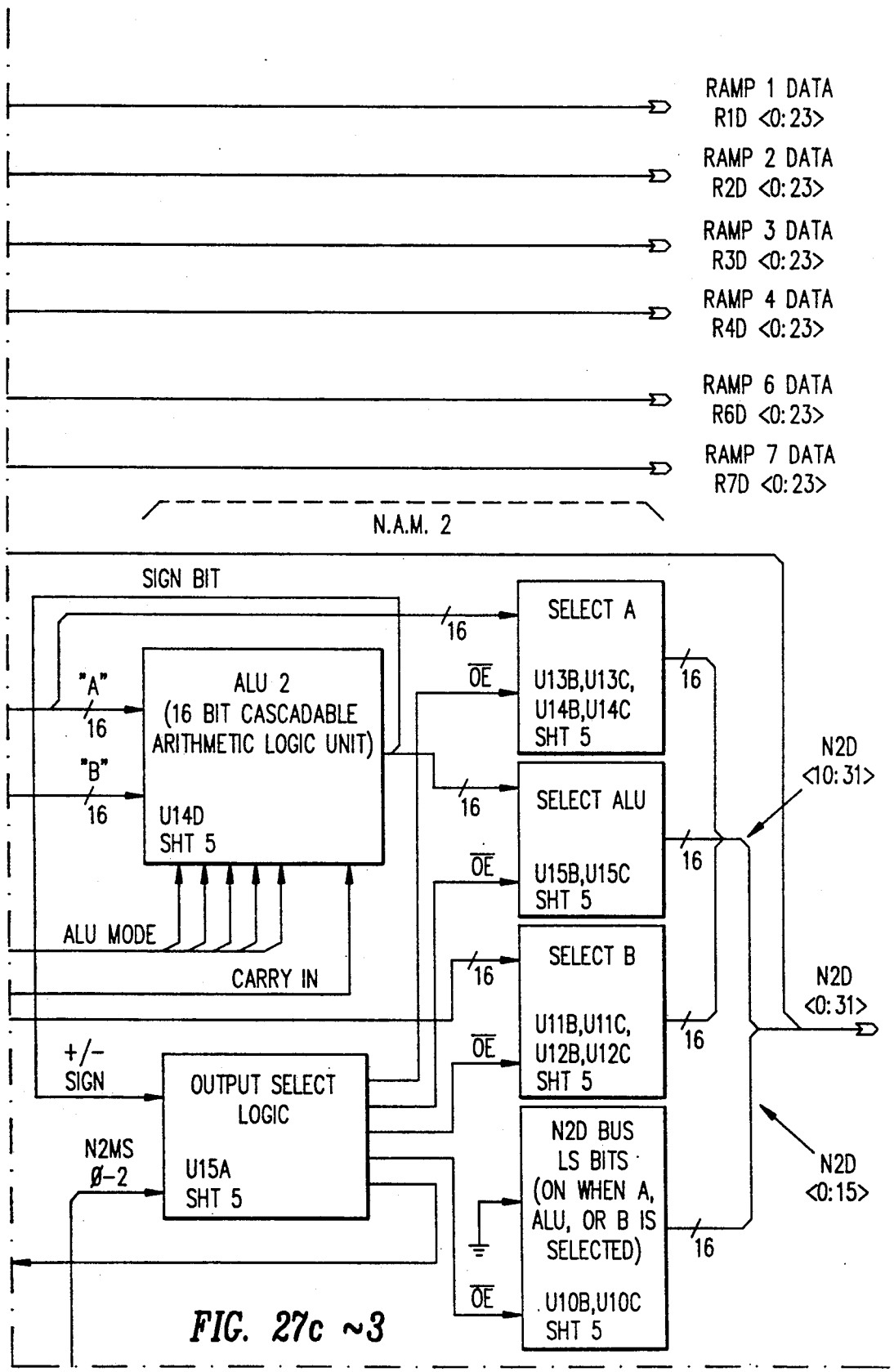
FIG. 27c ~3

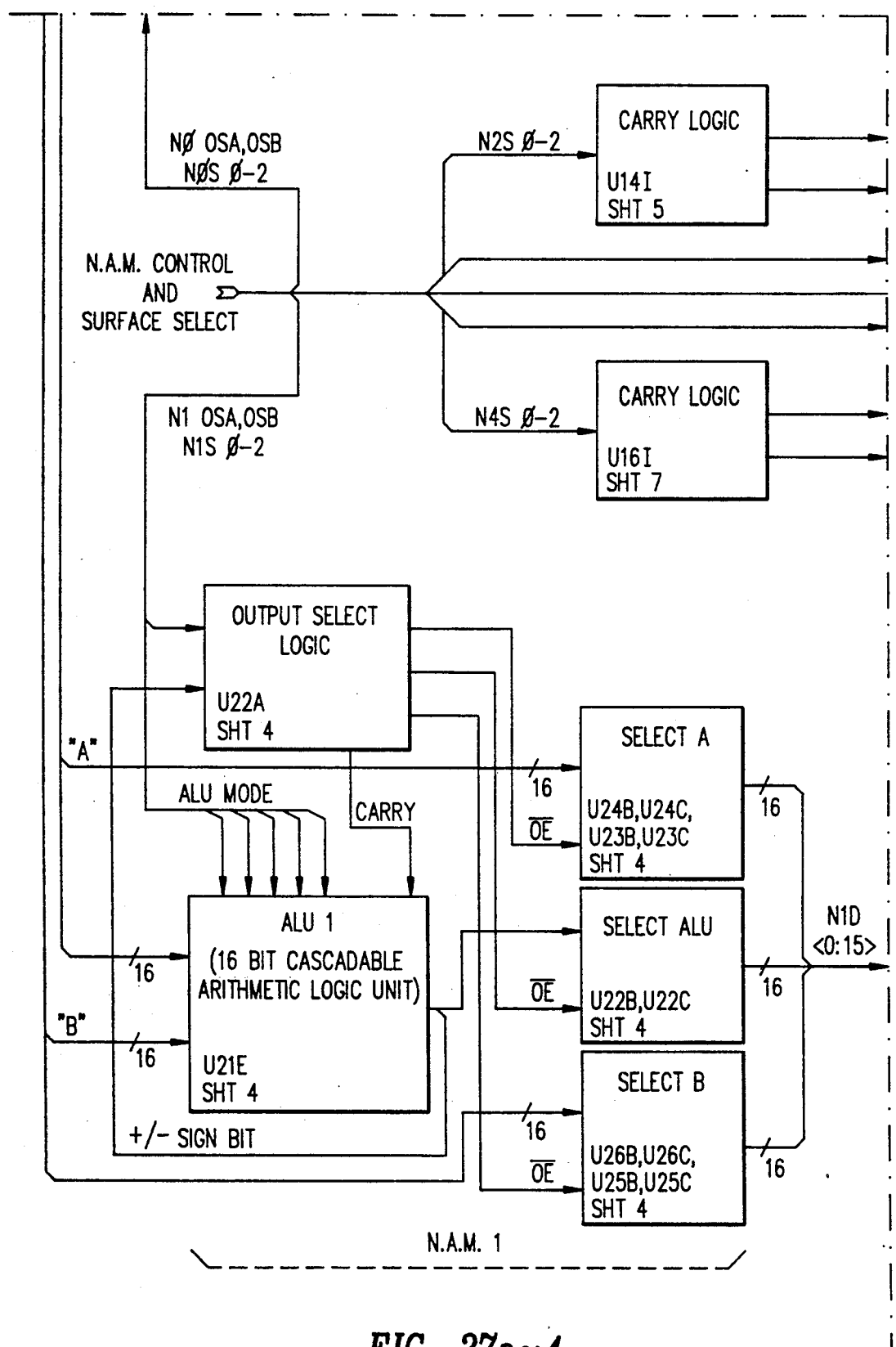
FIG. 27c~4

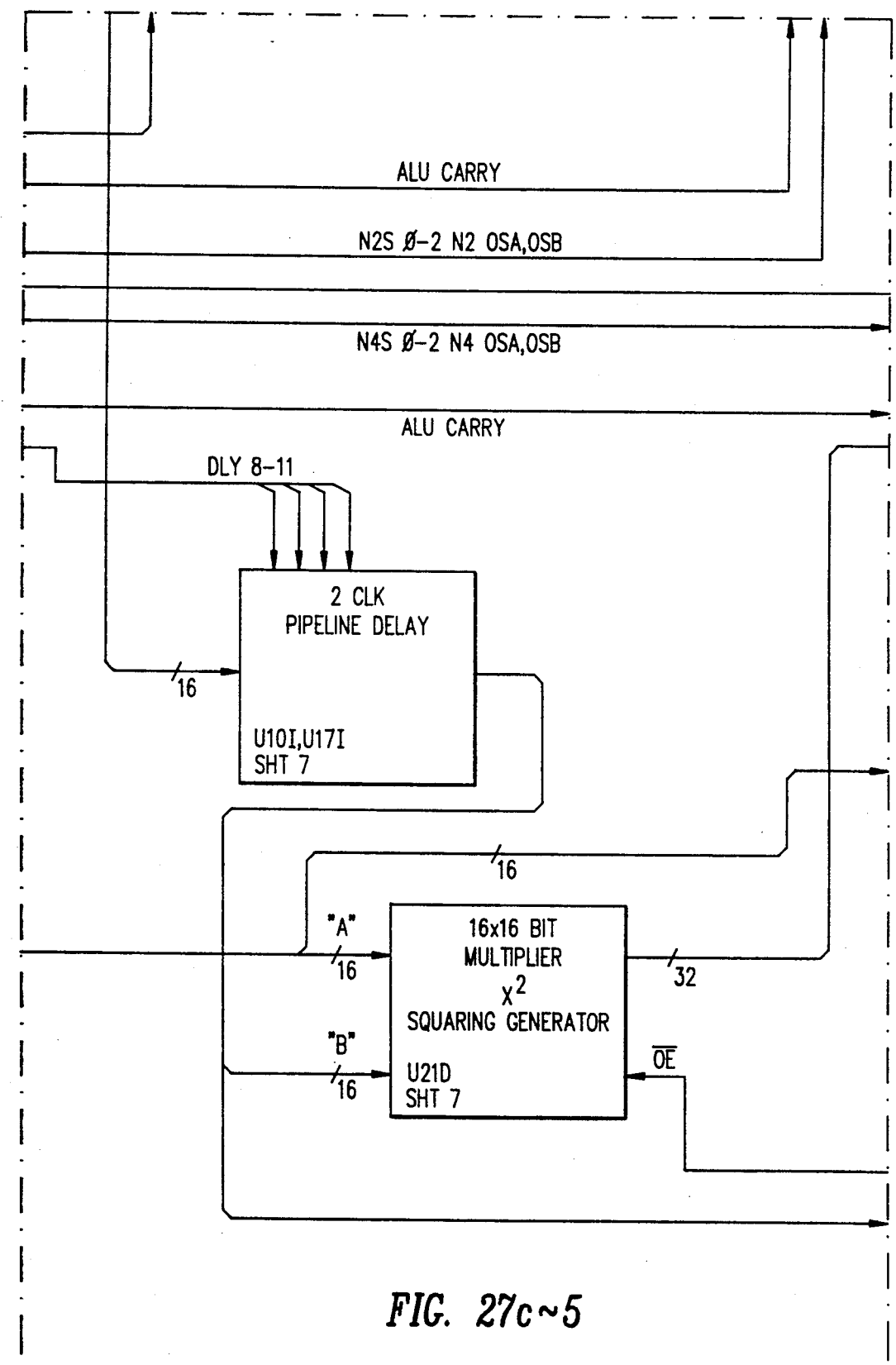
FIG. 27c~5

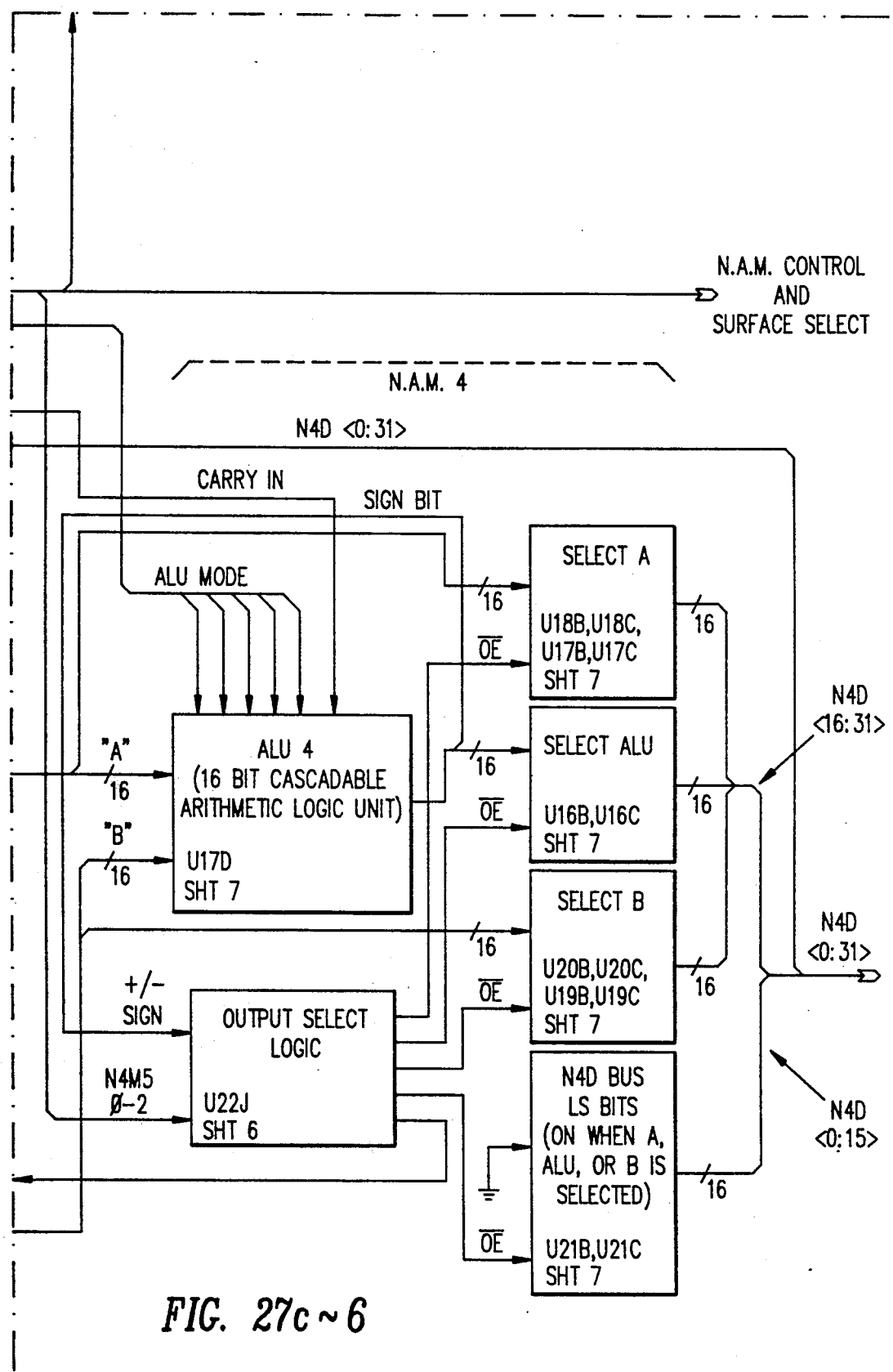
FIG. 27c~6

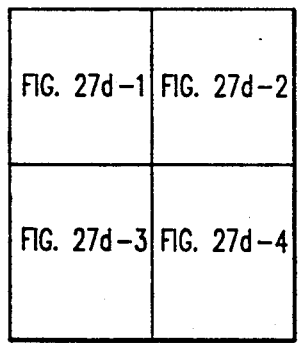
FIG. 27d
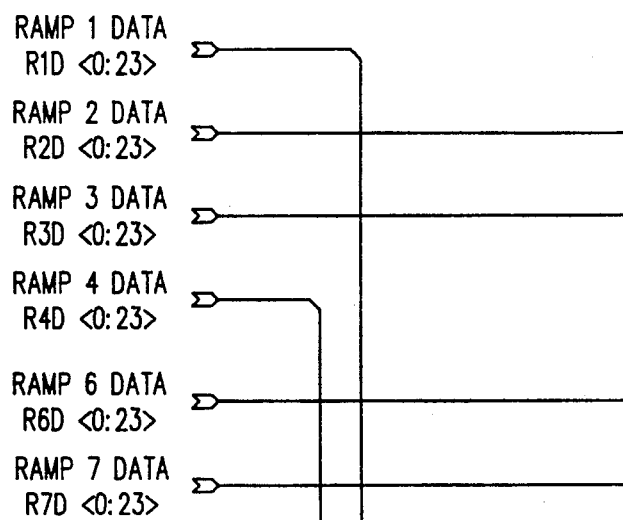
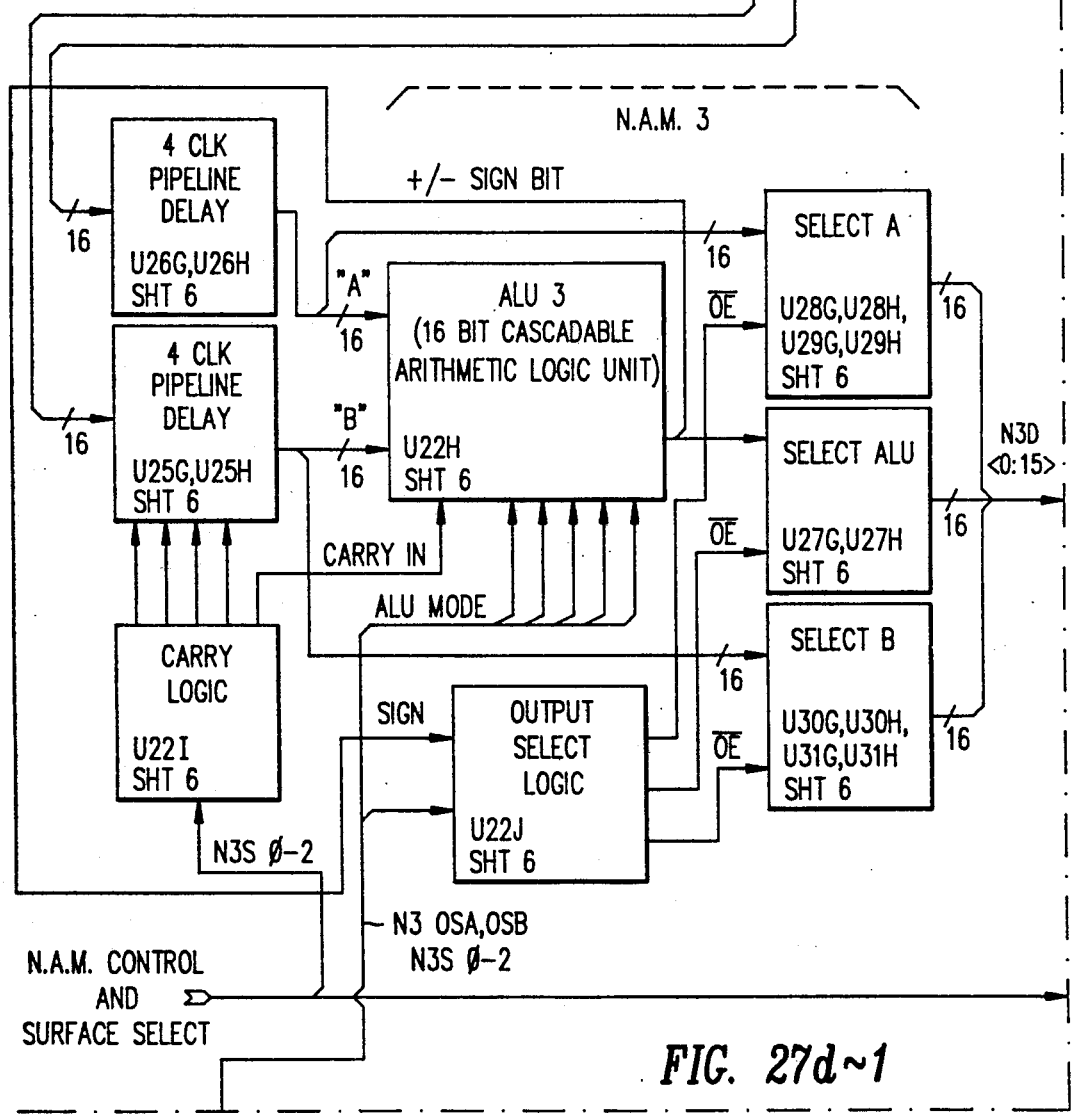
FIG. 27d~1

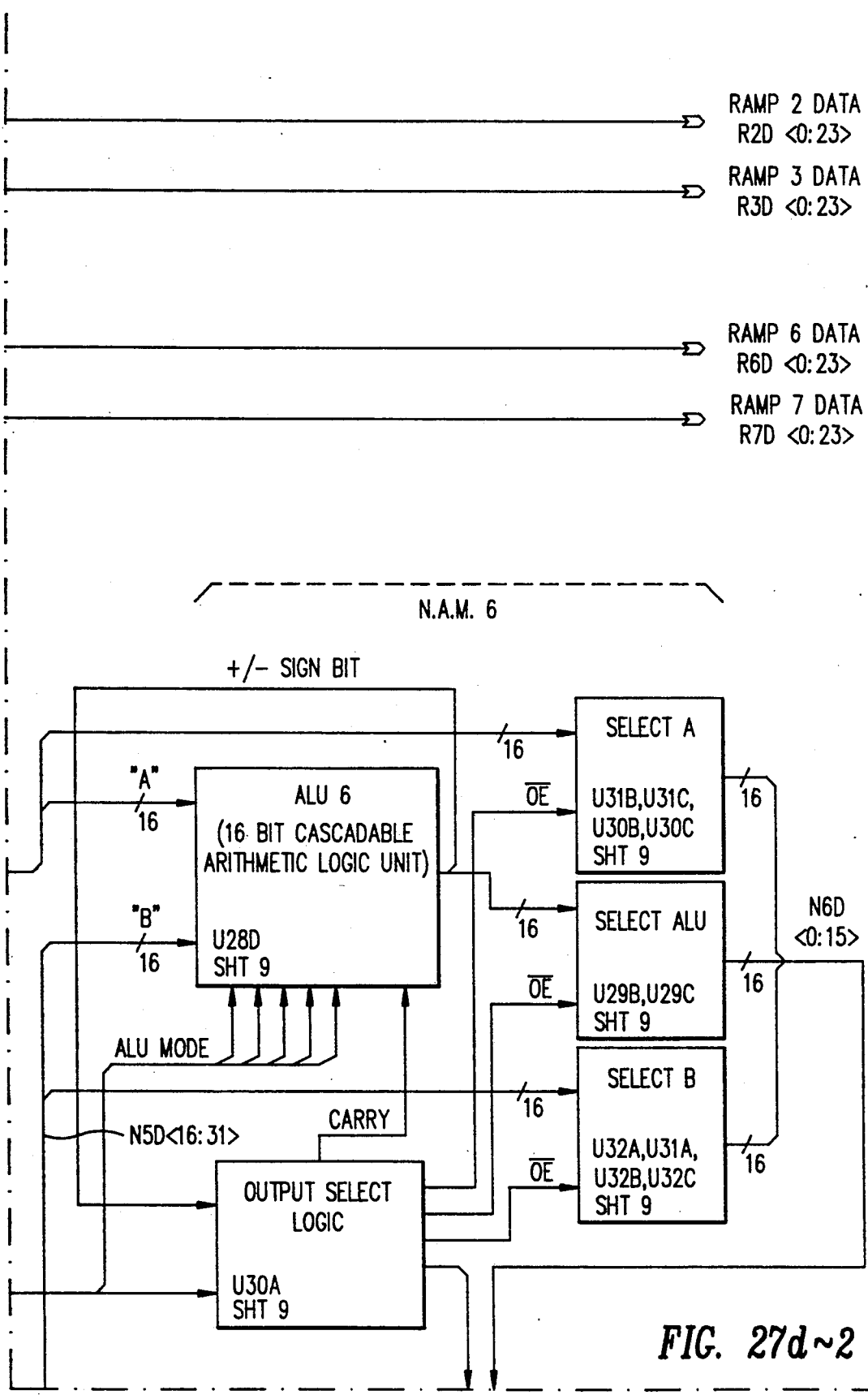
FIG. 27d~2

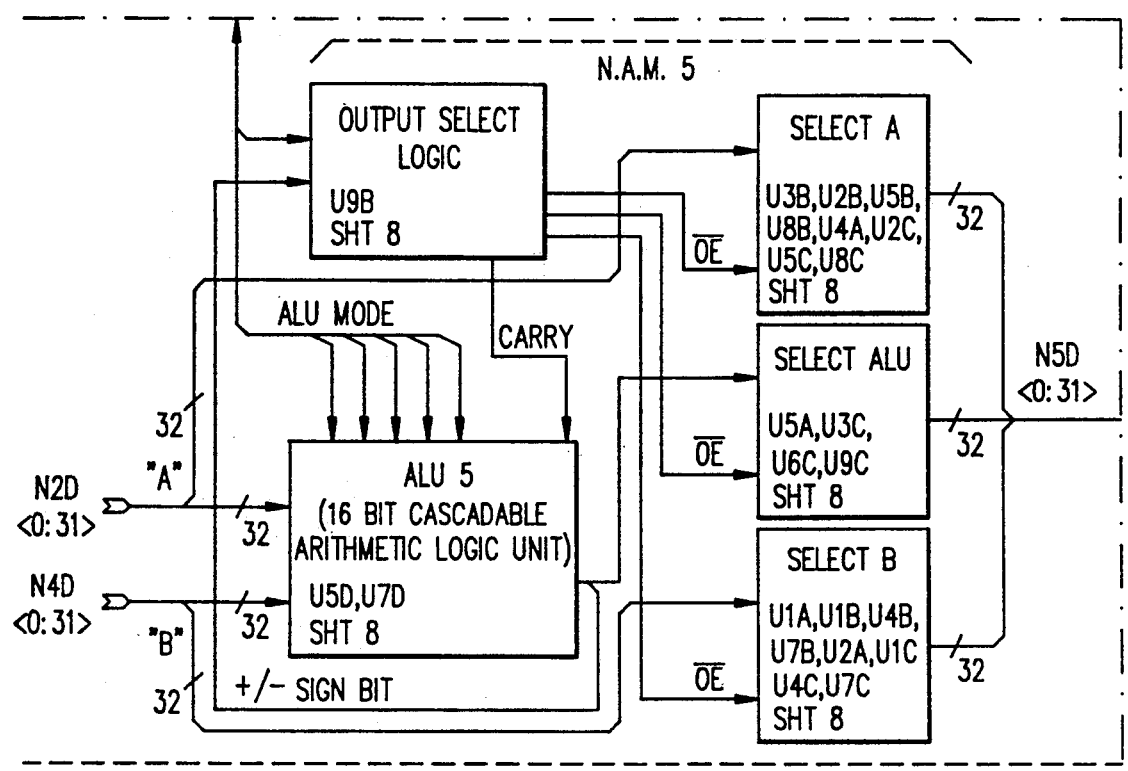
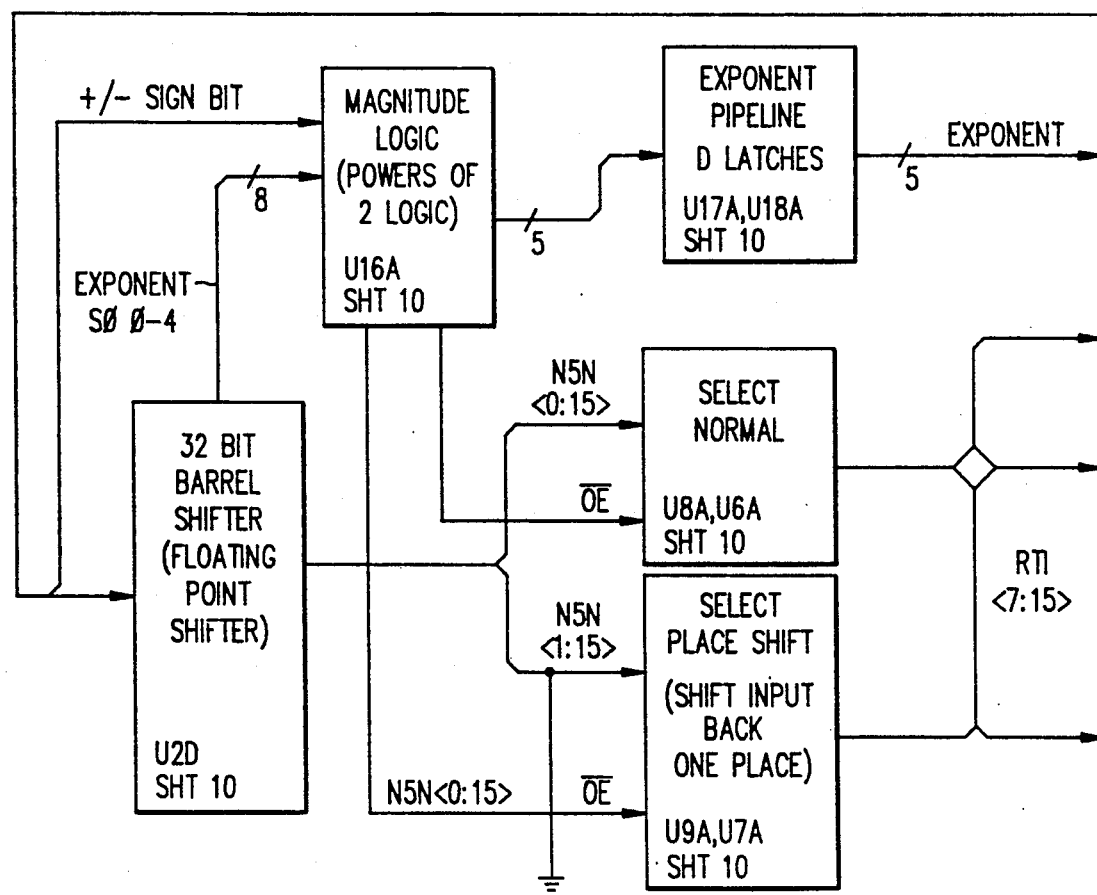
SQUARE ROOT CALCULATION
FIG. 27d~3

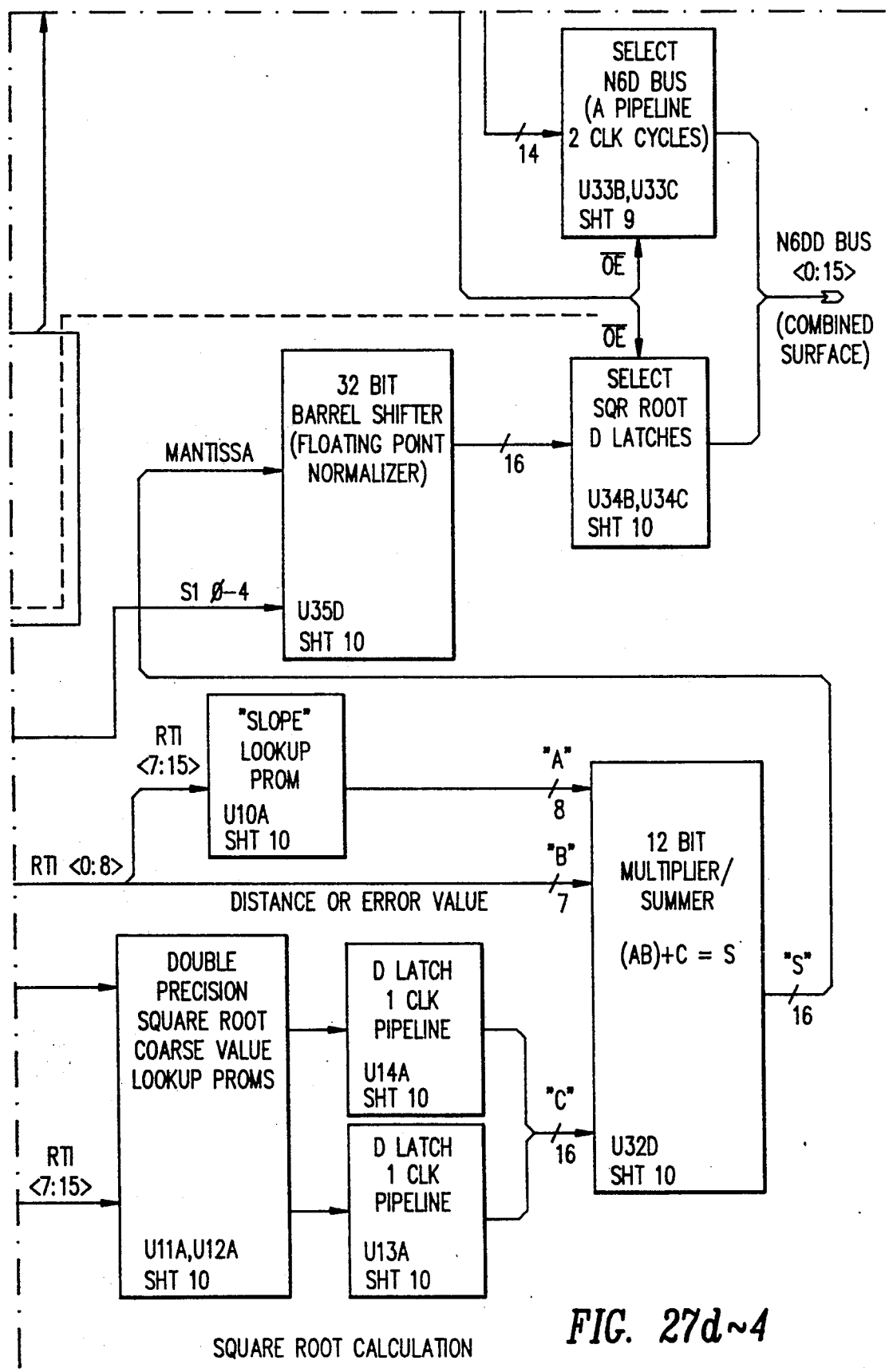
FIG. 27d~4

FIG. 27e~1

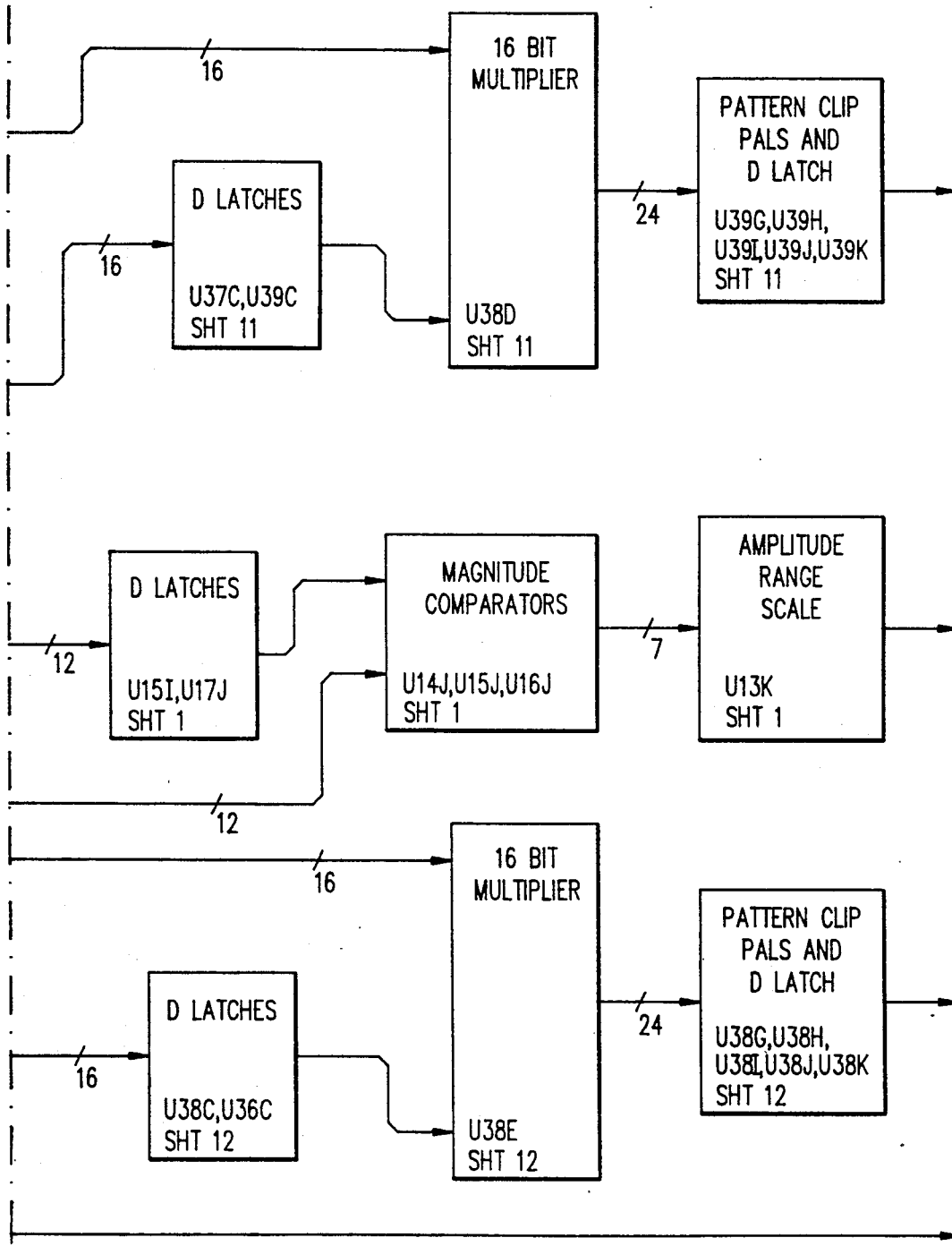
FIG. 27e~2

VIDEO PROCESSING SYSTEM HAVING IMPROVED TRANSITION CONTROL AND DISPLAY

This application is submitted with a microfiche appendix, having Exhibits A, B, C, D, E, F, G, H, and I, containing copyrighted material, Copyright 1990, Abekas Video Systems, Inc. The Appendix consists of
Exhibit A: five (5) microfiches with 441 frames;
Exhibit B: one (1) microfiche with 47 frames;
Exhibit C: two (2) microfiches with 183 frames;
Exhibit D: three (3) microfiches with 233 frames;
Exhibit E: two (2) microfiches with 151 frames;
Exhibit F: two (2) microfiches with 126 frames;
Exhibit G: two (2) microfiches with 152 frames;
Exhibit H: one (1) microfiche with 88 frames;
Exhibit I: two (2) microfiches with 161 frames.
The copyright owner has no objection to the facsimile reproduction by any one of the patent document or the patent disclosure, as it appears in the Patent and Trademark Office patent file or records, but otherwise reserves all copyright rights whatsoever in the appendices.

TECHNICAL FIELD

The present invention relates to an improved digital video processing system, and more particularly, to an improved composite video digital switcher, having improved transition control and display.

BACKGROUND OF THE INVENTION

Video switching apparatuses are well known in the art. Typically, a video switching apparatus comprises a plurality of mix effect units, known as ME units. A number of these ME units are connected in series to form a video switching apparatus. In the prior art, the ME units operate on an analog video signal. Each ME unit receives a video signal, a key signal (indicating the position or location of the image represented by the video signal which is to be filled by a fill signal), and a fill signal. The timing constraints of the prior art analog switcher comprising a plurality of analog ME units makes for a rigid signal flow, or necessitates analog delay device(s) to coordinate the timing differences. Such analog delay device(s) must be continually maintained. Furthermore, the prior art video switcher is fixed at a number of ME units that can be connected together in series. Thus, a limitation is constrained by the video switcher of the prior art.

SUMMARY OF THE INVENTION

A digital video processing system is disclosed. The system has means for generating a linear input signal representative of a linear transition. The system further has means for generating a first non-linear signal representative of a non-linear transition. The system has display means for displaying the first non-linear signal. Finally, the system has means for receiving the linear input signal and converts the linear input signal into the first non-linear signal.

BRIEF DESCRIPTION OF THE DRAWINGS

FIGS. 6A-6C are detailed block level diagrams of some of the components of the ME unit shown in FIG. 4.

FIGS. 7A-7C-3 are detailed block level diagrams of the key processor unit portion of the ME unit shown in FIG. 4.

FIG. 11 and FIGS. 11A-11C are circuits diagrams of a flip-flop module portion of the ME unit, shown in FIG. 6.

FIG. 14 and FIGS. 14A-14B are block level diagrams of a control panel unit shown in FIG. 1.

FIGS. 21(d & e) are the two modes of operation for the ME unit of the present system operating on the image shown in FIG. 21(c).

FIG. 26(a) is a circuit diagram of the generation of a start of field pulse in response to the detection of a vertical sync pulse in a video signal; FIG. 26(b) is a programmable counter in each of the control panel and system chassis which receives the start of field pulse.

FIGS. 27A-27A4 are top level block diagrams of the wipe generator; FIGS. 27(b1-E3) are detailed block level diagrams of the wipe generator shown in FIG. 27(a).

DETAILED DESCRIPTION OF THE DRAWINGS

As previously stated, this application is filed with a microfiche appendix listing various software programs used in the processors to be described hereinafter. The software is written primarily in the C language. Exhibit H is a listing of the INCLUDE statements that normally accompany a C language program. The executable version of the various programs would include the statements/instructions of Exhibit H.

Figure 1:
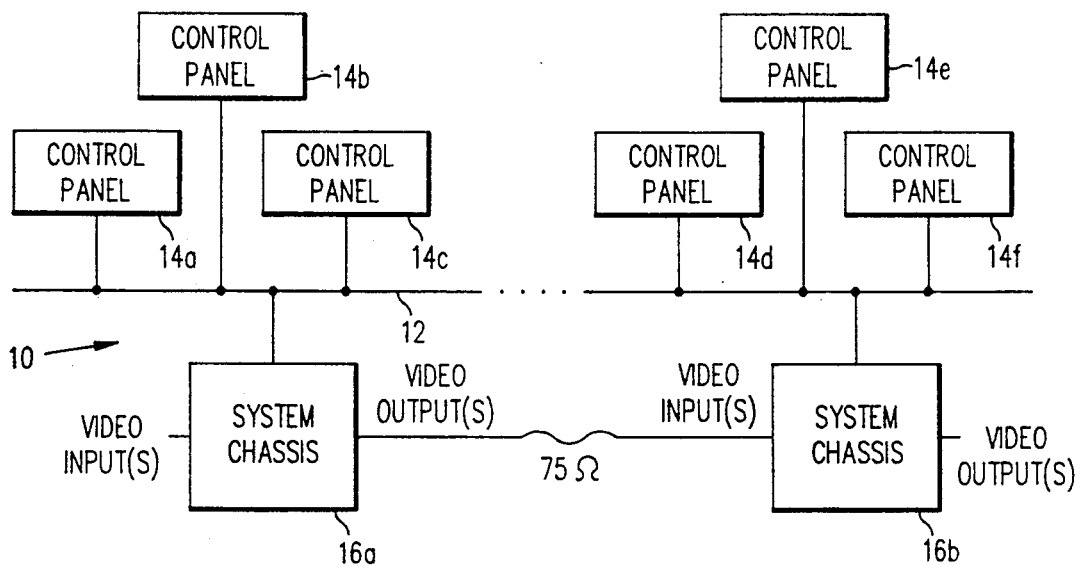
FIG. 1 is a schematic block level diagram of a modular digital video processing system having a communication bus, one or more control panels, and one or more system chassis connected to the communication bus.

Referring to FIG. 1 there is shown a block diagram of a video processing system 10. The video processing system 10, in the preferred embodiment, is a digital video switching apparatus 10. The video processing system 10 comprises a communication bus 12. The video processing system 10 also comprises one or more control panels 14(a-f) each of which is connected to the communication bus 12. The video processing system 10 also comprises one or more system chassis 16(a-b) each of which is also connected to the communication bus 12. The one or more control panels 14(a-f) controls the one or more system chassis 16(a-b) through the communication bus 12.

Figure 2:
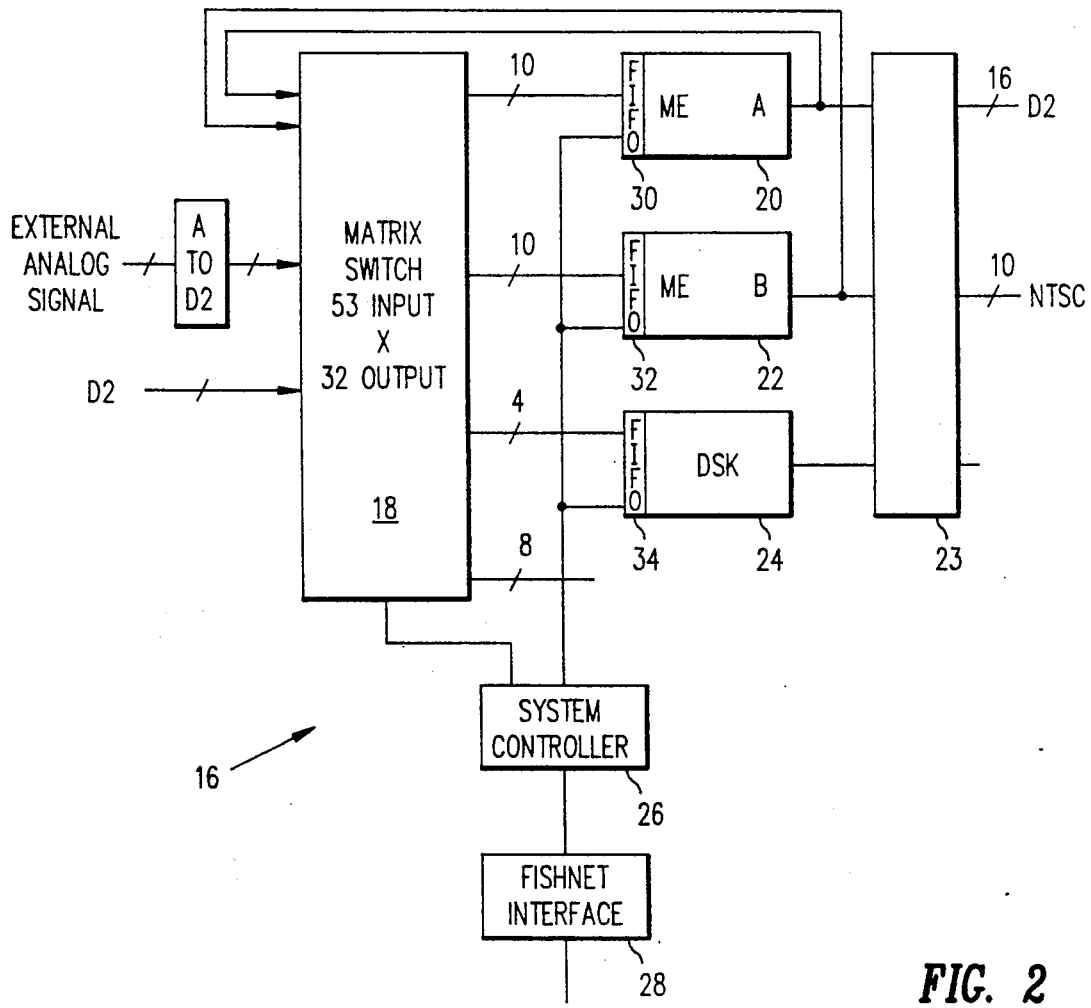
FIG. 2 is a schematic block level diagram of the system chassis shown in FIG. 1.

Referring to FIG. 2, there is shown in greater detail the system chassis 16. The system chassis 16 comprises a matrix switch 18, The matrix switch 18 receives 53 input video signals and provides 32 output video signals therefrom. The type of inputs which can be received by the matrix switch 18 and the type of output which can be provided by the matrix switch 32 will be discussed hereinafter.

The system chassis 16 also comprises a first mix effect unit 20 (designated: ME A) and a second ME unit 22 (designated: ME B). In addition, the system chassis 16 comprises a Down Stream Keyer (DSK) unit 24. The ME units 20 and 22 and the DSK unit 24 receive the output video signals from the matrix switch 18. Associated with each ME unit 20 and 22 and the DSK unit 24 is a variable depth First-In First-Out (FIFO) memory unit 30, 32 and 34 respectively whose depth can be changed and controlled. The video signal to each ME unit 20 and 22 or DSK unit 24 is first supplied to the adjustable FIFO, the output of which is then supplied to the associated ME or DSK unit. The system chassis 16 also comprises a system controller 26. The system controller 26 controls the FIFO memory units 30, 32, and 34, and the matrix switch 18, and is in communication with a FISHNET interface 28 which is the interface to the communication bus 12.

Since the amount of delay of a video signal in each of the FIFO units 30, 32, and 34 can be adjusted, the amount of delay of the video signal supplied as input to each ME unit can be controlled. Further, since the output of each ME or DSK unit can be routed back as an input to the matrix switch 18, or as an input to another system chassis 16, the number of ME or DSK units operating serially on a single video signal can also be controlled. Thus, the system 10 provides great flexibility in controlling the timing of the operation by each ME unit and in controlling the amount of processing, i.e. number of ME units acting on the video signal.

In the video processing system 10, up to six system chassis 16 and eighteen control panels 14 may be connected on to the communication bus 12 simultaneously. Each of the ME units 20 and 22 and the DSK unit 24 (a DSK unit 24 is like a ME unit 20), can be controlled by a control panel 14. Alternatively, a single control panel 14 can control plurality of ME units 20 or 22 (including a DSK unit 24). The control panels 14 and the system chassis 16 communicate along the communication bus 12 in an a priori determined time period. Each of the control panels 14 also has a FISHNET interface 28 associated therewith. The FISHNET interface 28 has hardwire preset switch settings which determine the time period in which the system chassis 16 or the control panel 14 associated with that FISHNET interface 28 is permitted to communicate with the communication bus 12.

Since each system chassis 16 has three ME units (or equivalent), each system chassis 16 can be controlled by up to three control panels 14(a-b). Thus, a control panel 14(a) can control an ME unit 20, a control panel 14(b) can control an ME unit 22 and a control panel 14(c) can control a DSK unit 24. Since each of these control panels 14 (a-c) communicate in an a priori determined time slot which must be different from one another with the communication bus 12, all three control panels 12 may operate apparently "simultaneously". Furthermore, as previously stated, a single control panel 14 can control a plurality of ME units which can all be in a single system chassis 16, or control a plurality of ME units in different system chassis 16.

The time slot allocated to each control panel 14 or system chassis 16 for communication with the communication bus 12 is a synchronous time slot allocated within the vertical interval of a video field of a video signal. The vertical field interval is chosen in order to insure that the communication between the control panel 14 and the system chassis 16 occurs synchronously.

The entire system 10 is synchronized to the vertical sync of a television field. A master system chassis 16 (if there is a plurality of system chassis 16, one of them is designated the master chassis) detects the vertical sync signal. When a vertical sync is detected, the master chassis 16 generates a field packet, which is distinguished from other data by its length, and transmits on the communication bus 12. This packet is used to encode a "start of field pulse". Each control panel 14 and system chassis 16 connected to the communication bus 12 receives this "start of field pulse". By virtue of a counter in its associated FISHNET interface unit 26, and by virtue of the unique network address assigned to the interface unit 26, the control panel 14 and system chassis 16 then assumes the preselected time slot when the counter reaches the appropriate value. At which time, the control panel 14 is able to broadcast and the system chassis 16 can receive.

In the preferred embodiment, the communication bus 12 is a 75 ohm coaxial cable, which is commonly found in television studios. Further, the FISHNET interface is a variation of the well known ETHERNET protocol. As will be discussed, the only difference between the FISHNET protocol and the ETHERNET protocol is the interface with the 75 ohm coaxial cable. In the ETHERNET protocol, communication is affected over a 50 ohm coaxial cable. Further, unlike the ETHERNET protocol, since communications are allocated in a priori determined time slots, collisions on the communication bus 12 are avoided by time a location.

Figure 3:
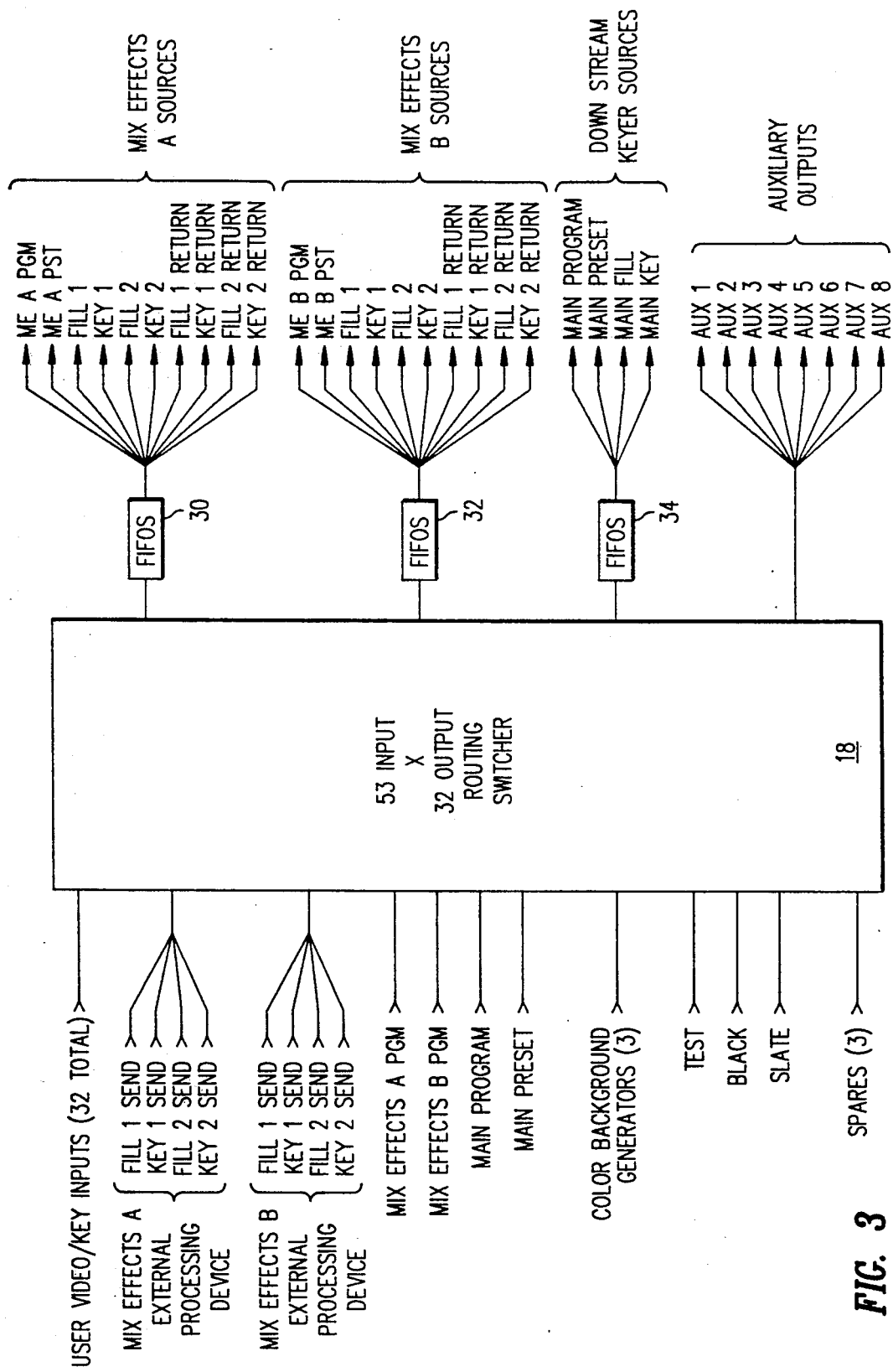
FIG. 3 is a detailed block level diagram of the preferred embodiment of the matrix switch shown in FIG. 2.

Referring to FIG. 3, there is shown a block level diagram of the matrix switch 18. As previously discussed, the matrix switch 18 receives 53 input video signals and provides 32 output video signals therefrom. The 53 inputs to the matrix switch 18 are:
User/Video key inputs (32 inputs);
External Processing Signal from ME unit 20:
  Fill 1 send;
  Key 1 send;
  Fill 2 send;
  Key 2 send;
External Processing Signal for ME unit 22:
  Fill 1 send;
  Key 1 send;
  Fill 2 send;
  Key 2 send;
Output of ME unit 20;
Output of ME unit 22;
Main program;
Main preset;
Color background generator (CBG) (3 inputs);
  (From ME A CBG)
  (From ME B CBG)
  (From DSK CBG)
Test;
Black;
Slate;
Spares (3 inputs).

The 32 user video/key inputs can be any combination of video and/or key signals. As previously stated, a key signal is a video signal which is to be superimposed on top of a video signal indicating the position within the image represented by the video signal which is to be replaced by the fill signal. The 32 inputs can be any combination of D2 inputs, which are standard industry recognized parallel format digital composite video signals. In addition, the 32 inputs can also be analog inputs which can be analog composite color television signals such as NTSC or analog color component signals such as RGB. The analog color composite signals such as NTSC are converted to D2 parallel format digital video signal. The conversion of the analog color component signals, such as RGB, will be described herein after.

The matrix switch 18 serves to route some of the 53 input signals as the 32 output signals therefrom. The 32 possible output signals from the matrix switch 18 are as follows:
For each ME unit 20 and 22:
  ME program;
  ME preset;
  Fill 1 signal;
  Key 1 signal;
  Fill 2 signal;
  Key 2 signal;
  Fill 1 return signal;
  Key 1 return signal;
  Fill 2 return signal;
  Key 2 return signal.
For the DSK unit 24:
  Main program;
  Main preset;
  Main fill;
  Main key;
Eight auxiliary outputs.

Each of the plurality of ten digital signals is first supplied to a variable depth FIFO units 30 or respectively. From the variable depth FIFO units 30 and 32, the signals are then supplied to the associated ME unit. The four digital video signals supplied to the DSK units 24 are also first supplied to a variable depth FIFO 34 unit, with one FIFO for each of the signals. From the FIFO unit 34, the four signals are supplied to the DSK unit 24. The output of the ME units 20, 22 and the DSK unit 24, form the output of the system chassis 16. The video outputs from a system chassis 16 may be then supplied as input to a second system chassis 16b, through a 75 ohm coaxial cable or a D-2 parallel cable, and into its video input thereof.

The output of the system chassis Am can be 16 D2 outputs and 10 NTSC analog outputs. The 16 D2 outputs are:
  8 user assignable auxiliary bus outputs;
  2 main program outputs from the ME unit 20;
  2 main program outputs from the ME unit 22;
  2 main program outputs from the DSK unit 24;
  1 main preset source output from the DSK unit 24; and
  A digitized reference provides for the optional analog to digital converter circuitry.

The NTSC analog outputs are:
  2 main program outputs from the ME unit 20;
  2 main program outputs from the ME unit 22;
  2 main program outputs from the DSK unit 24;
  1 main preset source monitor output;
  1 flip-flip mixer output;
  1 utility monitor output, which acts as a "roving" preview, displaying a full size, full color output of the selected ME unit or keyer;
  1 status monitor output, displaying up to nine realtime reduced size pictures which can show the various ME video set up conditions.

Figure 4:
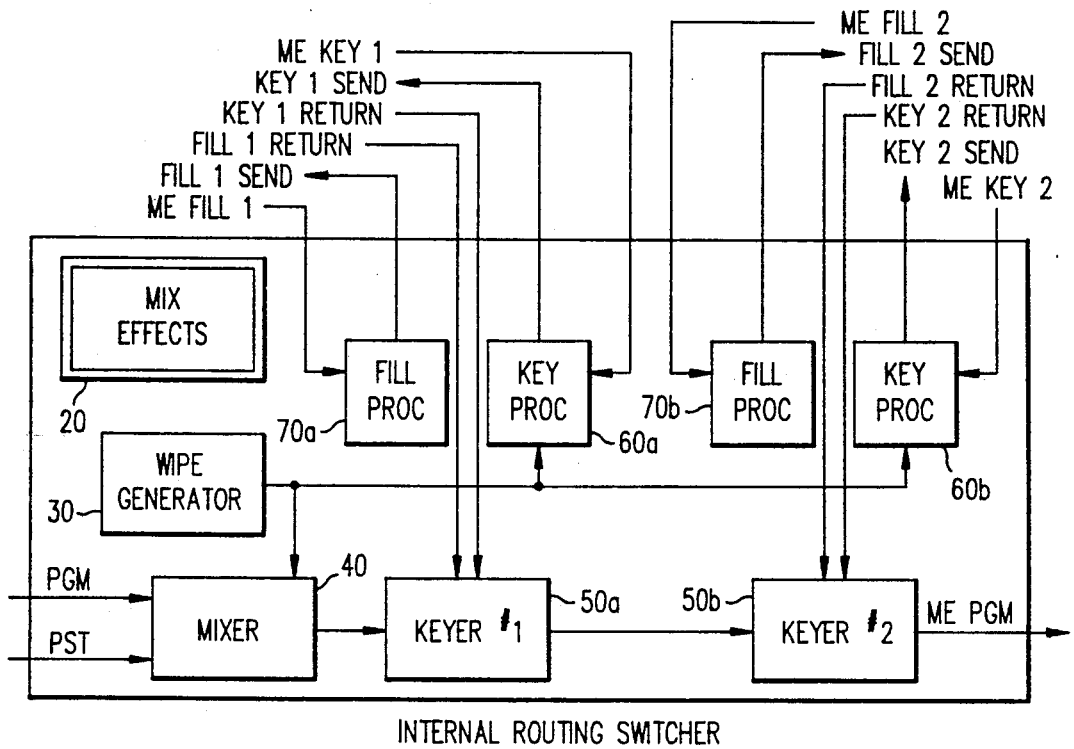
FIG. 4 is a block level diagram of a ME unit shown in FIG. 2.

Referring to FIG. 4, there is shown a detailed block level diagram of an ME unit 20. As previously stated, the ME unit 20 and ME unit 22 are identical.

The ME unit 20 comprises a wipe generator 30 which generates wipe pattern size, aspect ratio, rotation, and perspective. The switch transition can have a variable thickness border. The border can be filled with a color furnished by the wipe border color generator 87. In addition, the wipe transition edge is variable from hard to soft on both the outside and inside edge of the wipe pattern. The wipe generator 30 is shown in greater detail in FIGS. 27(a-f). The wipe generator comprises in part a Motorola 68000 processor 31, running the executable version of the program set forth in Exhibit I.

The ME unit 20 also comprises a mixer 40 which receives the output of the wipe generator 30 and the main program and the preset bus video. The mixer 40 is capable of mixing the selected main program and the preset bus video and generates an output signal therefrom.

The output signal from the mixer 40 is supplied to a keyer #1 50a. Keyer #1 is also supplied with the key 1 return signal and fill 1 return signal. The output of the keyer #1 50a is supplied to a keyer #2 50b, which is identical to the keyer #1 50a. The keyer #2 50b also receives a key 2 return signal and a fill 2 return signal. The output of the keyer #2 50b is the ME program video signal, which is the output of the ME unit. Thus, each ME unit has a mixer 40 and two identical keyers #1 and #2 (50a and b).

Each of the keyer units 50(a & b) inserts new scene content (foreground) into existing scene contents (background). The boundary between the foreground and the background is determined by the associated key signal. Thus, the key signal for the keyer #1 unit 50a is the ME key 1 signal. The associated key signal can be modified by a key processor 60 (described hereinafter). The fill video signal determines the scene content inserted in the foreground in the location specified by the key signal. The fill signal can be modified by the fill processor 70, described hereinafter. In one mode of operation, the output of the mixer 40 is supplied to the keyer #1 50a as the background scene content. The output of the keyer #1 50a is supplied as the background scene content for keyer #2 50b. As will be seen, each ME unit has a second mode of operation permitting the output of the mixer 40 to be used as a foreground signal.

The key processor 60 can modify the key signal in a variety of ways. If a composite video signal (a signal containing encoded color) is used as the key source, a switchable 3.58 MHz digital notch filter suppresses chrominance artifacts. A key clip and gain control circuit is also located in the key processor 60. The output of a luminance compositing frame store can modify the shape of the key signal fed to the key processor 60. Alternatively, the key signal content can be modified by a key mask generator.

Each of the fill processors 70 can add a border to the fill video signal. Nine border positions are available. Border positions include total surround plus eight compass points. The size of the border is variable and is set in 7 steps. The border color is continuously variable as is the border opacity.

When external processing device routing is desired, the output of the key processor 60 (key 1 or key 2 send signal) is supplied to the external processing device. From the external processing device, the key 1 or key 2 return signal is then sent back into the ME unit. Similarly, the output of the fill processor 70 (fill 1 or fill 2 send signal) is supplied to the external processing device. From the external processing device, the fill 1 or fill 2 return signal is then resupplied back to the ME unit.

In the event external processing device routing is not available (normally none is available), the key 1 send signal is supplied back as the key 1 return signal to the keyer 50a. Fill 1 send signal is supplied back to the fill 1 return signal into the keyer 50a. Similarly, the key 2 send signal is routed back into the key 2 return signal, and the fill 2 send signal is routed back into the key 2 return signal for the keyer 50b.

Figure 5:
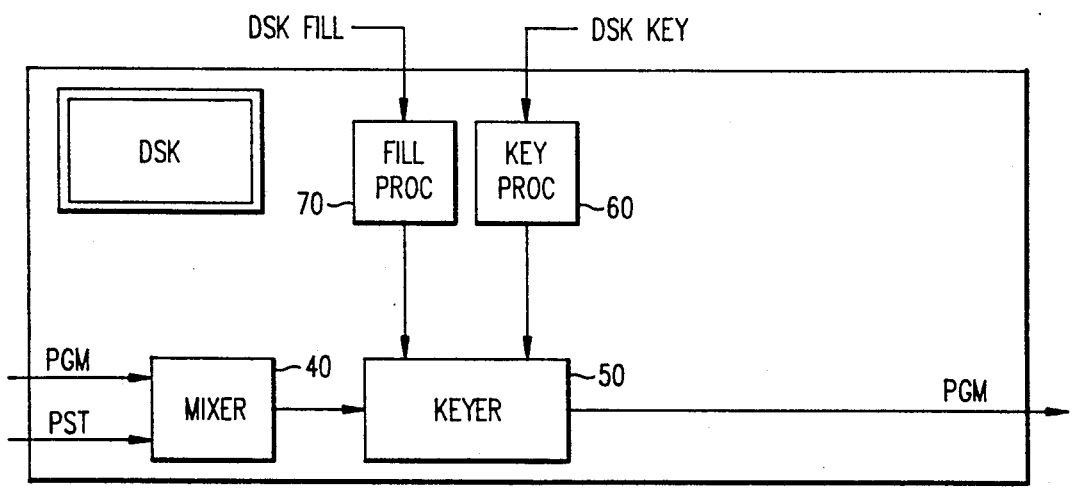
FIG. 5 is a block level diagram of a down stream keyer (DSK) unit shown in FIG. 2.

Referring to FIG. 5 there is shown a block level diagram of the DSK unit 24. The DSK unit 24 has 1 mixer 40, and 1 keyer 50. The keyer 50 has an associated key processor 60 and fill processor 70. The mixer 40 and the keyer 50 are identical to those of the mixer 40 and keyer 50 shown in an ME unit, except there is a single keyer and external processing device routing is not available. The DSK key signal is supplied to the key processor 60 which is then supplied to the keyer 50. The DSK fill signal is supplied to the fill processor 70 which is then supplied to the keyer 50. The output of the keyer 50 is the program output signal from the DSK unit 24.

Figure 6B:
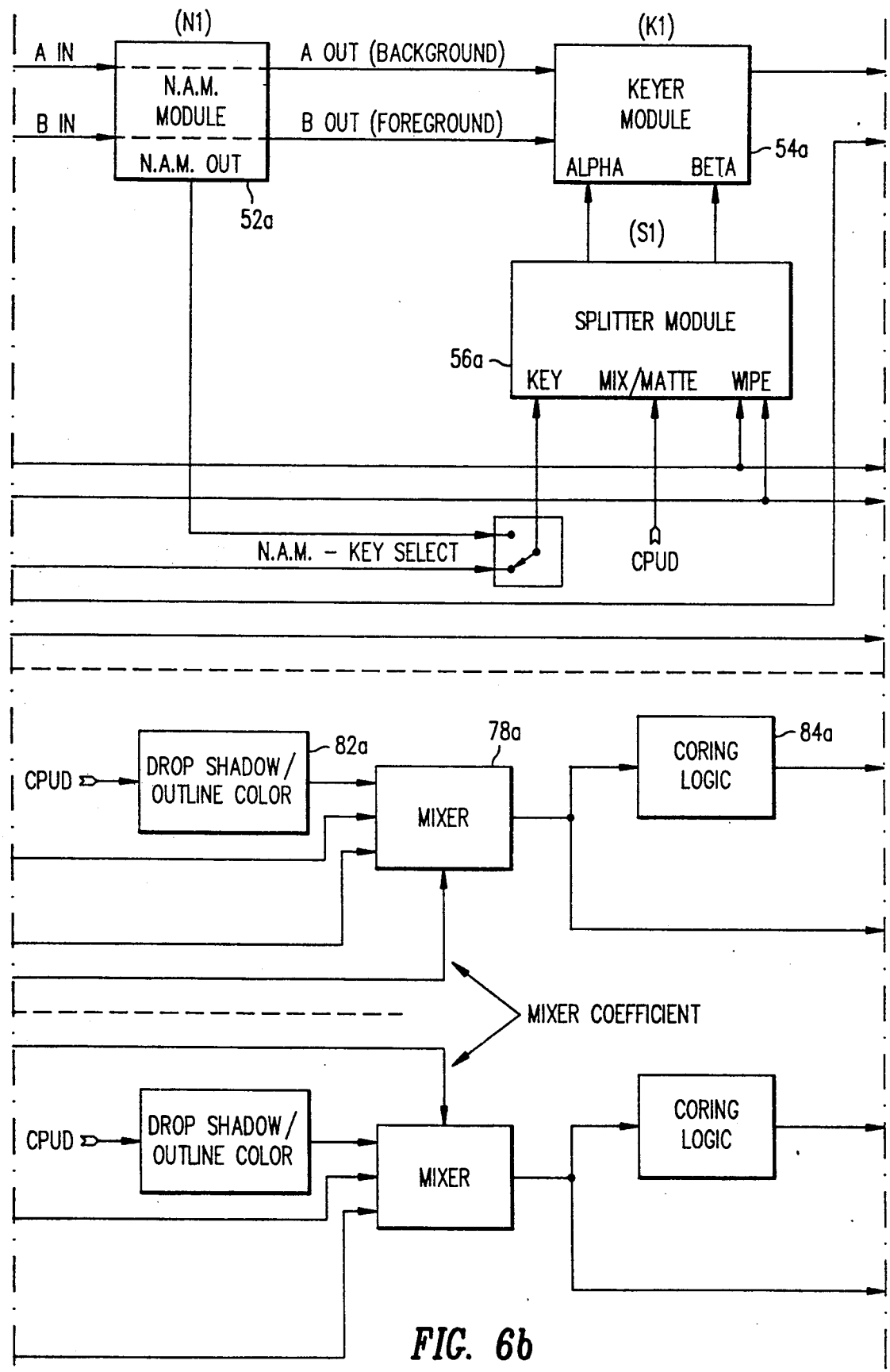
Figure 6C:
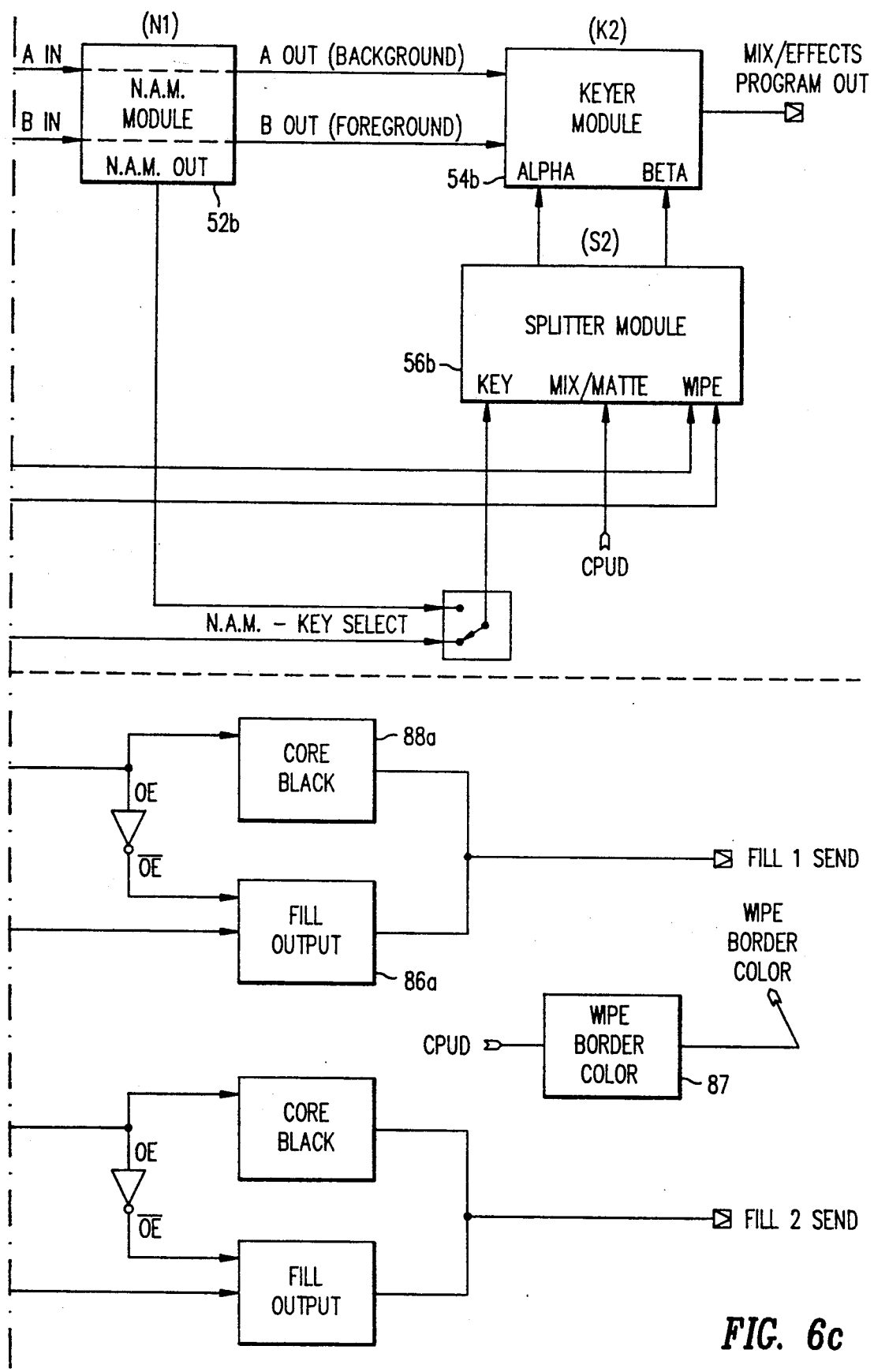
Figure 9:
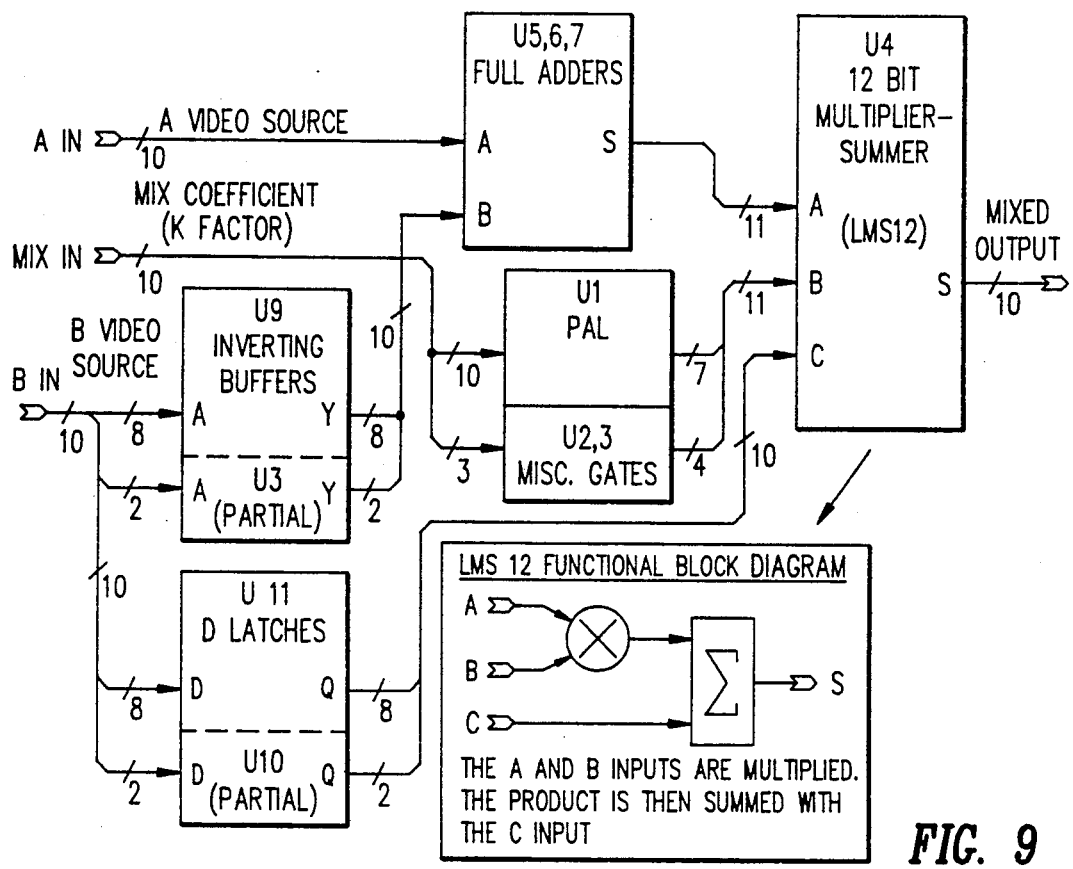
FIG. 9 is a detailed block level diagram of a mixer module portion of the ME unit shown in FIG. 6.
Figure 11B:
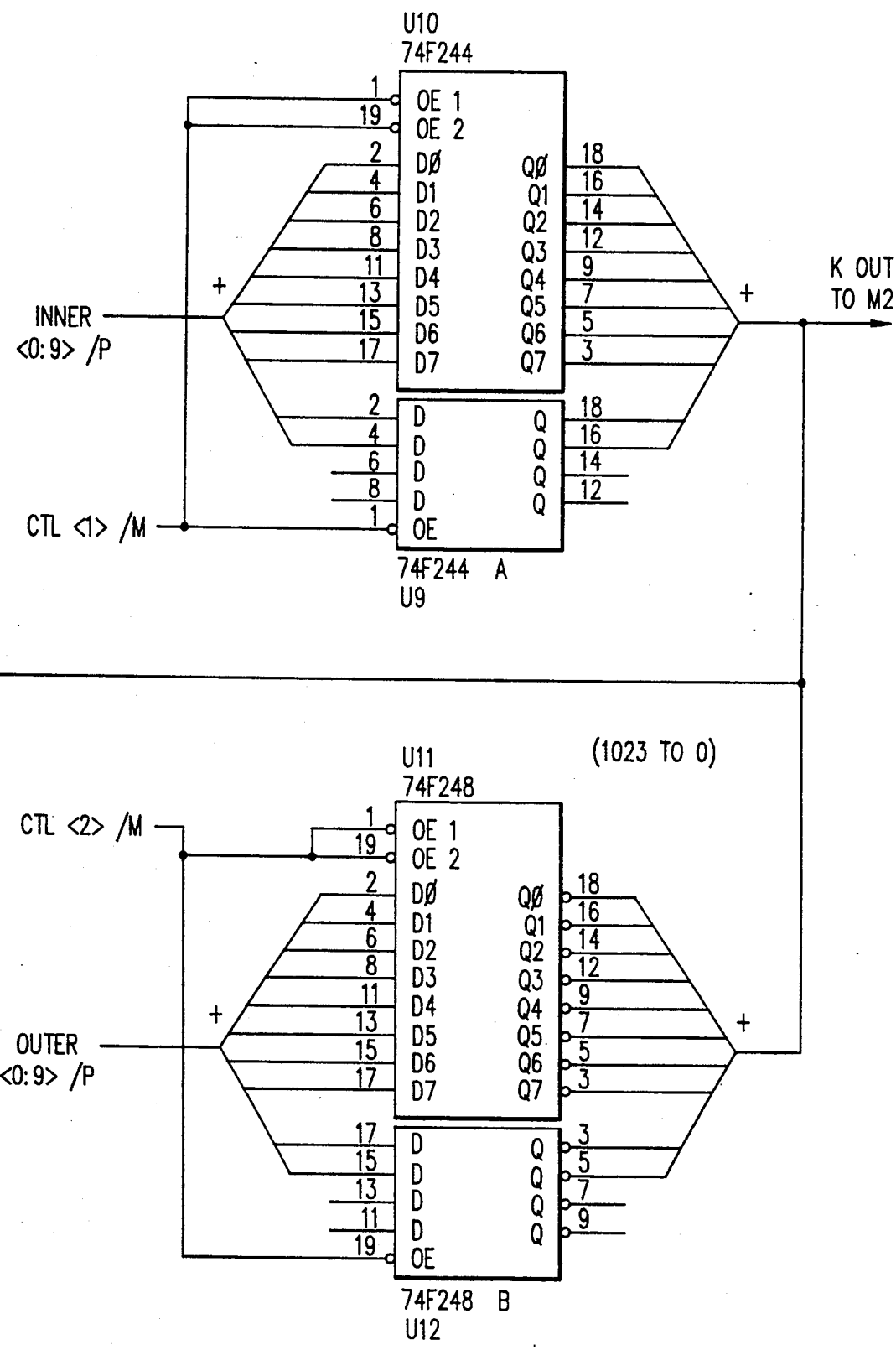
Figure 11C:
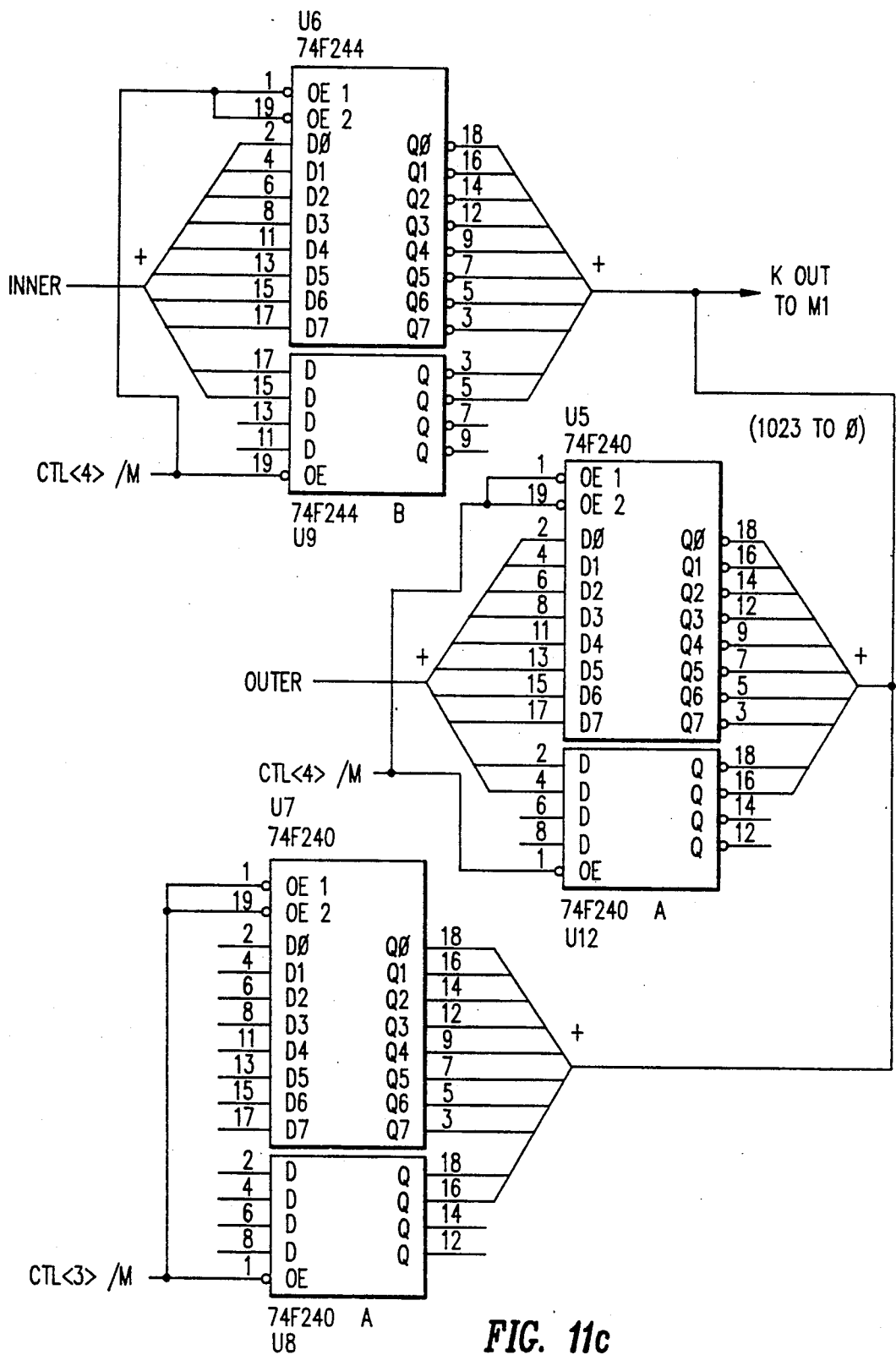

Referring to FIG. 6, there is shown in greater detail, a block level diagram of an ME unit 20. The mixer 40 comprises two identical mixer modules 42(a and b) and a flip-flop module 44. The first mixer module 42a receives a wipe border color signal and the program video signal, and a mix coefficient signal from the flip-flop module 44. The output of the first mixer module 42a is supplied to the second mixer module 42b to which the preview video signal is also supplied. In addition, the mix coefficient signal from the flip-flop module 44 is also supplied to the second mixer module 42b. Each of the mixer modules 42a and 42b is shown in greater detail in FIG. 9. The flip-flop module 44 is shown in greater detail in FIG. 11. The output of the second mixer module 42b is then supplied to the first keyer unit 50a.

Figure 10:
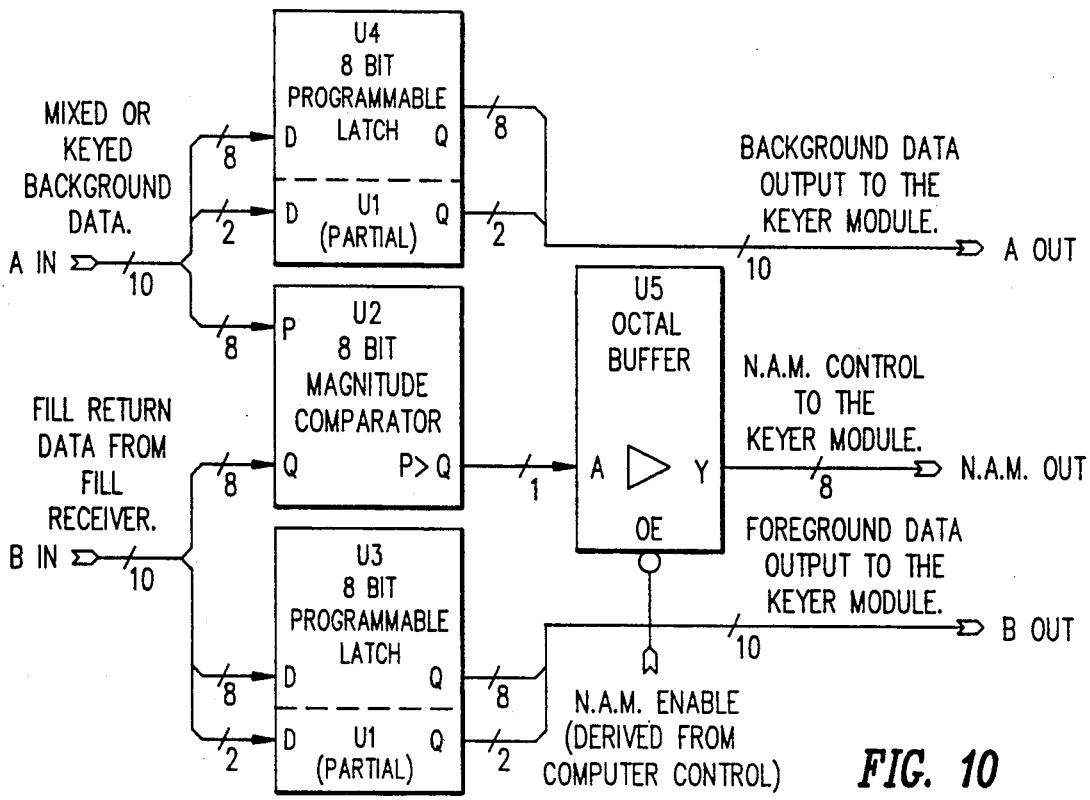
FIG. 10 is a detailed block level diagram of a nonadditive mix (NAM) module portion of the ME unit, shown in FIG. 6.

The first keyer unit 50a comprises a non-additive mix (NAM) unit 52a, a keyer module 54a and a splitter module 56a. The NAM unit 52a, shown in greater detail in FIG. 10, receives the output of the second mixer module 42b and the fill 1 return signal. The NAM module 52a compares the instantaneous amplitude of the foreground and background video data. The signal which has the highest amplitude is keyed into the foreground. The NAM module 52a is activated and takes the place of the normal key signal when the NAM mode is selected. The output of the NAM module 52a comprising of a background video signal and a foreground video signal which are supplied to the keyer module 54a.

Figures 8, 8A:
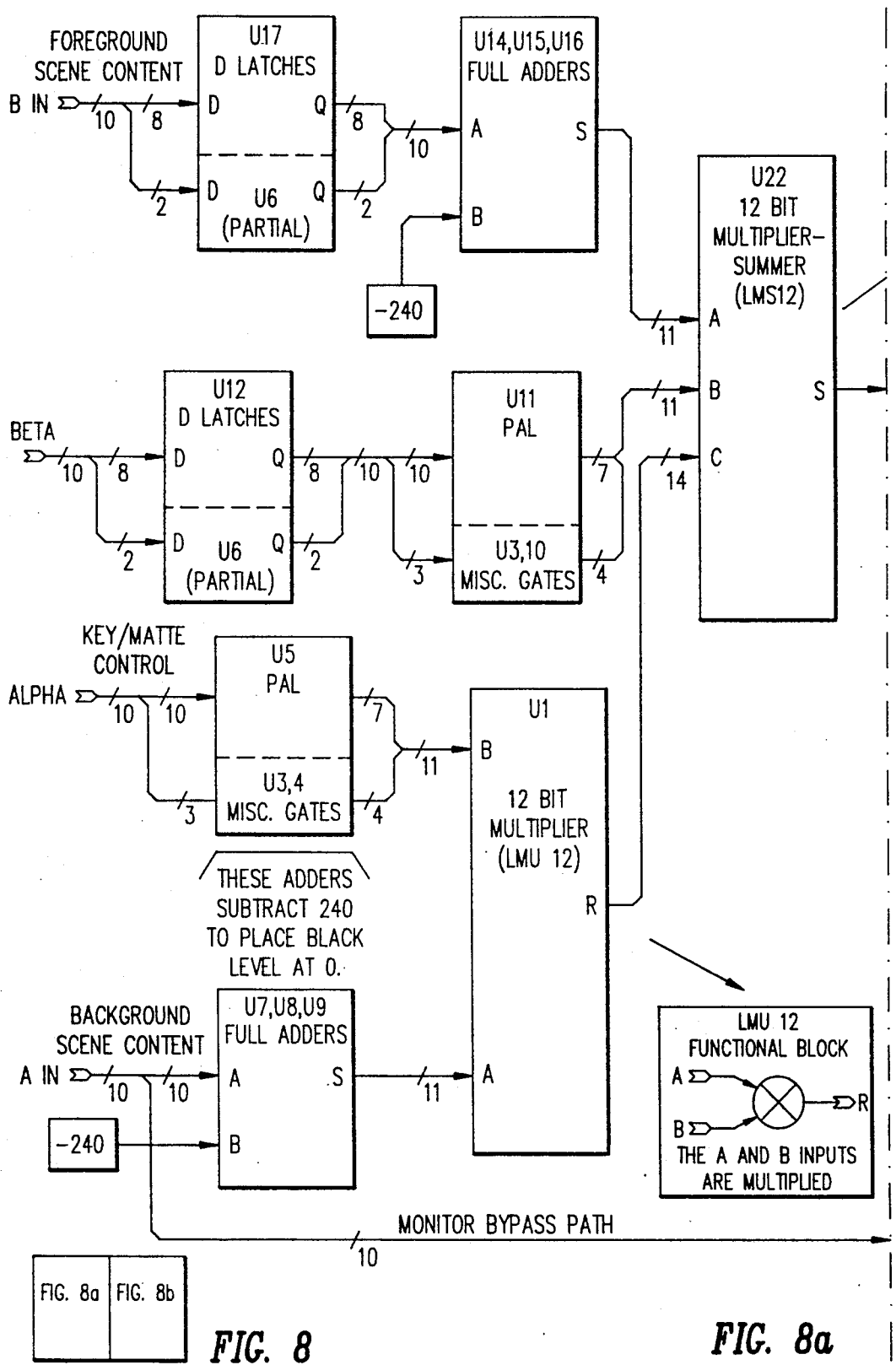
FIG. 8 and FIGS. 8A and 8B are detailed block level diagrams of a keyer module portion of the ME unit, shown in FIG. 6.
Figure 8B:
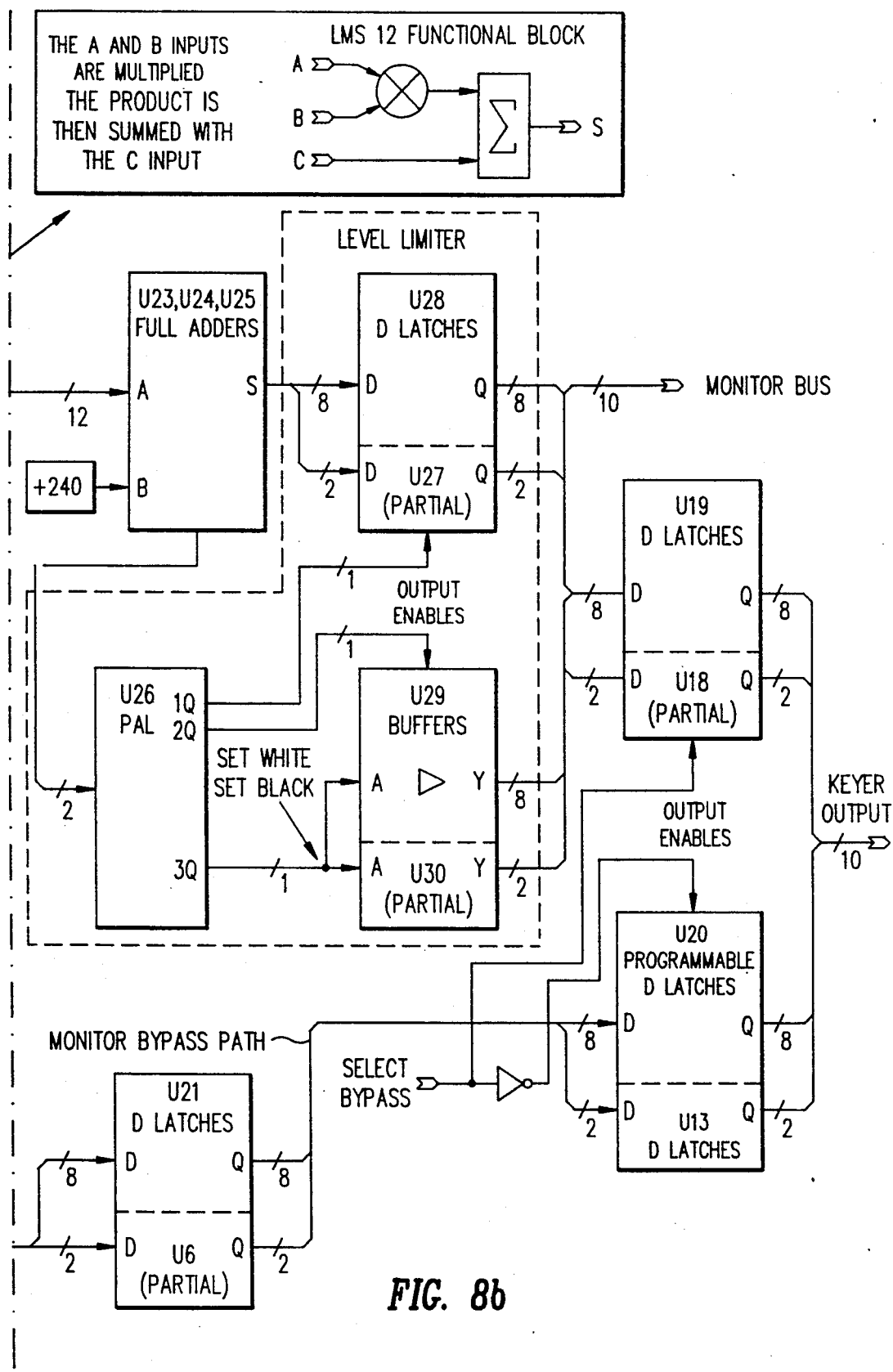

The keyer module 54a also receives two signals from the splitter module 56a. The keyer module 54a keys foreground video signal over the background video signal in the key mode. The foreground video signal is added with the background video signal in a matte mode. The keyer module 54a is shown in greater detail in FIG. 8. The output of the keyer module 54a is supplied to the second keyer unit 50b. Since the second keyer unit 50b is identical to the first keyer unit 50a, the second keyer unit 50b comprises a NAM module 52b, a keyer module 54b and a splitter module 56b, all identical to the NAM module 52a, keyer module 54a, and splitter module 56a, respectively.

Figures 12, 12A:
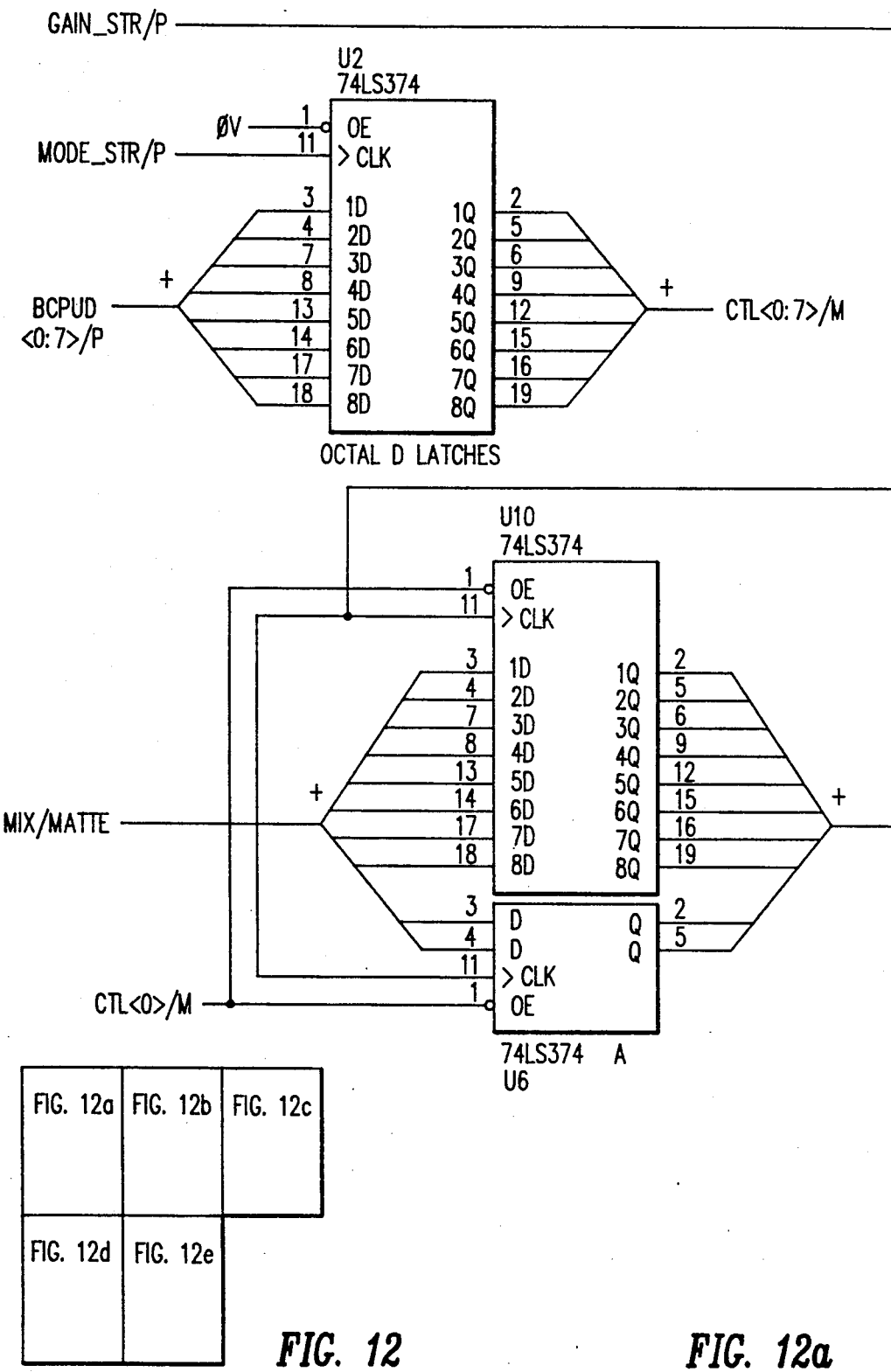
FIG. 12 and FIGS. 12A-12E are circuit diagrams of a splitter module portion of the ME unit, shown in FIG. 6.
Figure 12B:
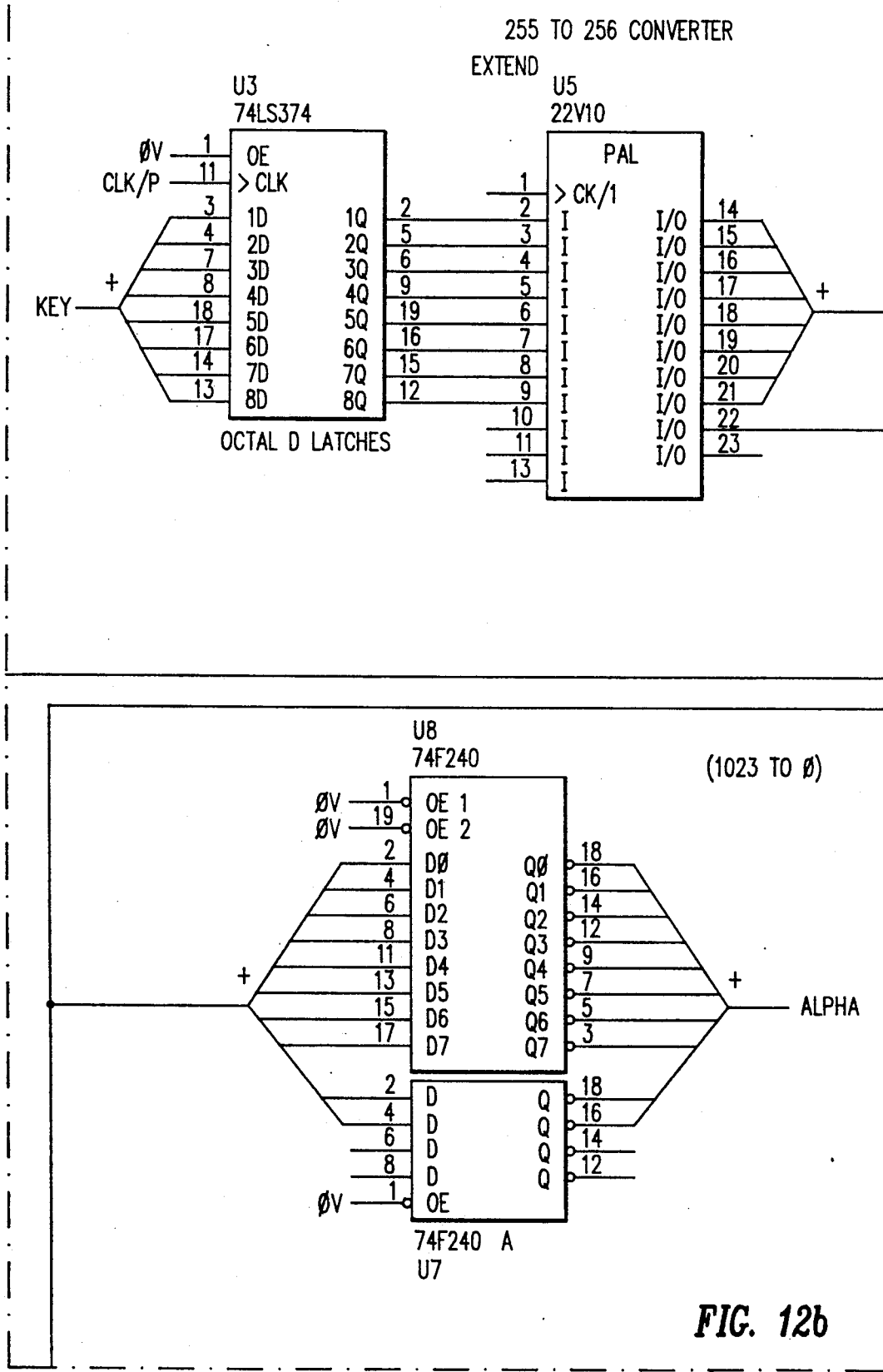
Figure 12C:
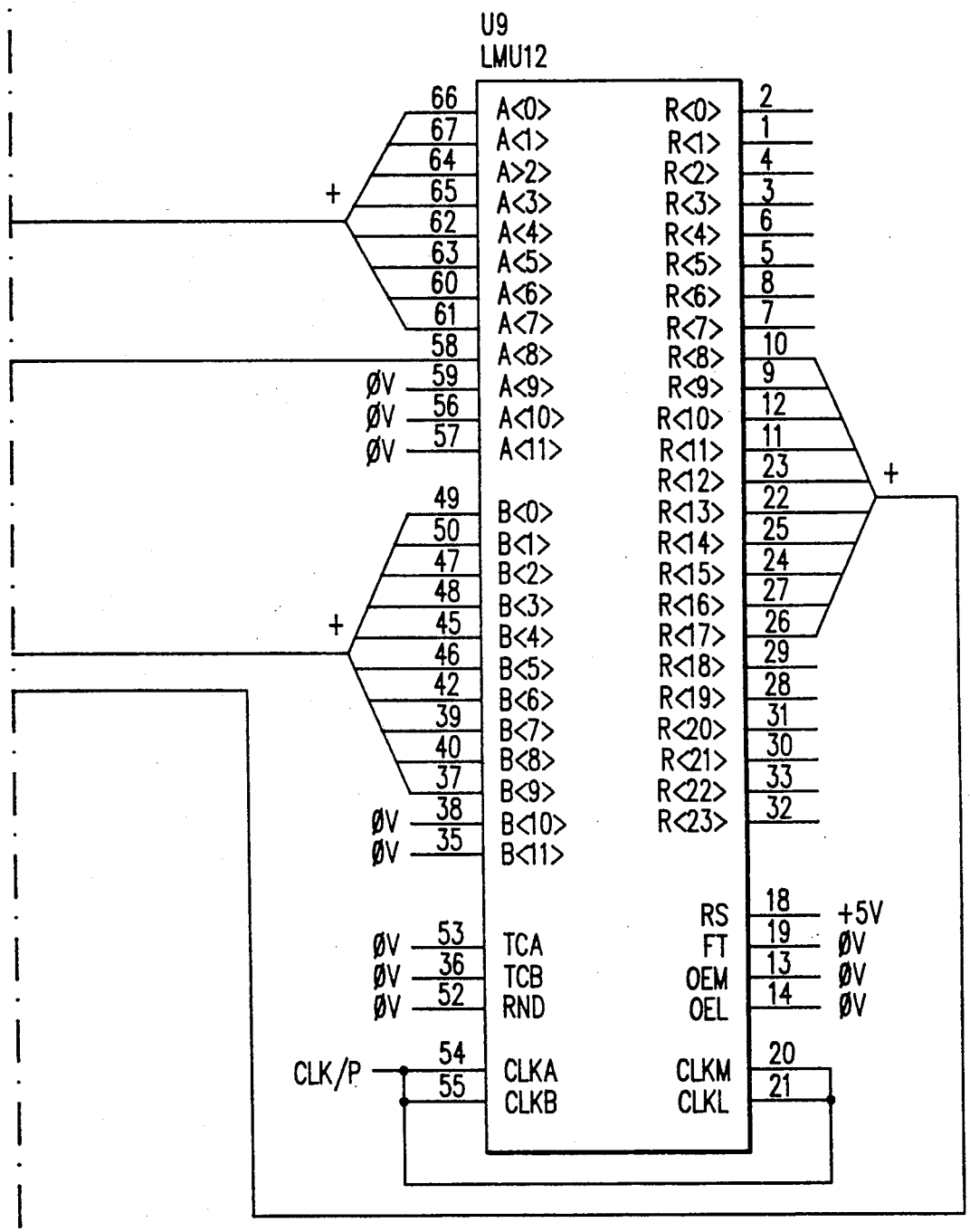
Figure 12D:
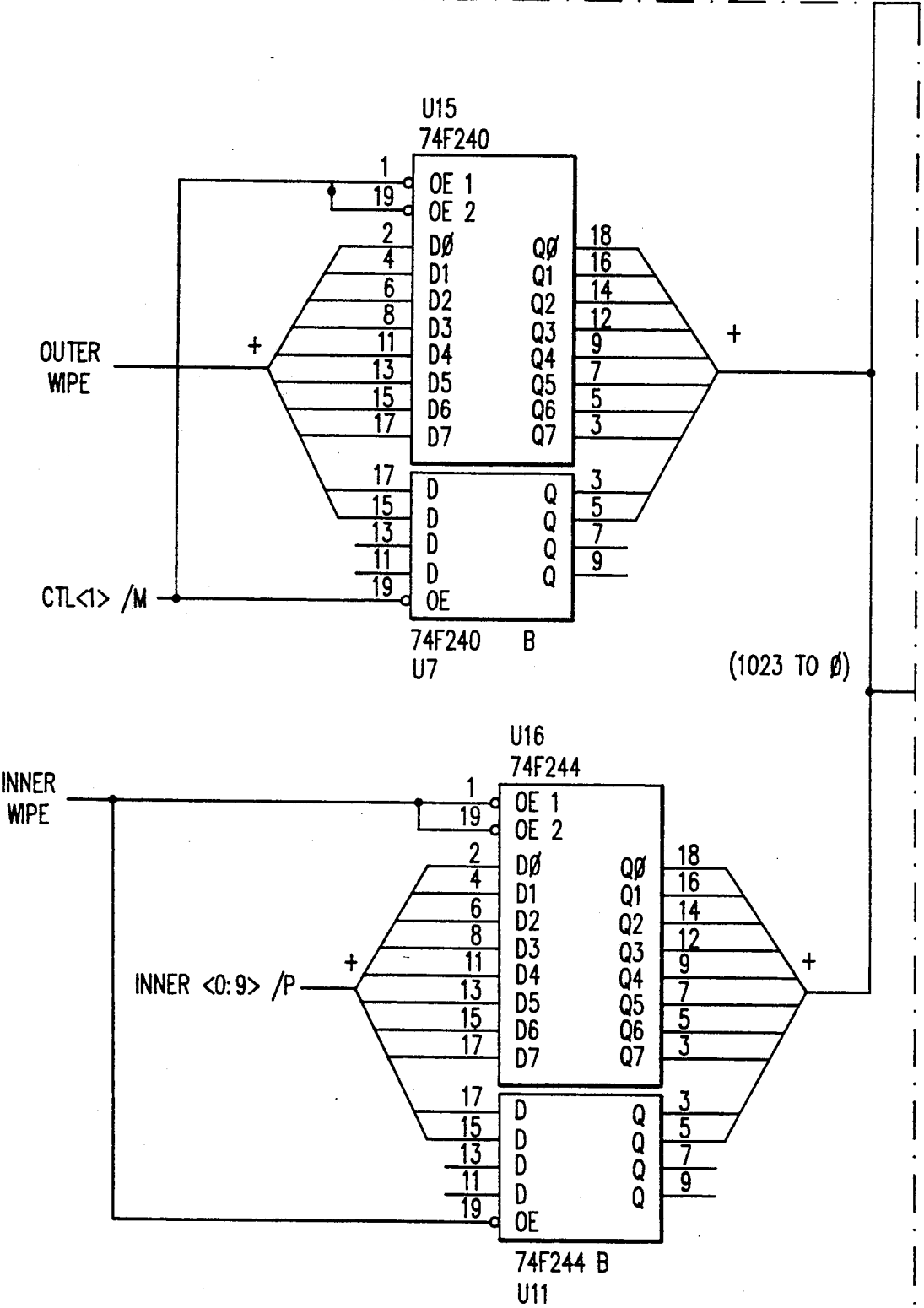
Figure 12E:
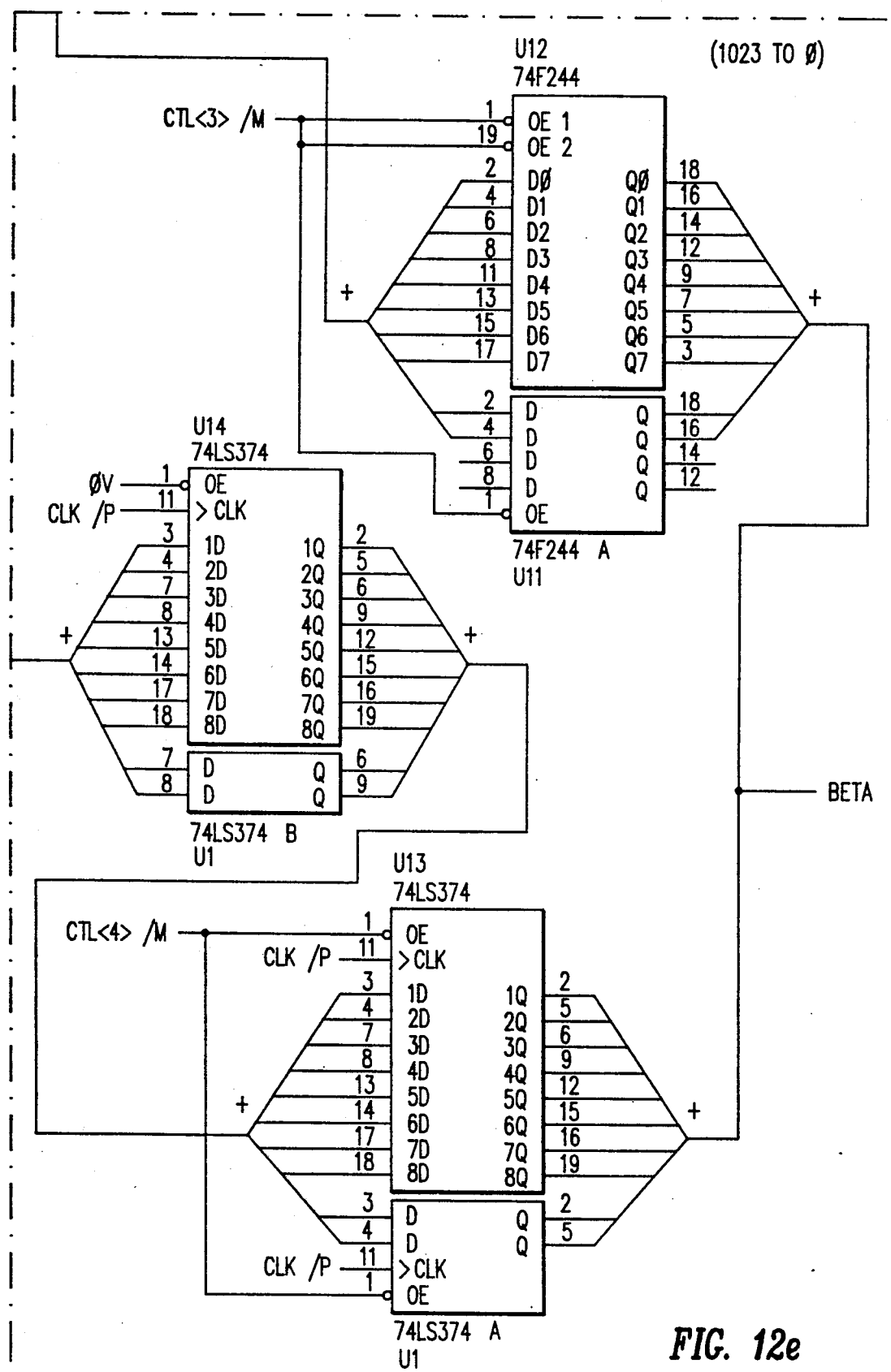

The splitter module 56a receives the key signal either as the key 1 return signal or as the output of the NAM module 52a. In addition, it receives the mix/matte signal, and the wipe pattern data signal. The splitter module 56a is shown in greater detail in FIG. 12. The splitter module 56a provides the appropriate control levels derived from either the wipe generator 30 or mix coefficients.

Referring to FIG. 6 there is also shown a block level diagram of a first fill processor 70a and a second fill processor 70b which are identical. The first fill processor 70a comprises a color fill unit 72a which is a computer loaded 4-bit deep memory register. The first fill processor 70a also comprises a fill position unit 74a which receives the fill 1 video signal. The fill position unit 74a comprises a multiple line FIFO memory which positions the fill video signal according to the drop shadow/outline position. The output of the first fill position 74a and the color fill unit 72a are both supplied to a switch 76a which has as its output thereof, either the fill or color fill select.

The output of the switch 76a is supplied to a mixer 78a. The mixer 78a is also supplied with the signal from the switch 76a, having been inverted and supplied through a second switch 80a which selects either the inverted select fill data or ground as selected by the chroma key—the background replaced/modify select signal. The mixer unit 78a has as another of its inputs the mixfill 1 signal which provides the mixer coefficient to the mixer unit 78a. In addition, the mixer unit 78a also receives the output of the drop shadow/outline color unit 82a. The drop shadow/outline color unit 82a is controlled by a computer loaded 4-bit deep memory register.

The output of the mixer unit 78a is supplied to a coring logic unit 84a. In addition, the output of the mixer unit 78a is supplied to a fill output unit 86a. The coring logic unit 84a is enabled during matte mode. Cored black levels result in cleaner mattes. The output of the coring logic unit 84a is supplied to a core black unit 88a and is also inverted and is supplied to the fill output unit 86a. The core black unit 88a is a data buffer which is preset to black levels. The fill output unit 86a is a fill video output latch. In the coring operation, a specific range of near black levels are examined. The coring logic unit 84a outputs an enable which turns on a preset black level for the range defined by the operator. The output of the core black unit 88a and the fill output unit 86a is then the fill 1 send signal.

In the preferred embodiment, the color fill 72a is a RAM with a look-up table which supplies a color signal. The fill position unit 74a is a FIFO having variable depth, for repositioning the Fill signal when used with the border generator. The drop shadow/outline color unit 82a is the same as the Color Fill Unit 72a except it provides a color signal specifically for the color of the border. The mixer unit 78a mixes the border color with the key fill video signal. The coring logic unit 84a and the core black unit 88a comprise a EPROM and a PAL logic circuit, which provides a black level clamp. For matte-type key signal, it is desirable to have a "clean" or stable black level. The core black unit 88a is a black generator, which generates a pseudo black level to replace the input signal selectively as defined by the coring logic unit 84a. Finally, the fill output 86a combines the output of the coring logic unit 84a and the black generator 88a.

Figures 2, 7B:
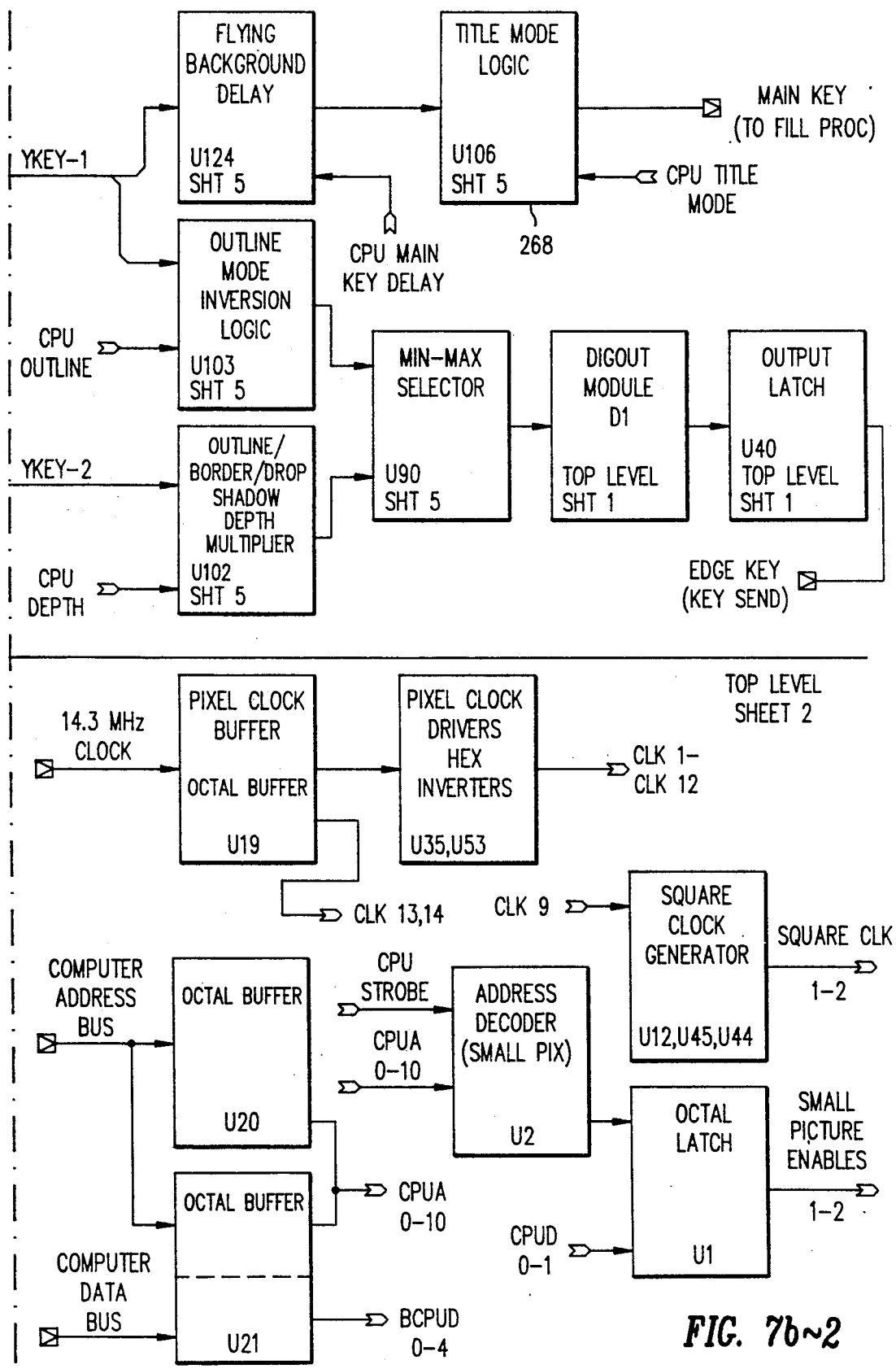
Figure 7C:
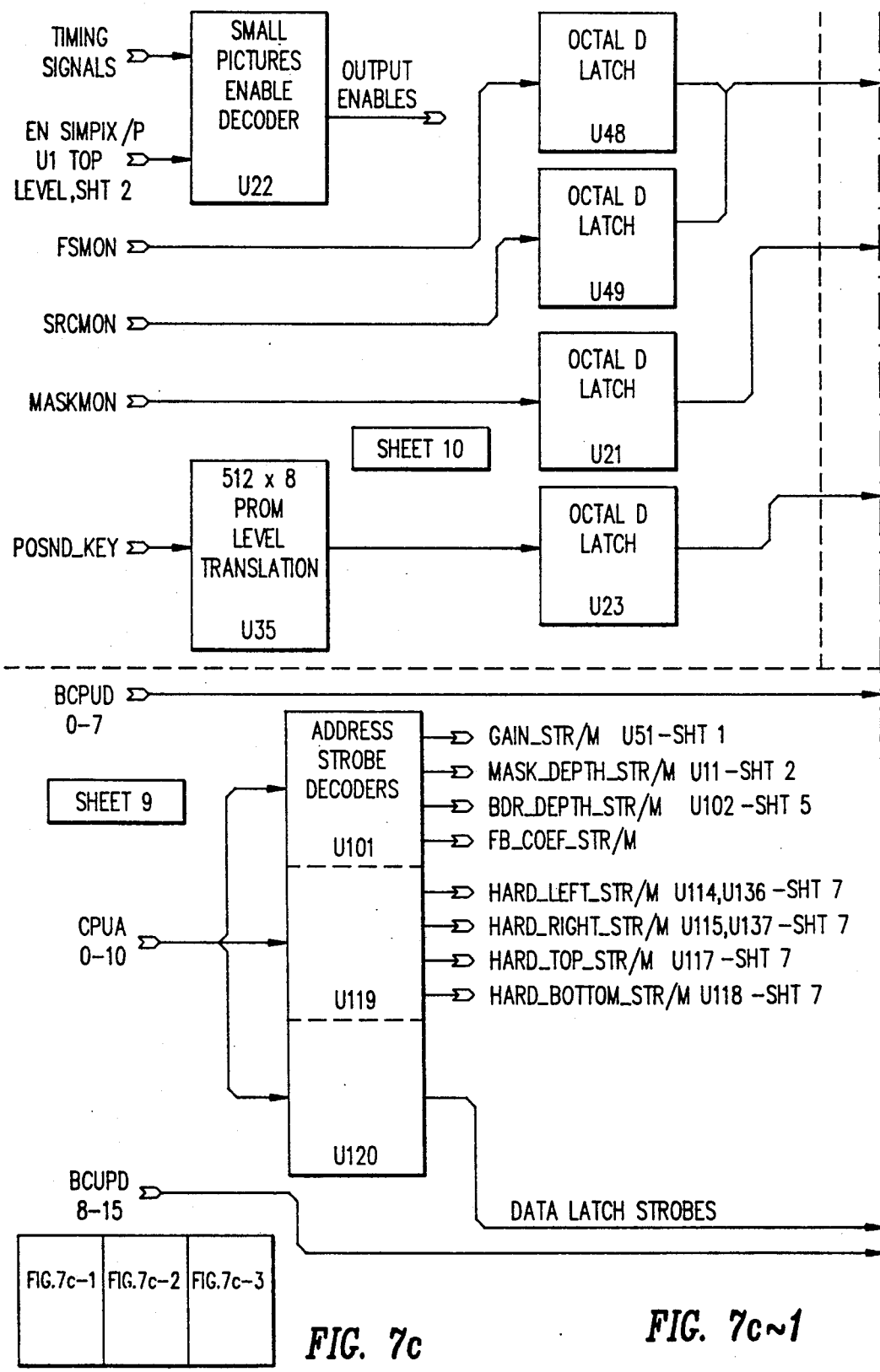

Referring to FIG. 7(a-c), there is shown a block level diagram of the key processor 60a. The key processor 60a receives a chroma key input signal, which is supplied to a select chroma key 92. The key processor 60a also receives the key signal input which is supplied to a 3.58 MHz notch filter 94. The output of the select chroma key unit 92 and the notch filter 94 is then supplied to a key clip and key gain/limiter 96 and 98 respectively. Thereafter, the signal is designated as the "signed key".

The key processor 60a also comprises a mask generator 250. From the mask generator 250, the mask signal is supplied to a mask source select multiplexer 252 to which the "signed key" signal is also supplied. The signed key signal or the signal from the box mask generator 250 is then supplied to a luminance compositing frame store 254. The frame store 254 is stores the signal supplied thereto, but is a frame delay which is continuously recirculated. The output of the luminance frame store 254 can be supplied to the min-max selector 256 which can combine the signal with additional input signal supplied thereto, and which can select the larger of the two signals. The output of the min-max selector is supplied to a mask polarity adjusting unit 258 and through a mask opacity multiplier 260. The mask opacity multiplier 260 allows the output to be multiplied and therefore control the luminance of the output. Thereafter, the signal can be interpolated and demultiplexed to produce the key a and key b signals.

From the key a signal, the horizontal outline/border/drop shadow signal is generated. Thereafter, the vertical outline/border/drop shadow signal is generated. The border signals are then supplied as the output "edge key signal" of the key processor 60.

The key b signal is then supplied to a main key delay unit 266 to which the timing signal is also supplied. The signal from the main key delay unit 266 is then processed by the title mode logic unit 268 which produces the main key signal which is sent to the fill processor 70.

Thus, the output of the key processor 60 is a signal which determines the location for the foreground image which is to be placed or superimposed on top the background image supplied to the keyer unit 50.

Figure 7D:
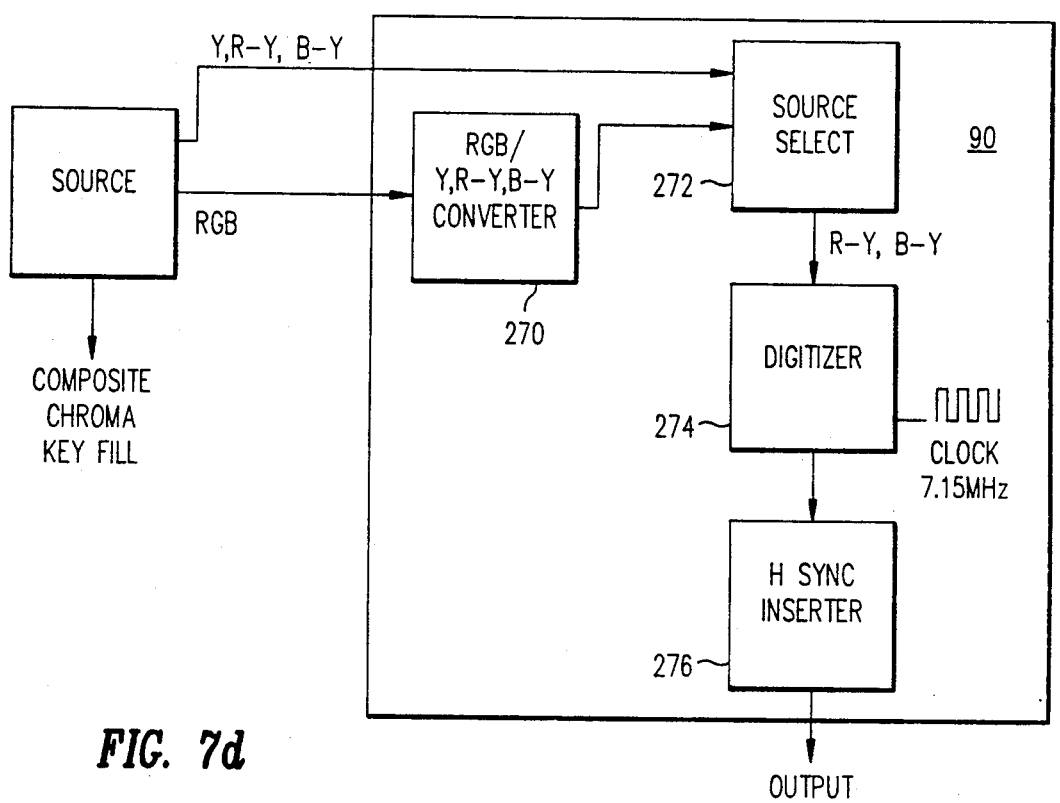
FIG. 7(d) is a detailed block level diagram of the chroma keyer unit portion of the key processor.

Referring to FIG. 7d there is shown a block level diagram of a circuit 90 for generating a chroma component signal. The circuit 90 receives a composite chroma key fill signal which is the associated component color signal of an analog composite video signal. That is, in an analog composite video signal, such as NTSC, the color component signals associated with the NTSC signal are the RGB signals or the Y, R-Y, and B-Y signals.

In the event the RGB signals are supplied to the circuit 90, a converter 270 converts the RGB signals into the signals Y, R-Y and B-Y. The signals are then supplied to a source select unit 272 which selects the R-Y and the B-Y color component difference signals. The color component difference signals R-Y and B-Y are supplied to a digitizer 274. The digitizer digitizes the signals R-Y and B-Y alternatingly at 7.15 MHz for each of the R-Y signals and the B-Y signals. Thus, the total rate at which the component color signals are digitized is at the rate of 14.3 MHz, which is the same rate at which the composite video signal is digitized to produce a digitized composite video signal.

From the digitizer 274, the horizontal sync and a unique identifying code pulses are inserted into the digitized color difference signals of R-Y and B-Y and is produced as the output of the circuit 90.

Figure 13:
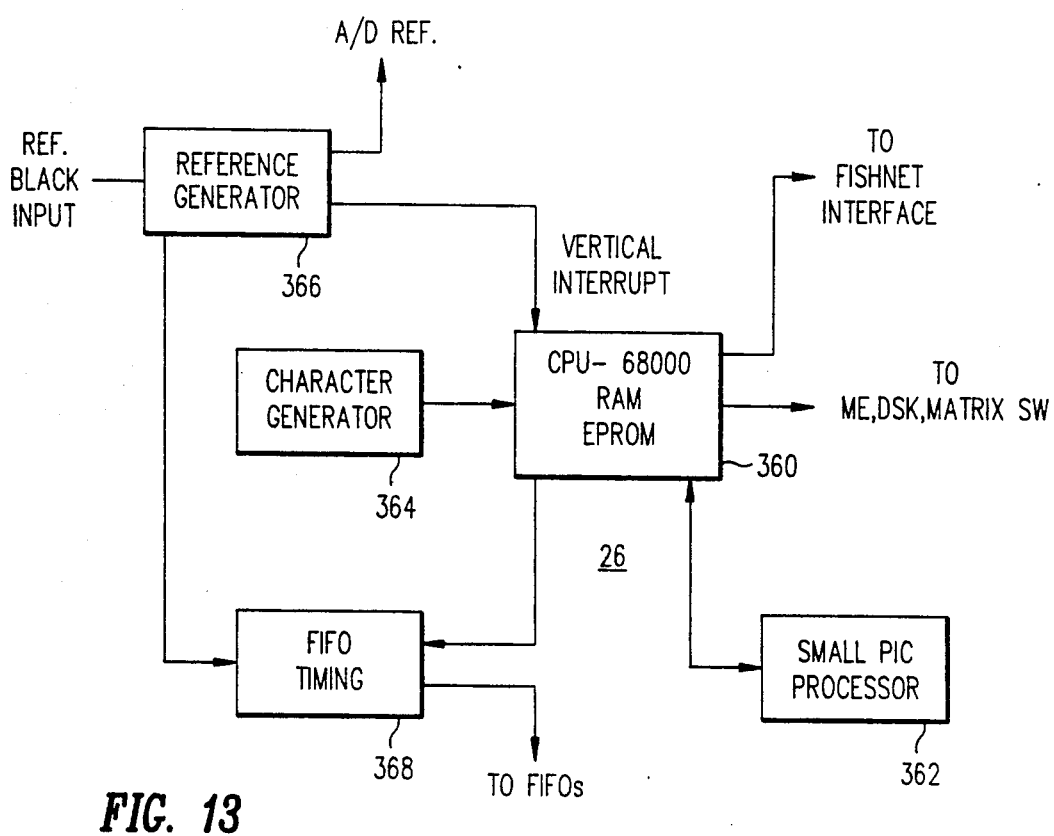
FIG. 13 is a detailed block level diagram of a system controller portion of the ME unit shown in FIG. 2.

Referring to FIG. 13, there is shown a block level diagram of the system controller 26. The system controller 26 comprises a signal processing computer 360, which communicates with the FISHNET interface 28. In the preferred embodiment, the computer 360 comprises a Motorola 68010 processor executing the binary version of the software that is set forth in Exhibit E. In addition to the processor, the computer 360 comprises other well known components such as working memory RAM and program memory EPROM.

The computer 360 generates the various control signals that are used to control the ME units 20 and 22 and the DSK unit 24, and the matrix switch 18. In addition, the controller 26 also comprises a small picture processor 362, which receives various video signals and compresses them to images whose size is less than a full screen image. The small picture processor 362 is in communication with the computer 360.

A reference generator 366 receives a reference black input signal and generates a number of reference signals: an A/D reference signal which is supplied throughout the system chassis 16; a vertical interrupt signal which is supplied to the computer 360; and a timing signal which is supplied to the FIFO timing control 368. The FIFO timing control 368 generates a reference pulse for each of the FIFOs to bring the video signal supplied to the FIFOs synchronized to any pre-selected time slot, determined by the control 368. Thus, an externally supplied video signal can have, within limits, varying timing reference and the control 368 will bring the video signal to synchronization. Finally, a character generator 364 supplies character signals to the computer 360.

Figure 14B:
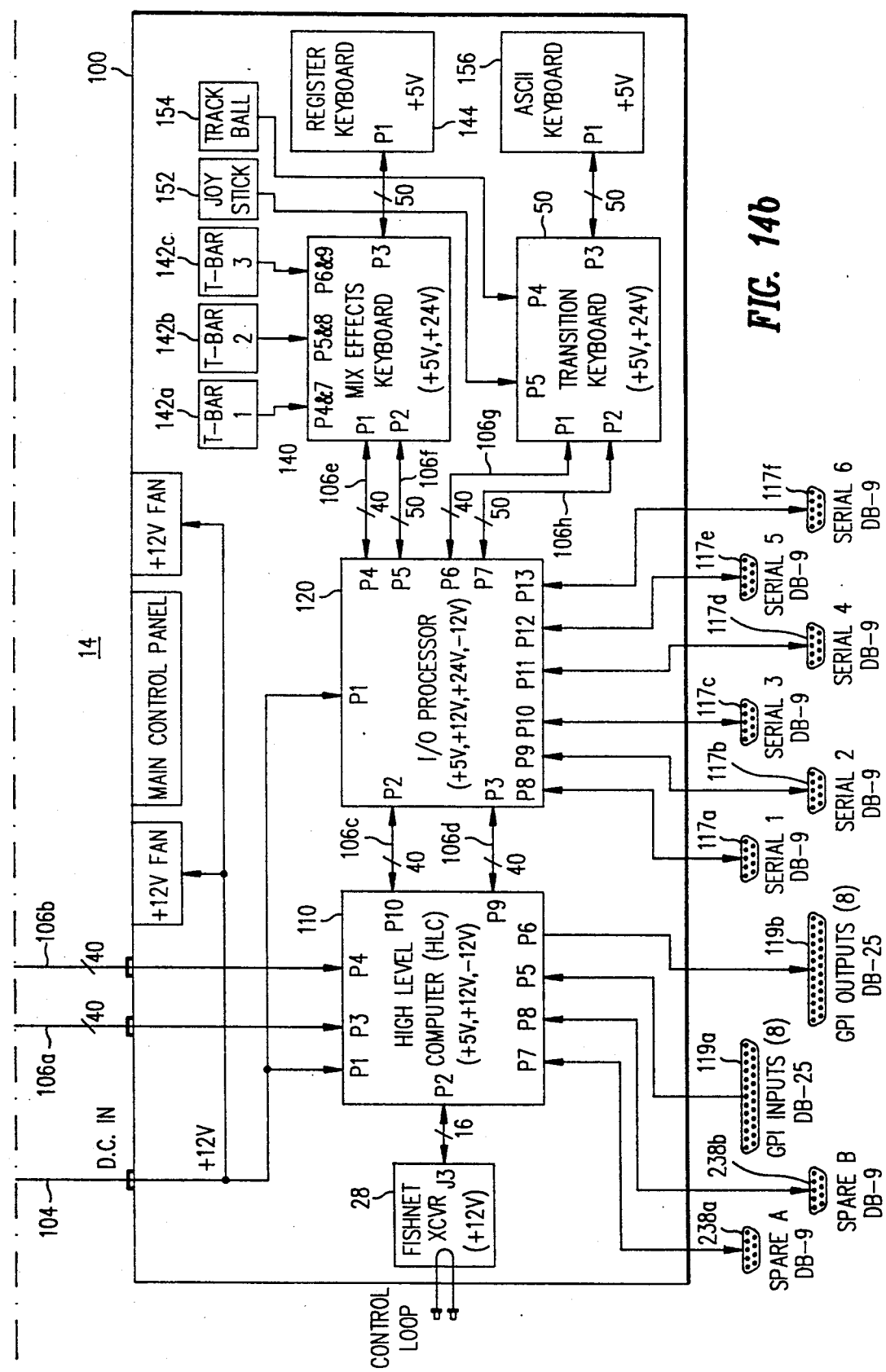

Referring to FIG. 14, there is shown a detailed block level diagram of the control panel 14. The control panel 14 comprises two components: a main control panel 100 and an upstand control panel 102. The main control panel 100 and the upstand control panel 102 are connected by a power cord 104 and internal communication buses 106(a) and (b). Within the main control panel 100 is a FISHNET transceiver interface 28, a high level computer 110, an I/O processor 120 and other input devices to be described hereinafter. The FISHNET interface 28 communicates with the high level computer 110, and with the communication bus 12.

The high level computer 110 communicates with the upstand control panel 102 via interface buses 106(a) and (b). In addition, the HLC 110 communicates with a plurality of communication ports, designated as GPI (General Purpose Interface) 119(a-b), and a plurality of other communication ports 238(a-b).

The main control panel 100 also comprises an I/O processor 120. The I/O processor 120 communicates with the high level computer 110 through internal communication buses 106(c-d). In addition, the I/O processor 120 communicates with a plurality of serial ports 117(a-f).

The main control panel 100 also comprises a mix effects keyboard 140. The mix effects keyboard 140 is connected to a plurality of T-bars 142(a-c) and a register keyboard 144. The mix effect keyboard 140 receives as inputs from the plurality of T-bars 142(a-c) and the register keyboard 144, which are user activated. The mix effects keyboard 140 communicates with the I/O processor 120 via communication buses 106(e-f).

The main control panel 100 also comprises a transition keyboard 150. The transition keyboard 150 is connected to a joystick 152, a trackball 154, and an ASCII keyboard 156 and receives a signal therefrom which is a user activated signal. The transition keyboard 150 also communicates with the I/O processor 120 via communication buses 106(g-h).

The upstand control panel 102 comprises a power supply 160 which supplies power to the various components within the upstand control panel 102 and is also supplied to the main control panel 100 through the power cord 104.

The upstand control panel 102 also comprises a display computer 170. The display computer 170 communicates with the high level computer 110 within the main control panel 100 via communication buses 106(a-b). In addition, the upstand control panel comprises a disk drive 172 and a disk keyboard 174 which are controlled by the display computer 170 and communication therebetween is along the communication bus 106(i-j).

The upstand control panel 102 also comprises two display units: 180a and 180b. Each of the display units 180(a-b) is an electro-luminescent display. The display units 180(a-b) are termed left and right display units, respectively (indicating the position on the upstand control panel 102). The left and right display units 180(a-b) are controlled by and communicate with the display computer 170 via communication bus 106(k-l).

Associated with each display unit 180(a-b) is a keyboard unit 182(a-b). Each of the left and right keyboard 182(a-b) comprises a plurality of keys, whose function can be reprogrammed by the display computer 170 and shaft encoders. The left and right keyboard 182(a-b) are controlled by and communicate with the display computer 170 via communication bus 106(m-n).

Figure 15:
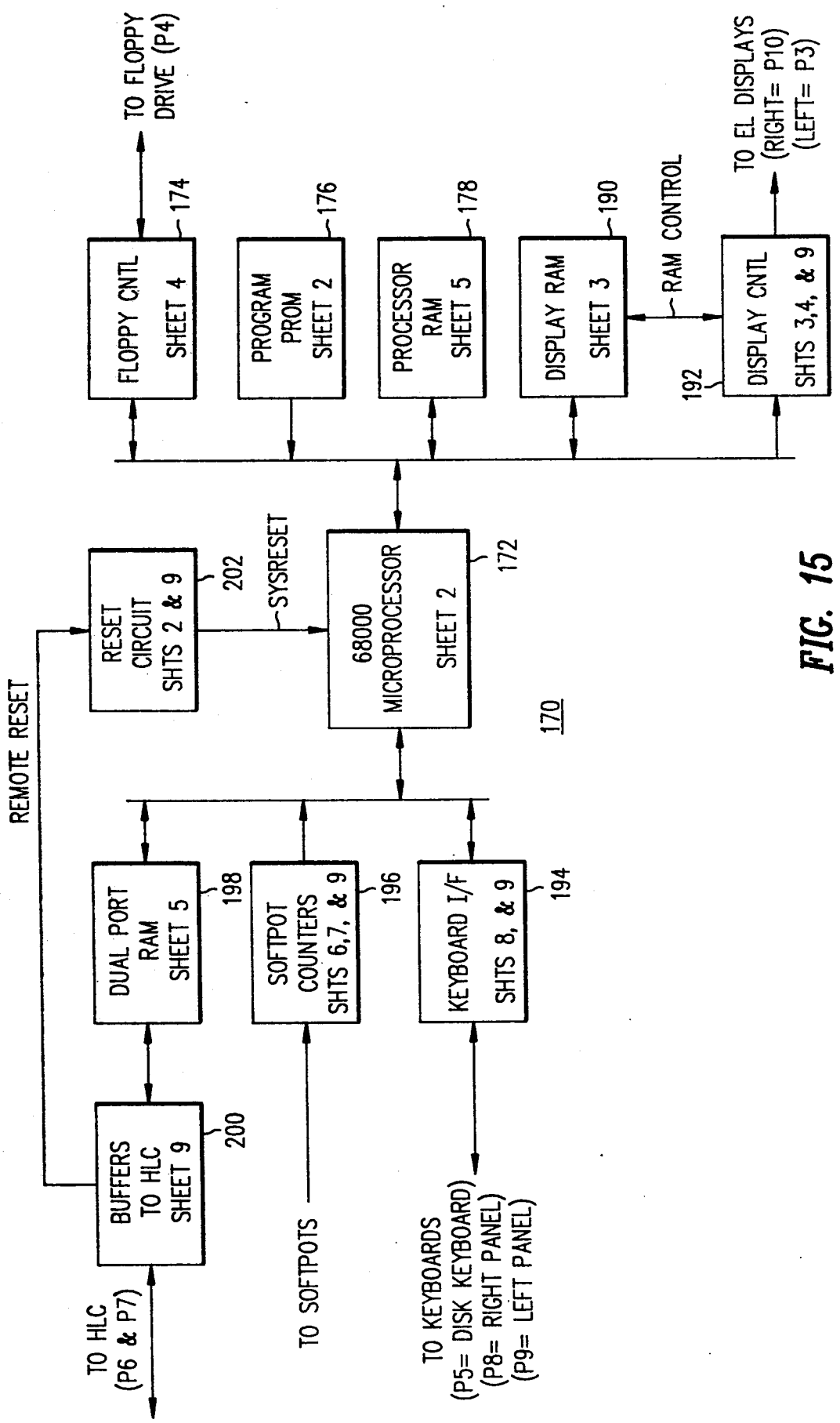
FIG. 15 is a detailed block level diagram of a display computer portion of the control panel shown in FIG. 14.

Referring to FIG. 15, there is shown in greater detail, a block level diagram of the display computer 170. The display computer 170 comprises a Motorola 68000 microprocessor 172. The processor 172 controls a controller unit 174 which interfaces with the disk drive 184. The processor 172 also communicates with the program EPROM 176, which is a programmed read only memory, which contains the executable version of the program set forth in Exhibit G. The processor 172 also communicates with a processor RAM 178 which is the working memory location for the processor 172. The processor 172 also communicates with a display memory 190 and a display controller 192 which interfaces with the left and right display units 180(a-b). The display RAM 190 is the memory storage area for the display units 180(a-b).

The processor 172 also comprises a keyboard interface unit 194 which interfaces with the disk keyboard 186, and the left and right keyboard 182(a-b), via the communication bus 106J, 106M, and 106N. The processor 172 is also connected to a plurality of soft pot counters 196 which are connected to a plurality of shaft encoders. Finally, the processor 172 is connected to a dual port RAM 198 which is connected to a buffer 200 to the high level computer 110 via communication buses 106(a-b). From the buffer unit 200, the high level computer 110 can cause a reset circuit 202 to reset the processor 172.

Figure 16:
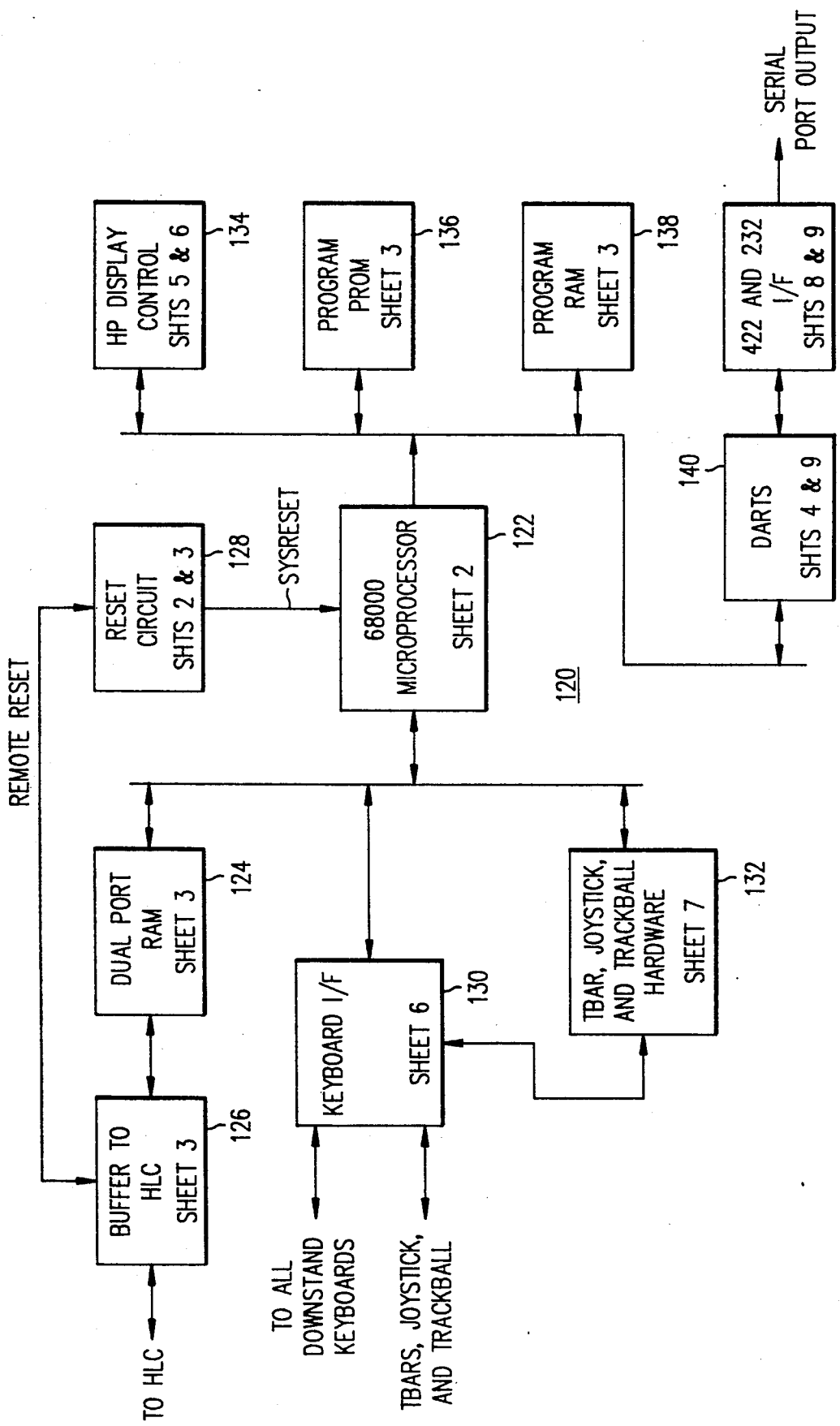
FIG. 16 is a detailed block level diagram of an I/O processor portion of the control panel, shown in FIG. 14.

Referring to FIG. 16, there is shown a detailed block level diagram of the I/O processor 120. The I/O processor 120 comprises a Motorola 68000 microprocessor 122. The microprocessor 122 is connected to a dual port memory 124, to which a buffer 126 to the high level computer 110 is also connected. The buffer 126 communicates with the high level computer 110 via communication buses 106(c-d). The buffer 126, from the high level computer 110, can cause the processor 122 to reset via the reset circuit 128.

The I/O processor 120 also comprises a keyboard interface 130 which interfaces with the keyboards 144 and 156 and the pluralities of T-bars 142(a-c) and the joystick 152 and trackball 154. In addition, the signals from the plurality of T-bars 142(a-c), the joystick 152 and the trackball 154 are supplied to a T-bar, joystick and trackball interface 132 which is supplied to the processor 122.

The processor 122 also interfaces with a H-P display control 134. The H-P display control 134 is an interface to a plurality of alpha-numeric displays 157, associated with each button 156. In addition, the processor 122 communicates with a program PROM 136 which is a memory which contains the executable version of the program set forth in Exhibit F. The processor 122 also communicates with a program RAM 138 which functions as a working memory area for the processor 122. Finally, the processor 122 communicates with a plurality of serial port interface 140, which provides interface to the ports 117(a-f), to which external devices to the main control panel 100 can be attached.

Figure 17:
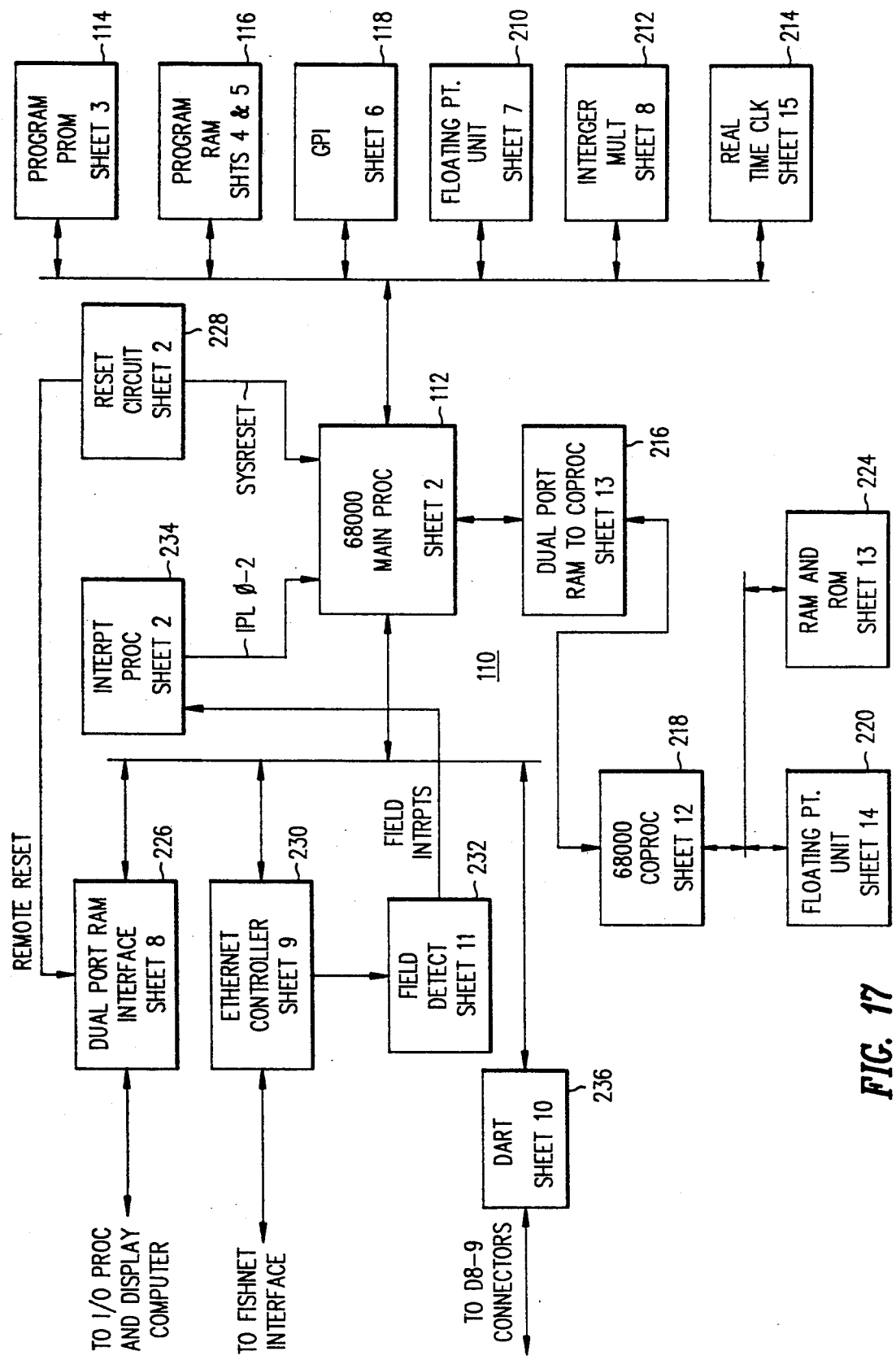
FIG. 17 is a detailed block level diagram of a high level computer (HLC) portion of the control panel, shown in FIG. 14.

Referring to FIG. 17, there is shown in greater detail a block level diagram of the high level computer 110. The high level computer 110 comprise a Motorola 68000 main processor 112. The processor 112 communicates with a program PROM 114, which is a memory, which contains the executable version of the program set forth in Exhibits A-D. The processor 112 is also connected to a program RAM 116 which is a working memory for the processor 112. In addition, the processor 112 is connected to a GPI (General Purpose Interface) interface 118 which is adapted to receive GPI inputs 119a and GPI outputs 119b. The GPI interface 118 is connected to the input port 119a and output port 119b and is adapted to be connected to external processing devices.

The processor 112 is also connected to a floating point unit 210. The floating point unit is of conventional design and augments the operation of the processor 112 by executing operations in floating point. The processor 112 also is connected to an integer multiplication unit 212, which is also of conventional design. The multiplication unit 212 is a dedicated multiplier and augments the operation of the processor 112. The processor 112 also communicates with a real time clock 214.

The main processor 112 communicates with a dual port RAM 216 to which a second co-processor 218 is also connected. The co-processor 218 is a Motorola 68000 processor. The co-processor 218, executes the program, contained in the program PROM 114, as directed by the main processor 112. The co-processor 218 is also connected to a second floating point unit 220. In addition, the co-processor 218 has its associated RAM memory and ROM memory 224.

The main processor 112 is connected to a dual port RAM interface 226 which communicates with the I/O processor 120 and the display computer 170. In addition, the main processor 112, through the reset circuit 228 can cause the I/O processor 120 and the display computer 170 to be reset. The main processor 112 is also connected to a controller 230 which is the interface to the FISHNET transceiver 28. The controller 230 is electrically similar to the well-known ETHERNET protocol. However, the controller 230 detects the field pulse (the commencement of a field) and causes a field detect circuit 232 to generate an interrupt pulse. As previously discussed, the field pulse causes the synchronization of the various control panel units 14 and system chassis units 16 to communicate in their allocated time slot. The field detect circuit 232 then issues a field interrupt to the interrupt processor 234 which is received by the main processor 112.

Finally, the main processor 112 communicates with a DART interface 236 which is a Dual Asynchronous Receive Transmit device and controls the serial ports 238(a-b), which are spare.

Figure 18:
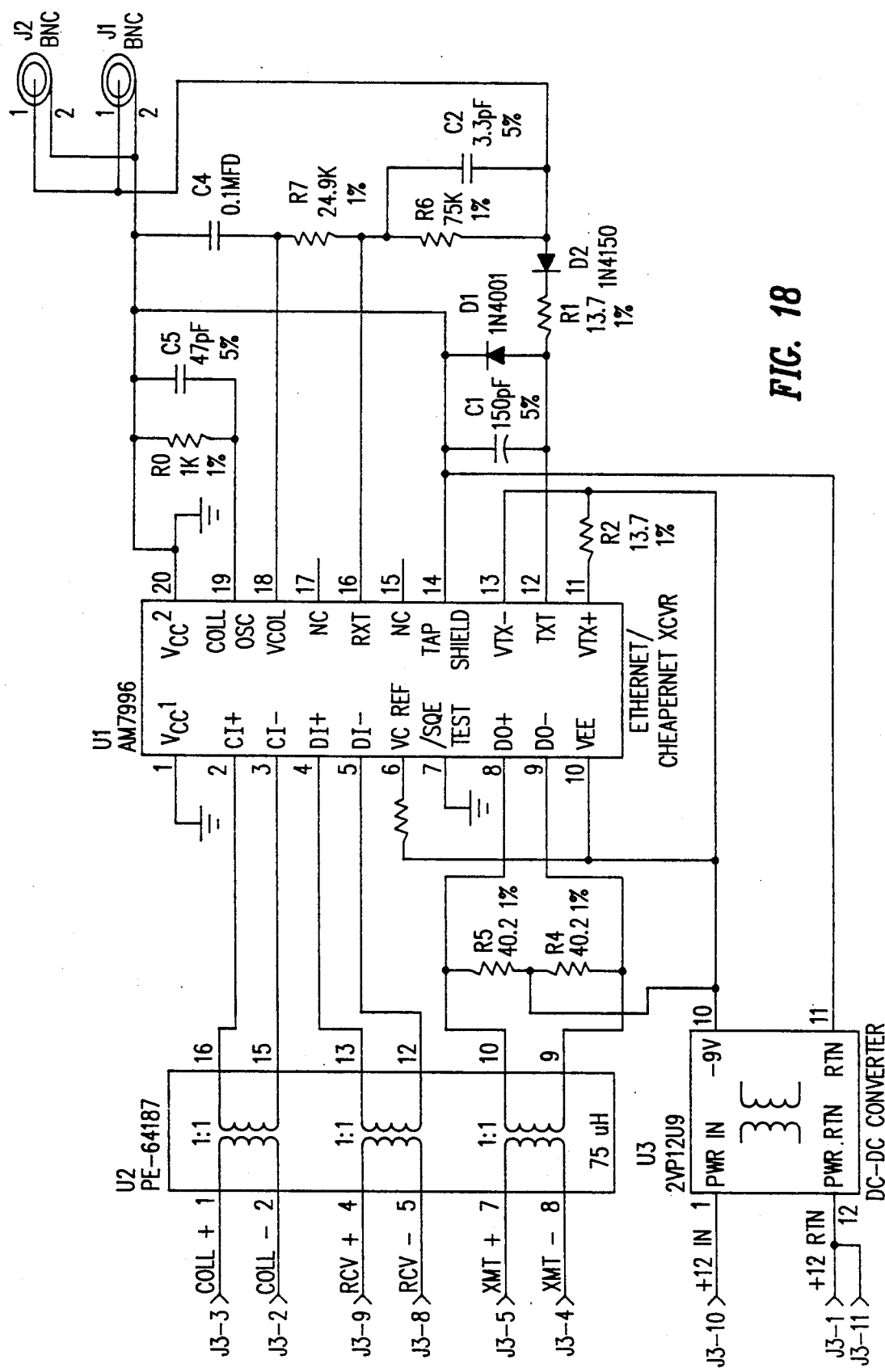
FIG. 18 is a circuit diagram of a field interruptable shared high speed network (FISHNET) transceiver portion of the control panel, shown in FIG. 14.

Referring to FIG. 18, there is shown a circuit level diagram of the FISHNET transceiver 28. The FISHNET transceiver 28 comprises an Ethernet driver and receiver, which is a part 2VP12U9 LANPAC available from Reliability, Inc.

Operations of the Video Processing System 10

I. Communication and Control

In the operation of the video processing system 10, as previously described, each of the control panel 14 and the system chassis 16 is connected to the communication bus 12. The system chassis 16 comprises one or more video processor means, such as an ME unit 20 or 22. Further, each single control means can control a single video processor means of a system chassis or a plurality of video processor means, through the communication bus 12. In addition, the plurality of video processor means can be interfaced through a single system controller 26 and a FISHNET interface 28 in a single system chassis 16, with a plurality of control panels controlling the plurality of video processor means.

Thus, as can be seen from the foregoing, the video processing system 10 is networked and can be modularly changed.

II. Graphical Display

Figure 19A:
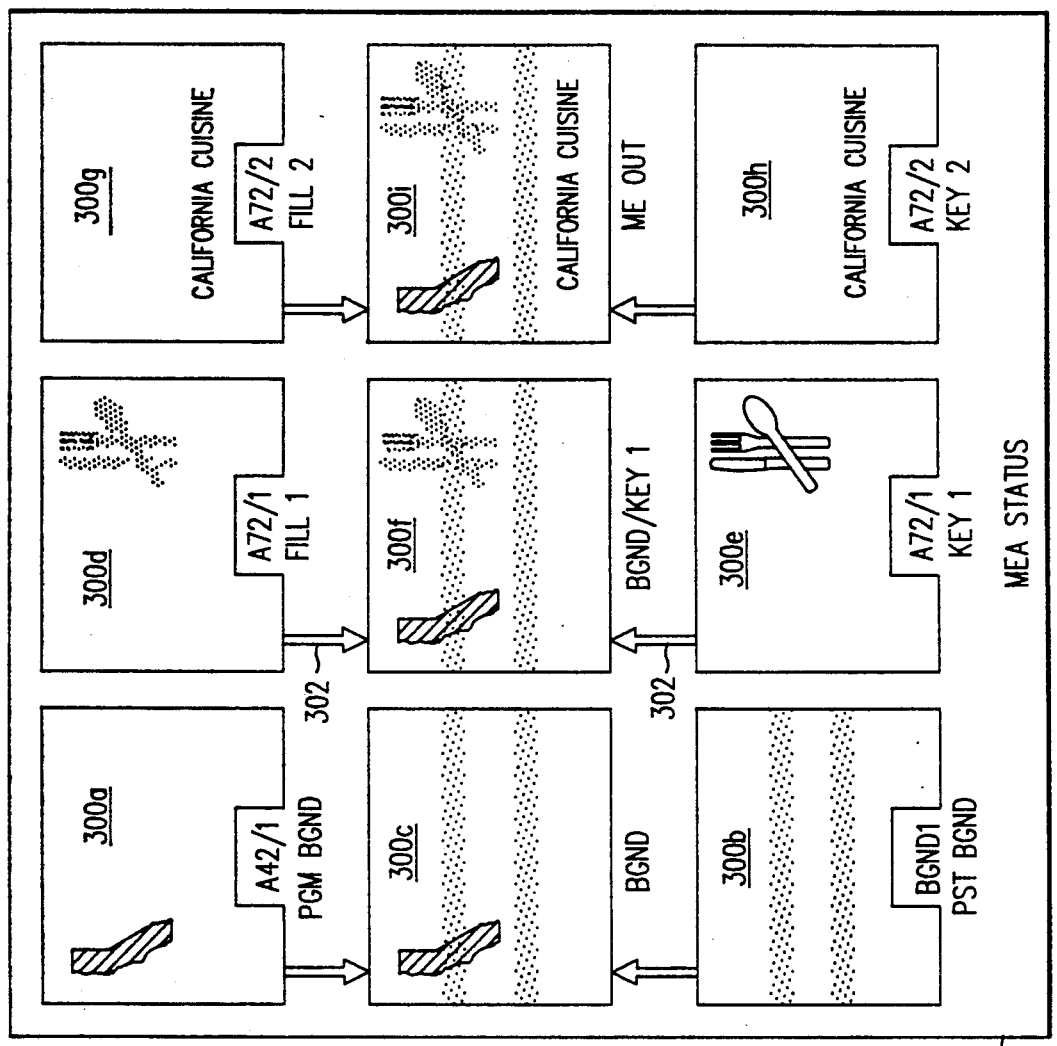
FIGS. 19(a-d) are various displays showing the display of a plurality of video signals as they are being processed by the video switcher, displayed in a single screen, in response to user activated signal(s).
Figure 19B:
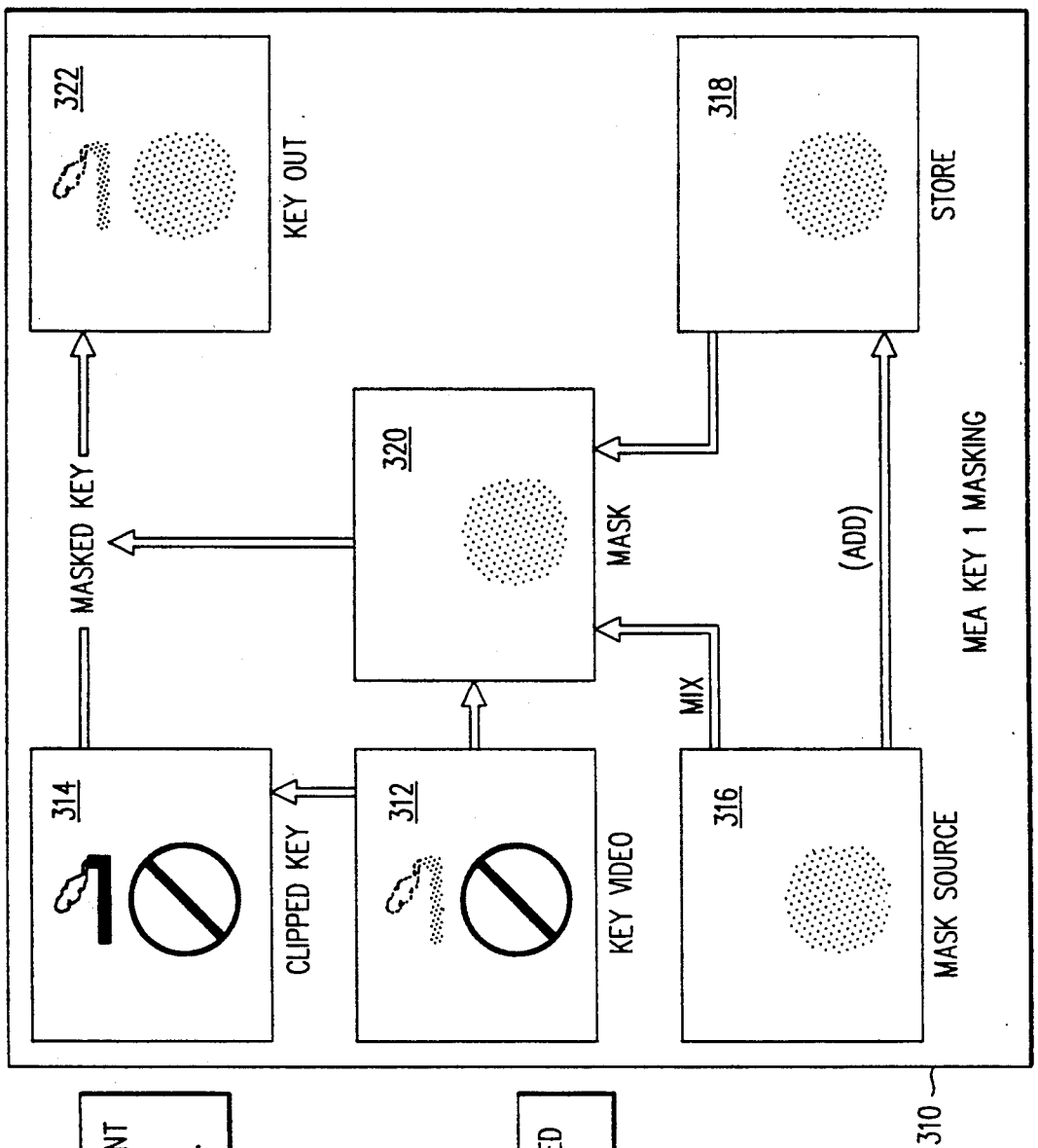

Referring to FIG. 19a, there is shown a onescreen display 290 of the status monitor video signal outputted from the system chassis 16. The status monitor video signal is a signal containing up to nine images 300(a-h). The image 300a is of the main program video signal supplied to a ME unit. The image 300b is of the preset video signal supplied to the same ME unit. The image 300c represents the combination of the images 300a and 300b, as selected by the mixer 40.

The image 300d is the fill 1 video signal supplied to the ME unit. The image 300e is of the key 1 video signal supplied to an ME unit. The image 300f represents the output of a first keyer unit 50a operating on the result from the mixer 40 and as supplied by the key 1 video signal and the fill 1 signal.

The image 300g is of the fill 2 video signal. The image 300h is of the key 2 video signal. The image 300i represents the video signal as supplied from the keyer 50a and as operated thereon by the key 2 signal and the fill 2 signal, and represents the output of the ME unit. Thus, the screen display 290 represents the processing of a video signal by the various key and fill signals through a particular ME unit with the output thereof.

In addition, the effect of the mixer as well as each of the keyer units operating on the input video thereof can be incrementally viewed. Thus, the effect of the mixer 40 alone can be viewed by the combination of the image 300a and 300b. The effect, if any of the preset video signal, as represented by the image 300b in the mixer 40, can be seen by enabling or disabling the supply of the preset video signal to the mixer.

Each of the plurality of images 300 (a-i) is always displayed. Thus, for example, the preset video signal, as represented by image 300b, is displayed on the image 290. The contribution of the preset video signal 300b and the background video signal 300a to the resulting image 300c is also always displayed. If a key signal does not contribute to the mixer 40 and thus the image 300f does not represent the operation of the key signal on the image 300c, then a dotted line 302 is displayed, from image 300e to image 300f. If a key signal does contribute to the resultant image 300f, then a solid line 302 is displayed. Thus, graphical indicia represent the activation of the different video signals to the different components of the appropriate ME.

Similarly, the effect of the keyer 2 unit 50b can be viewed by the combination of the images 300g, 300h, and 300f with the output as 300i. Further, the status monitor 290 can be displayed for each of the ME unit 20 or 22 or the DSK unit 24.

Referring to FIG. 19(b-d), there is shown an image 310 displayed on a display screen, showing the operation by the key processor 60 on an input supplied key video signal. Image 312 represents the key video signal supplied to the key processor 60. Image 316 represents a mask video signal from a mask source, such as the mask generator 250. Image 318 represents the image stored in the frame store 254 within the key processor 60, associated with the ME unit 20 or 22 or the DSK unit 24. The video signal from the mask source as represented by the image 316 is added to the frame store. Thus, the image 318 from the frame store 254 can be of a plurality of added video signals from the mask source, 250.

The images 316 and 318 are supplied to a mask which mixes the two images to form the image 320. The key video signal as represented by the image 312 can then be clipped producing the image 314. The operation of the mask signal upon the clipped key video signal produces the image 322 which is the output of the key processor 60. The action of the mask source adding to the frame store, or of mixing to the mask, or of the key video being supplied to the mask, or the key video being supplied to the clip key, can all be altered with the resultant image graphically shown. In the image 310, the output image 322 is the result of a masked key operation wherein the mask is used to conceal part of the external key signal.

Figure 19C:
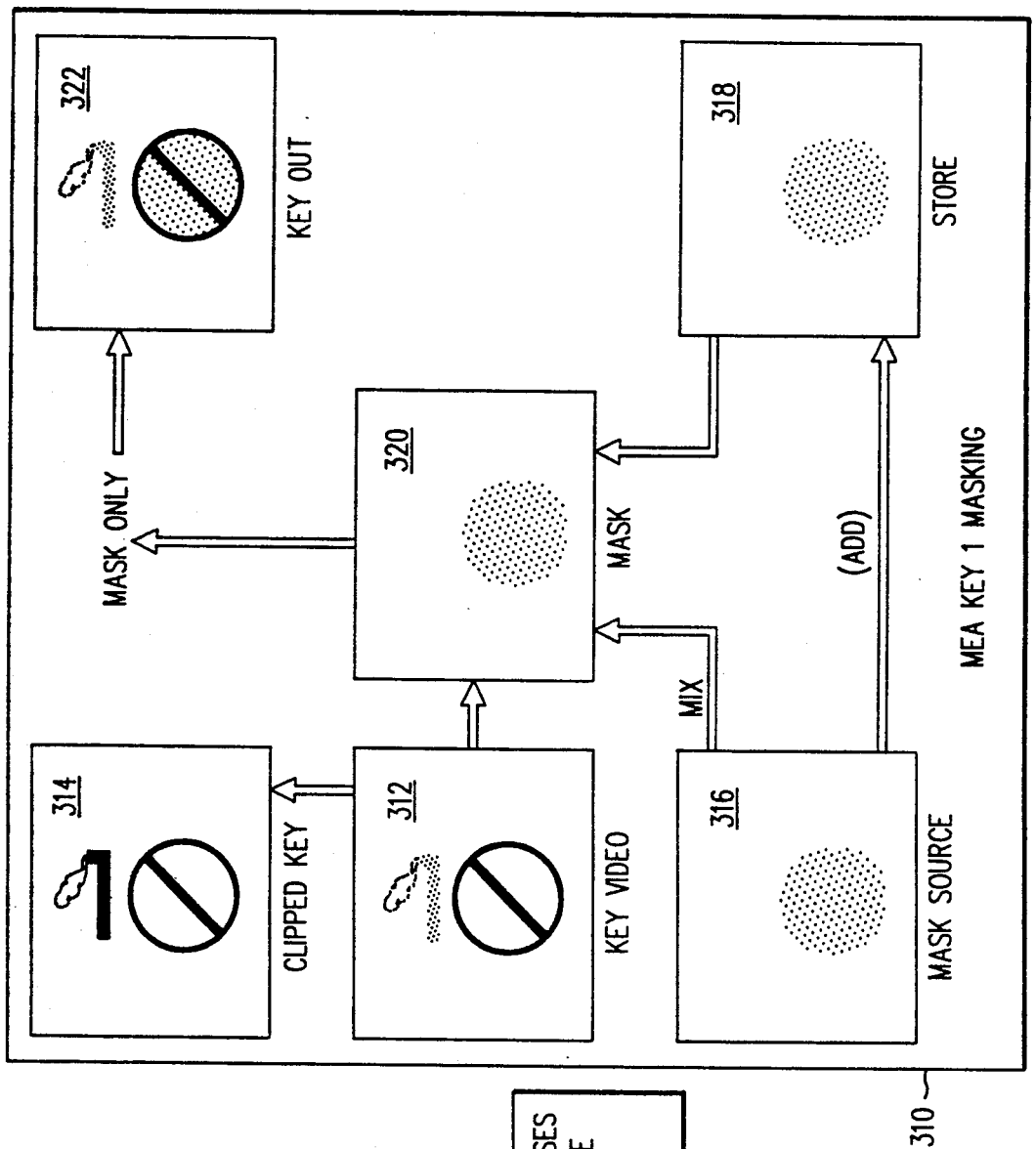

Referring to FIG. 19c, there is shown a display 310 wherein the key processor 60 is operating in the mask only mode. In this mode, the mask source replaces the key signal in the keyer.

Figure 19D:
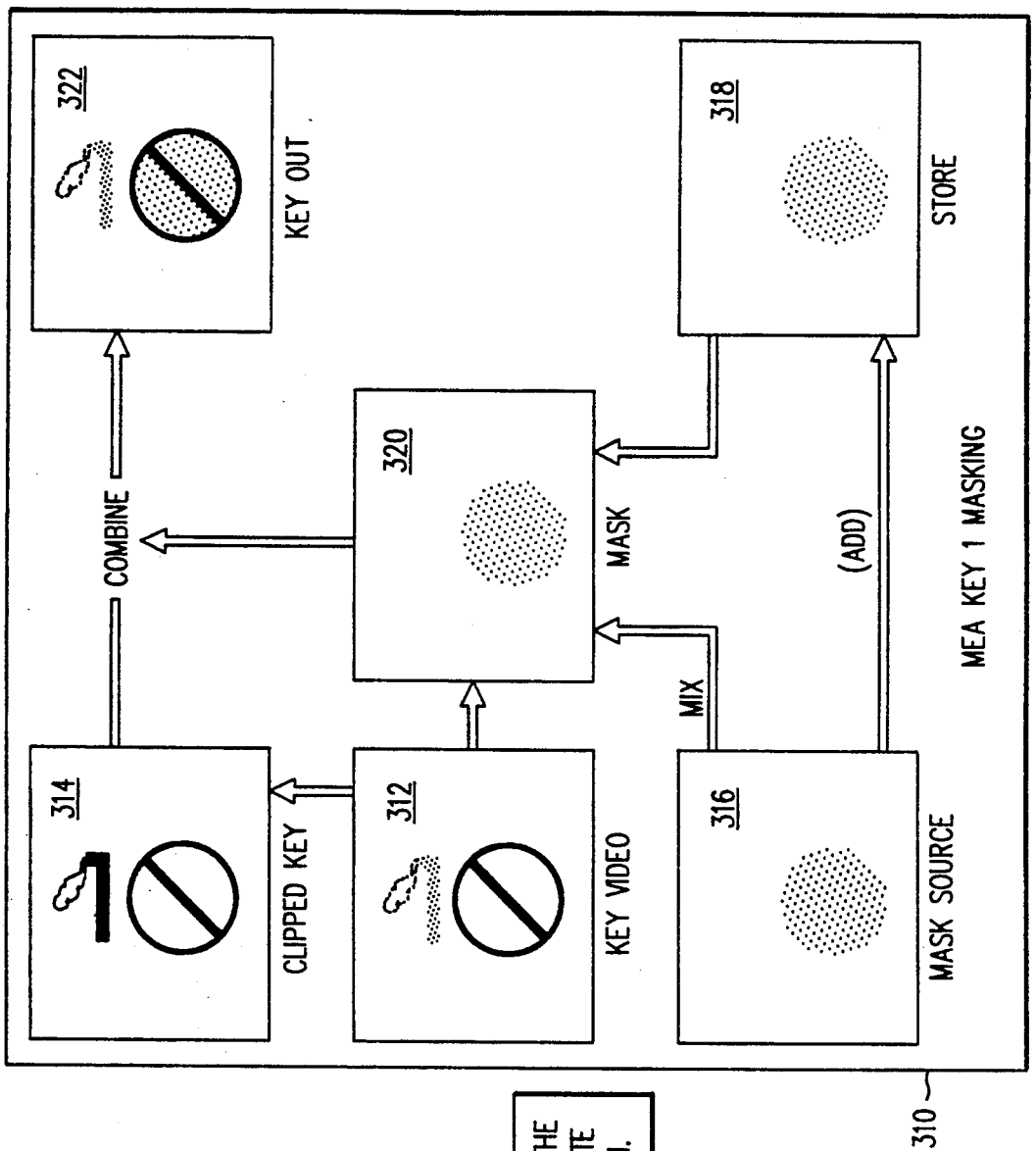

Referring to FIG. 19d, there is shown another display 310 wherein the key processor 60 is operating in the combine mode. In the combine mode, the mask forces the key fill signal to be on in the area of the mask.

As can be seen from the foregoing, the system 10 can display the operation of the various components of the video processing system as a video signal is operated upon by the various components of the video processing system 10. The plurality of images are displayed on a number of display screens, with the number being less than the total number required to display all of the plurality of images. In the preferred embodiment, a single screen displays all of the images.

III. Luminance Compositing Frame Store

As previously discussed, the key processor 60 comprises a luminance compositing frame store 254. The luminance compositing frame store 254 is simply a frame delay which is continuously recirculated. The input to the luminance compositing frame store 254 can be from the box mask generator 250, which generates a mask key signal. Alternatively, the input to the luminance frame store 254 can be the "signed key" signal which is a composite chroma key signal as generated by the key clip and gain limiter circuit 96 and 98. The output of the luminance frame store 254 can be used as a key signal to operate upon the program video signal from the mixer 40 as applied to a keyer unit 50. This is graphically depicted in FIGS. 19(c-d).

Further, the output of the frame store 254 is a luminance key signal whose luminance can be controlled by the mask opacity multiplier 260. Thus, the degree of luminance of the video signal which is used as a key signal from the frame store 245 can be controlled within the key processor 60.

IV. Wide Bandwidth Chroma Key Signal

As previously discussed, the system 10 is capable of receiving an analog composite video signal. In the event the analog composite video signal also has color component signals associated therewith, the color component signals can be supplied to the system 10 in order to produce a chroma key signal having wide bandwidth.

The analog composite video signal, such as NTSC, is first digitized, at a 14.3 MHz rate. The digitized composite video signal is then used as the main program signal and is supplied to the mixer 40. The associated color component signals comprising of RGB or Y, R-Y and B-Y, are supplied to the chroma keyer unit 90. The chroma keyer unit 90 digitizes the R-Y and B-Y color component difference signals each at the rate of 7.15 MHz, alternatingly, to provide a digitized color component difference signal (alternating between R-Y and B-Y) at the 14.3 MHz rate, the same rate as the digitized composite video signal. A horizontal sync pulse and a unique code word are added to the digitized color component signal with the result supplied to the key processor 60 and to the keyer unit 50, to produce a mix effect signal therefrom.

Because the color component signals are digitized at the same rate as the analog composite video signals, the digitized color component signals can be supplied at the same rate to the keyer unit 50 as the digitized composite video signal in order to produce a mix effect signal without any timing difference between the two signals.

V. Control of Peripheral Devices

One of the ports to the I/O processor 120 is a first port 117a. The first port 117a is for communicating with video processing apparatuses external to the system 10. The first port 117a is a 38.4 kilobaud bus which communicates in the RS422 interface standard. The external device which communicates with the system 10 along the first port 117a must have a unique SMPTE address and must communicate with the system 10 in accordance with the well known SMPTE electrical specification. The type of external device which can communicate with the system 10 along the first port 117a include devices such as digital disk/RAM recorders and digital effect devices.

An example of the implementation of the protocol written in the C language, which is used for communication between the system 10 and an Abekas A53-D, operating as a slave device is set forth on Exhibit J. In the operation of the communication, the external device sends data representing alphanumeric text information to the system 10. The system 10 displays the received text information on its display means 180. The text information is representative of the functional capabilities of the external video processing apparatus. The video signal generated by the external video processing apparatus is supplied to the system 10 as a video input to one of the video system chassis 16. The system 10 controls the functions of the external video processing apparatus as displayed on the display means 180, through the first port 117a. One of the devices to control the external processing apparatus is the use of the trackball 154.

Thus, in addition to controlling the ME units contained in the system chassis 16, the system 10 can also assign the trackball 154 to control the video processing apparatus external to the system 10.

VI. Time Line Display with Real Time Interaction

As previously discussed, one of the uses of the system 10 is to receive a plurality of video signals, which can include video signals from an external video apparatus controlled through the first port 117a.

Figure 20A:
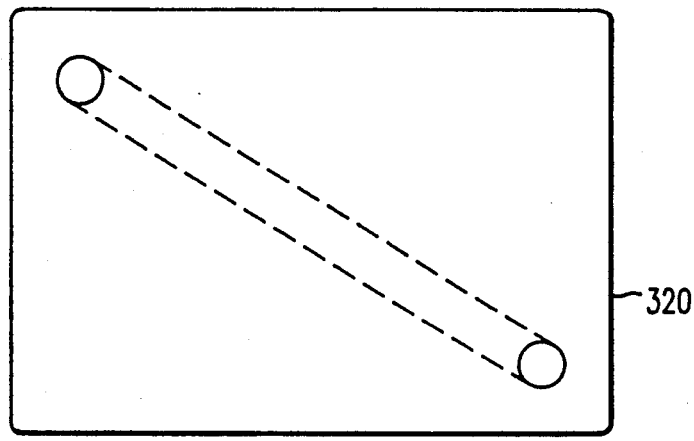
FIG. 20(a) is a schematic display of a moving image, with its associated timeline display shown in FIG. 20(b), and the moving image displayed (FIG. 20(c)) in response to user activated input on the timeline shown in FIG. 20(b).
Figure 20B:
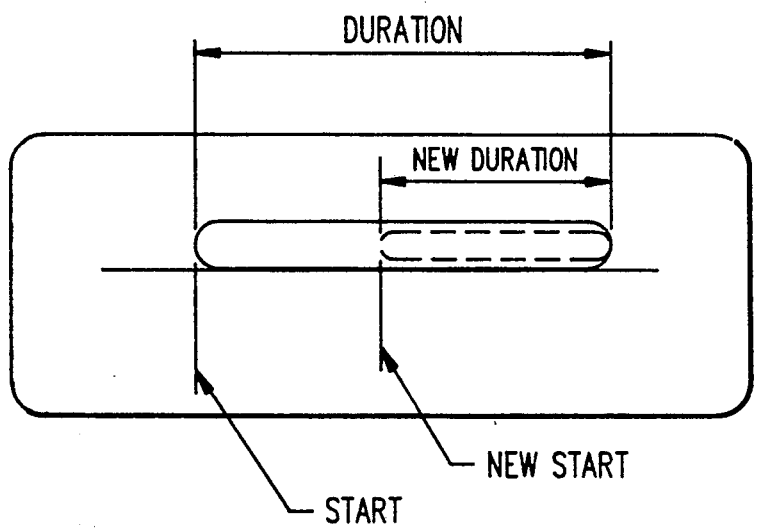

Each video signal supplied to the system 10, can be representative of a plurality of images which is displayed on a display screen 320. The plurality of images have a starting time and a certain period of duration. The starting time and the duration of the plurality of the images (hereinafter: the timeline of the video signal) is also displayed on either display 180a or 180b. See, for example, FIG. 20b, which represents a timeline of a video signal of the images on the screen 320, shown in FIG. 20(a).

In response to the display of the timeline of the video signal, the user through either the trackball 154, or shaft encoders 350 (associated with the display 180), or through any other user input means, can change the start of the timeline and the duration of the timeline. The user positions a graphical indicium to select the new starting time and the new duration of the timeline. See FIG. 20b wherein a dotted line shows the new starting time and the new duration. The new starting time can even be a starting time followed by a delay before the images are displayed.

When the user positions the graphical indicium to the new starting time, the system 10 responds by displaying the starting frame of the image represented by the new starting time. The displaying of the starting frame assists the user in determine the correctness of the new starting time, as represented by the timeline display. Furthermore, as the graphical indicium is adjusted, the starting frame corresponding to that indicium is also changed.

When the user is satisfied with the new starting time and the duration, the user activates any of the user input means, to indicate to the system 10 to execute the generation and display of the video signal corresponding to the timeline chosen by the user. The system 10 responds by generating the video signal that corresponds to the new timeline and displays the images that of that video signal on the screen 320.

For example, a video signal can represent a plurality of images showing the display of images which represents the movement of a mask from top left hand corner to lower right hand corner. See FIG. 20a. The user upon viewing the images displayed on a display can edit the plurality of images. The editing is done by viewing the timeline of the video signal displayed on the display 180. Thus, for example, if the video signal lasted 1 second and the user desires to keep the portion of the video signal commencing in the middle of the screen to the lower right hand of the screen, the user would then activate any of the input devices to position the graphical indicium on top of the time line to have the portion of the display commence at approximately half-way between the commencement of the video signal and the end thereof. The duration would be from that commencement portion until the end of the video display. In addition, the start of the video images can be delayed.

Figure 20C:
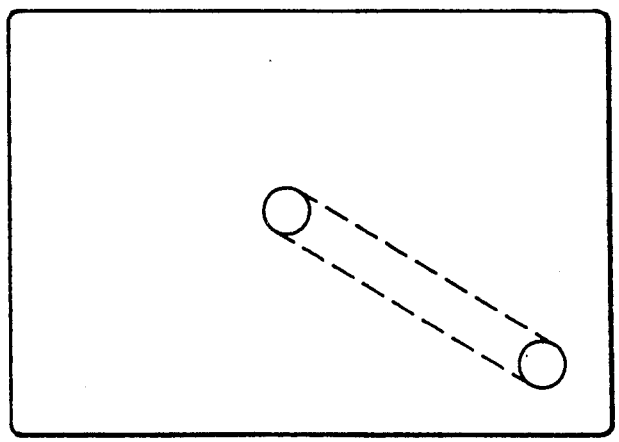

In response to the user positioning the indicium, the system 10 displays the frame that corresponds to the new starting time, on the screen 320. Thus, the mask located in approximately middle of the screen 320 is displayed. If the user is satisfied with the starting frame and the duration, the system 10 would then generate a video signal which would correspond to the new starting time and the new duration. That new video signal would represent images commencing approximately in the middle of the display screen moving to the lower right hand corner. See FIG. 20c. This would represent approximately one-half of the duration of the original video signal and would represent the portion of the display selected by the user on the time line as displayed on the display screen 180. The generation and the display of the plurality of images in response to the user selected input occurs in real time.

The control of the time line and the regeneration of a new video signal representing the portion of video signal desired by the user, can include the video signal being that generated by an external video apparatus communicating with the system 10 through the first port 117a.

VII. Edge Filtering for Chroma Key Signal

Figure 29A:
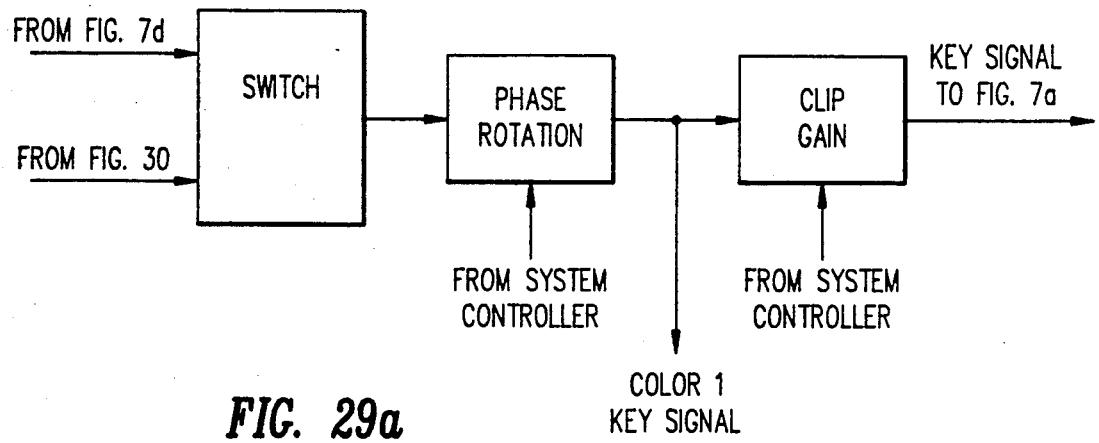
FIG. 29(a) is a block level diagram of a chroma key process generator for receiving the chroma key signals generated from FIG. 7(d) or FIG. 30, and for generating a chroma key signal supplied to the key processor of FIG. 7(a-c)
Figure 30:
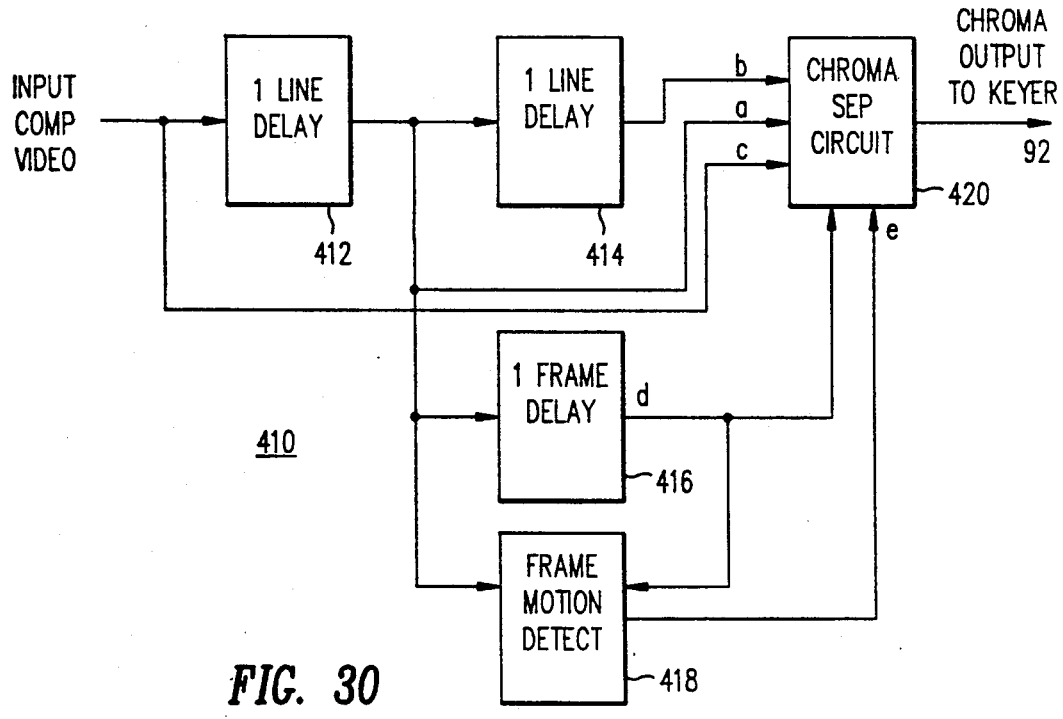
FIG. 30 is a block level diagram of a chroma keyer unit for separating a composite digital video signal into its component parts.

Referring to FIG. 30, there is shown in block level diagram a circuit 410, for the generation of a chroma component signal supplied to the circuit shown in FIG. 29(a). The circuit 410 receives a composite digital video signal which has a luminance component and a chrominance component and serves to separate the luminance component from the chrominance component, to suppress the interference between the luminance signal and the chrominance signal. The chrominance signal generated by the circuit 410 is processed by the circuit shown in FIG. 29(a) to generate a key signal to process the composite video signal to produce a mix effect signal therefrom.

The circuit shown in FIG. 29(a) can receive the chroma signal generated by the circuit 410 or by the circuit 90 shown in FIG. 7. A switch selects one of the two chroma signals, and supplies it to a phase control circuit. From the phase control circuit, the signal is supplied to a clip and gain circuit, whose output is a key signal supplied to the key processor 60. The phase control circuit and the clip and gain circuit are both under the control of the system controller 26.

As is well known in the video arts, a video signal comprises a plurality of contiguous video frames with each frame having a plurality of lines. The circuit 410 comprises a first one line delay circuit 412 which receives the input video signal. The first one line delay circuit 412 serves to delay the input composite digital video signal by one line. The output of the first one line delay circuit 412 designated "a" is supplied to a second one line delay circuit 414. The second one line delay circuit 414 serves to delay the signal "a" by yet another one line. Thus, the output of the second one line delay circuit 414, designated as "b" is the input video signal delayed by two lines.

The input video signal designated "c" along with the signals "a" and "b" are supplied to a chroma separation circuit 420, whose function will be discussed hereinafter.

The output of the first one line delay circuit 412, signal a, is also supplied to a one frame delay circuit 416 and a frame motion detection circuit 418. The output of the one frame delay circuit 416 serves to delay the signal supplied thereto by one frame. The output of the one frame delay circuit 416, designated as signal "d", is also supplied to the frame motion detection circuit 418.

The frame motion detection circuit 418 compares the signal d with the signal a and generates a motion signal e. The motion signal e and the one frame delayed signal d are both also supplied to the chroma separation circuit 420.

The frame motion detection circuit 418 compares corresponding lines from the frames as supplied thereto by signals a and d. Since the one frame delay circuit 416 delays the video signal supplied thereto by one frame plus one line, the signal d is the same line number as the signal a from the first one line delay circuit 412 but being one frame apart therefrom. The comparison of signal a to signal d will then be of corresponding lines in adjacent frames. The result of that comparison is the motion signal e which can have one of two possible states: A first possible state where motion is detected between the signal supplied from the first one line delay circuit 412 and from the one frame delay circuit 416; and a second possible state where no motion is detected between the two lines, in adjacent frames.

In the event no motion is detected between corresponding lines on adjacent frames, the chroma separation circuit 420 outputs a chroma key signal which is signal a minus signal d. Thus, if no motion is detected, the circuit 410 operates as a frame comb filter. Since under NTSC standards, alternate frames have the chrominance encoded 180° out of phase, by subtracting the alternate frames, when no motion is detected, the luminance would be zero and the chrominance would be added resulting in a pure chrominance signal supplied to the keyer 92.

If motion is detected by the frame motion detector 418, the output of the chroma separation circuit 420 is the signal a minus ($\frac{1}{2}$ b + $\frac{1}{2}$ c). That is, if motion is detected, the circuit 410 operates as a line comb filter serving to take alternate lines and averaging the lines adjacent thereto.

In the preferred embodiment, the frame motion detection circuit is a single chip from NEC part 9323. The chroma separation circuit is an NEC 9320. The first and second one line delay circuits 412 and 414 are conventional FIFO devices such as NEC 41101. Finally, the one frame delay circuit is also another conventional FIFO device such as the TI TMS 4C1050.

The aforementioned NEC circuits had been used in the prior art to display video signals to TV display to eliminate crosstalk between the luminance and chrominance components of an input video signal. However, the use of these well known circuits to use the chrominance digital signal as a key signal in a subsequent key processor has not been accomplished heretofore.

VIII. Background Transformation

Figure 21A:
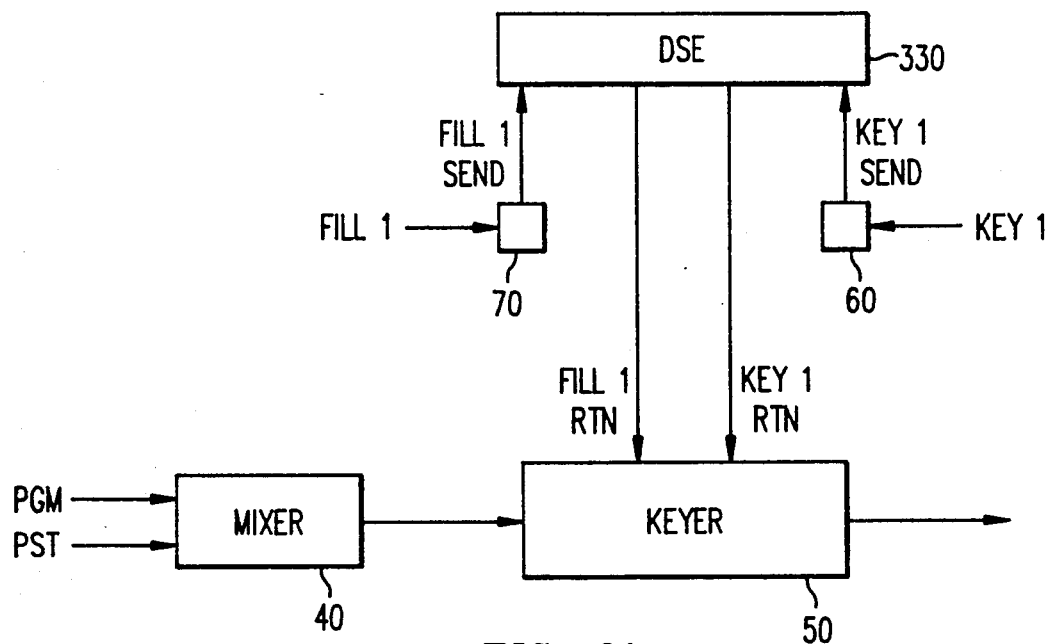
FIGS. 21(a & b) are schematic block diagrams of two modes of operation for the ME unit of the present system.

Referring to FIG. 21a, there is shown a schematic block level diagram of one mode of operation for the ME unit 20. As previously described, in the first mode of operation, a program video signal and a preset video signal are supplied to a mixer 40. The output of the mixer 40 is then supplied to a keyer unit 50. A fill 1 signal is then supplied to a fill processor 70. A key 1 signal is then supplied to a key processor 60. From the fill processor 70 and the key processor 60, the video signals can be supplied to an external video processing device, such as a Digital Special Effects (DSE) apparatus 330. In normal operation, the signals are not supplied to the DSE apparatus 330. From the external video processing apparatus 330, the key 1 return signals and the fill 1 return signals are also supplied to the keyer unit 50. The keyer unit 50 then generates the output of the mixer unit.

Figure 21B:
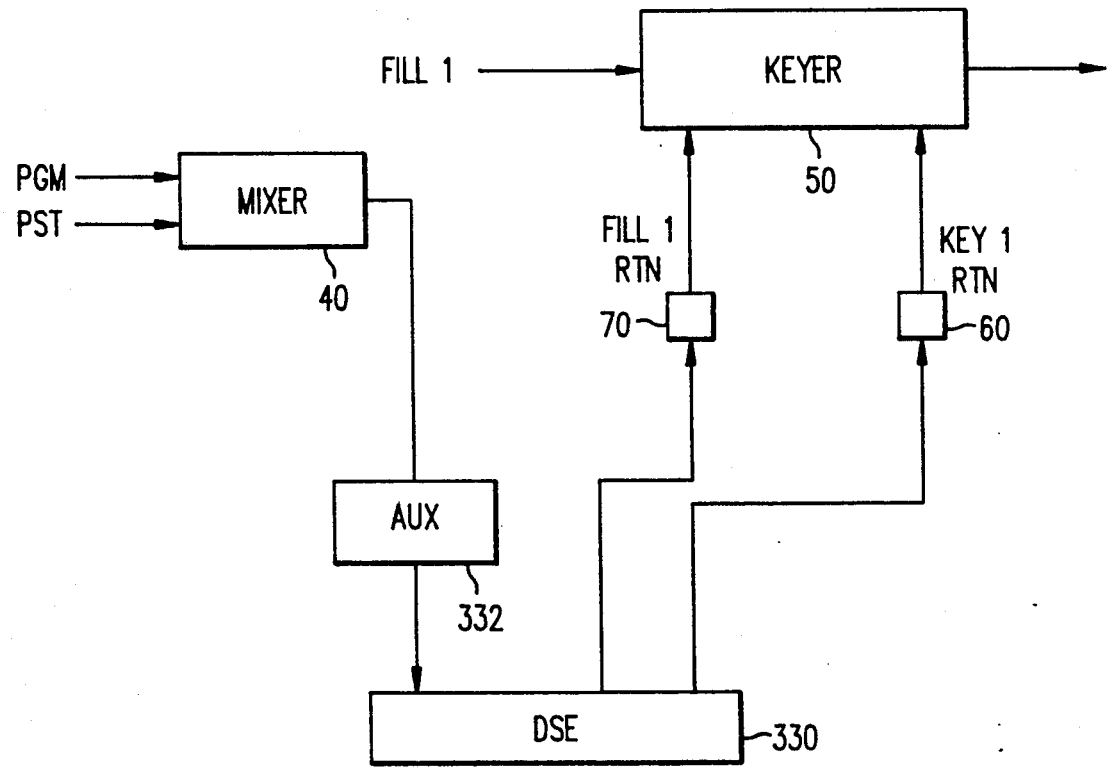

The ME unit has a second mode of operation. This is shown in FIG. 21b. In the second mode of operation, the program and preset signals are supplied to the mixer 40 same as previously described. However, the output of the mixer 40 is then supplied to the auxiliary port 332 which is one of the auxiliary outputs of the ME unit. From the auxiliary port 332, the signal is then supplied to the external video processing apparatus 330. the video signals from the external video processing apparatus 330 is then resupplied back in to the matrix switcher 18 and is supplied to the fill processor 70 and key processor 60 respectively. From the fill processor 70 and the key processor 60, the fill 1 return video signal and the key 1 return video signal are then supplied to the keyer 50. Finally, the video signal is supplied as input to the fill 1 signal which is connected to the keyer unit 50. The keyer unit 50 operating on the fill 1 signal, the fill 1 return signal and the key 1 return signal produces the video output, with the fill 1 signal used as the background, with video signal keyed in as provided by the key 1 return signal and filled by the fill 1 return signal.

Figure 21C:
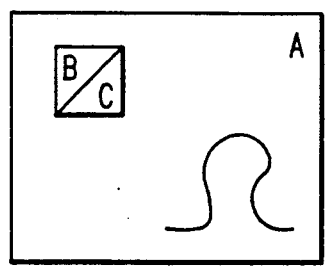

The difference in the operation of the two modes of operation can be seen by referring to FIG. 21c. FIG. 21c is a schematic diagram of an image of a video signal having a background video signal A, with a foreground keyed signal which comprises a background video signal B and a preset video signal C, keyed in a particular location within the background video signal A.

Figure 21D:
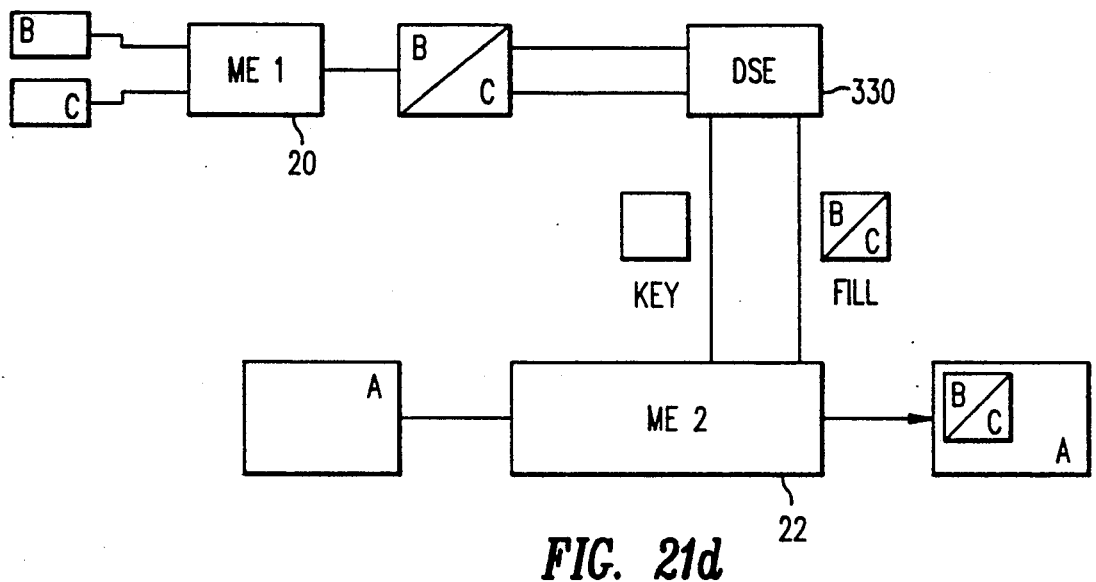
Figure 21E:
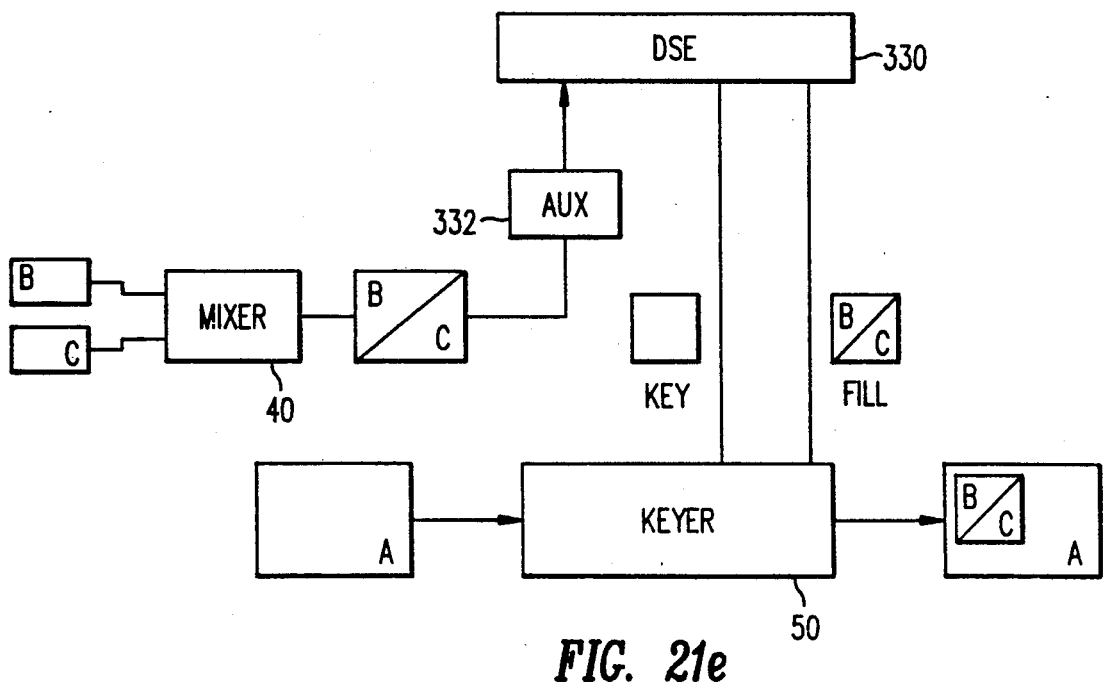

To accomplish this effect, the system 10 operating in the first mode would require the use of two ME units. This is shown schematically in FIG. 21d. The background fill video signal B and the preset fill video signal C are first supplied to a first ME unit. The ME unit produces the mixed B and C signals. This is then supplied to an external video processing apparatus such as a DSE which compresses the image. The compressed image is then supplied as the fill 1 return signal to be keyed in to a location determined by the key 1 return signal. The fill 1 return signal and the key 1 return signal are supplied to a second ME unit. The second ME unit receives the background video signal A and keys the key 1 return signal and fill 1 return signal in the appropriate location to produce the video signal whose image is shown schematically in FIG. 21c.

Alternatively, with the system 10 having the capability of operating in a second mode of operation, the resources required to accomplish the generation of the video signal having the schematic image shown in FIG. 21 is much less. Referring to FIG. 21e, there is shown the video signals B and C being supplied to a mixer 40 as the background preset inputs thereof. The output of the mixer unit 40 is a signal which is sent along the auxiliary port to an external video processing device 330. The output of the DSE device is then supplied back to a keyer unit 50 along the key 1 return signal and the fill 1 return signal. The program video signal A is supplied to the ME unit along the fill 1 input thereof which is supplied as the background video signal to the keyer unit 50. The output of the keyer unit 50 is the video signal whose image is schematically depicted in FIG. 21c.

Therefore, as can be seen from the foregoing, the ME unit provides a second mode of operation which more efficiently utilizes the resources of the ME unit for processing of certain video signals.

IX. Color Mixing

The system 10 can receive a video signal having a first color component and can add to it by a second color component in selected areas.

Figure 29B:
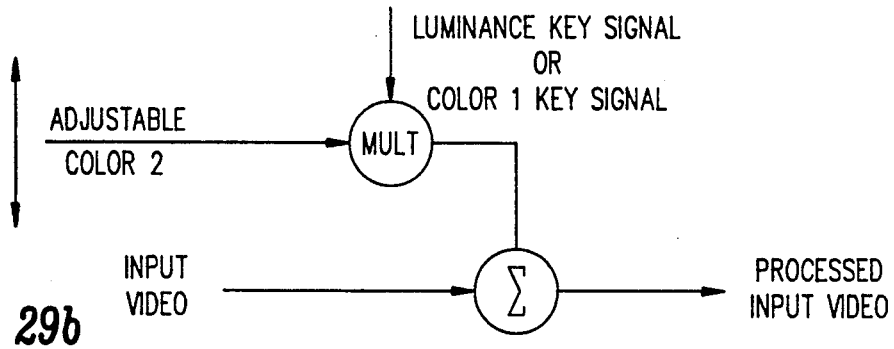
FIG. 29(b) is a block level diagram of a circuit operating upon a first color component signal by a second color component signal.

The system 10 receives a user activated input signal representative of the first color component of the chroma signal to which the color portion of the video signal is to be added. This is supplied as the first color component signal which is the output of the phase control circuit, shown in FIG. 29(a). The first color component signal is a luminance video signal whose magnitude corresponds to the magnitude of the first color component of the video signal, chosen by the user. The first color component signal is supplied to the color mixing circuit shown in FIG. 29(b), and is used as a key signal marking the selected areas of the incoming video signal to which the second color component signal is to be added.

The first color component signal is supplied to a multiplier. The second color component signal which is to be added to the first color component signal in selected areas is also entered by the user. The choice of the second color component is adjustable by the user. The system 10 generates a second color component signal in response to the user selected input. The second color component signal is also supplied to the multiplier.

The multiplier multiplies the first color component signal and the second color component signal, with the output supplied to an adder. The incoming video signal is also supplied to the adder and is added to the signal from the multiplier. The output of the adder is the processed input video signal, whose first color component in selected areas has been added by the second color component signal, which is chosen by the user.

X. Matrix Cross Point Routing

Figure 22:
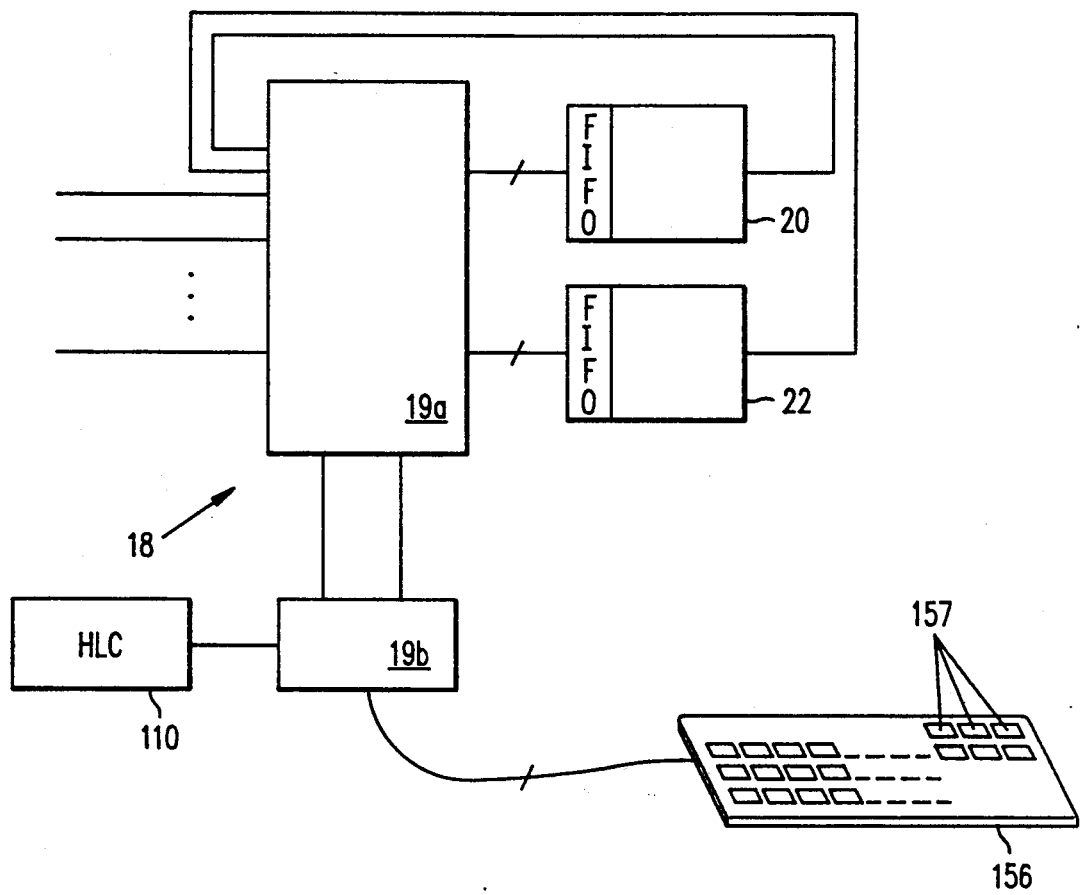
FIG. 22 is a block level diagram of the matrix switch of the present system operating with dynamically reassignable keys.

Referring to FIG. 22, there is shown in greater detail, the matrix switcher 18. The matrix switcher 18 comprises a first switch 19a and a selection circuit 19b. The first switch 19a receives a plurality of input video signals. From the first switch 19a, the video signals are supplied to a plurality of ME units 20 and 22 each of which generates a processed video signal. The processed video signals are supplied as input video signals back to the first switch 19a. Thus the first switch 19a has as its inputs a plurality of input video signals which can be externally supplied or internally generated. The first switch 19a connects the appropriate video signal supplied as input thereof to the video signal output along one of its 32 outputs.

The matrix switch 18 also comprises a selection circuit 19b. The selection circuit 19b generates a plurality of first switch signals which are supplied to the first switch 19a. The plurality of first switch signals causes the activation of the connection of certain of the plurality of input video signals to certain of the plurality of output video signals in the first matrix switch 19a.

The selection circuit 19b also receives a plurality of second switch signals. The second switch signals are generated by a plurality of user activatable switches or buttons on the keyboard 156. The selection circuit 19b maps each of the second switch signals with a first switch signal. Thus, the activation of a particular button or switch from the keyboard 156 causes the generation of a particular second switch signal, which is received by the selection circuit 19b, which causes a particular first switch signal to be generated, which causes the first switch 19a to connect certain input video signal to certain output video signal.

The generation of a particular first switch signal in response to a second switch signal by the selection circuit 19b is dynamically re-assignable. This is done by the HLC computer 110. In this manner, the assignment of the switching capabilities of each of the button on the panel 156 to connect certain of the input video signals to certain of the output video signals, can be changed, dynamically and in real time.

In the preferred embodiment, the selection circuit 19b is a part of the software executing in the HLC processor 110. Another part of the selection circuit 19b is in the software executed by the processor 360 in the system controller 26. Since each button 156 generates a fixed, unique second switch signal, the second switch signal is supplied to the system controller 26, which generates the corresponding first switch signal which is supplied to the first switch 19a. The HCL processor 110 interfaces with the user and receives the user instruction for reassignment of certain of the buttons 156 to certain first switch signals. The HCL 110 communicates this reassignment with the system controller 26.

XI. Trackball Control of Peripheral Devices

As previously discussed, the trackball 154 is a user activatable input device for controlling input signals to the system 10. The trackball can control the mixing of the plurality of video signals supplied to the system 10. In addition, the I/0 processor 120, through the first port 117a, communicates the system 10 with an external video processing apparatus 330. Thus, the external video processing apparatus 330 can be controlled by the trackball 154 through the first port 117a. The assignment of the trackball 154 to dynamically control a device external to the system 10 is accomplished by this I/0 processor 120 and its accompanying software.

In addition, as previously discussed, the video signal from the external video processing apparatus, can be supplied back to the system 10 along one of the video inputs thereof. One of the signals which is supplied to the system 10 can be a video signal representative of a plurality of images. The images can be displayed on a display means. In addition, a graphical representation of the duration of the display is also displayed on the display panel 180. The images, displayed on the display means, can be controlled through the timeline display on the display 180 as previously discussed (See section VI).

XII. Soft Cross Point Assignment

As previously described, the user activatable buttons on the keyboard 156 can be used to select the connection of certain of the input video signals to certain of the output video signals. The assignment of the particular buttons to activate the particular connection from an input video signal to an output video signal is dynamically assignable and is under the control of the HLC processor 110. In the preferred embodiment, twenty button are provided for each of the ME unit and DSK unit.

Although the twenty user activatable buttons for each ME unit are dynamically assignable, as a practical matter, once a button has been assigned to activate the video connection from certain input video signal to a certain output video signal, it should not be changed for the operation's convenience. This is because once a button has been assigned, some type of marker or indicium, typically of a permanent nature is placed on the user activatable button to indicate the connection of the certain video signal to certain of the output video signal.

Nevertheless, in anticipation that certain user activatable buttons may need to be reassigned and therefore the label thereof needs also to be dynamically changed, within each row of twenty user activatable buttons are seven buttons having a display 157 associated with each button. The display 157 serves to display the alphanumeric text indicating the function of the assignment of the button to which the display 157 is associated. In this manner, if the button 156 were reassigned to activate certain of the input video signals to connect with certain of other output video signals, the connection can be displayed on the associated display 157.

In addition, since the system 10 can be used to communicate with a video processing apparatus external to the system 10 through the first port 117a, and further, in the event the external video processing apparatus has the requisite port for transmitting data representing alphanumeric text information, the system 10 can display the received alphanumeric text on the associate display means 180, immediately adjacent to the associated buttons 156. The associated user activatable button 156 can then be used to connect certain of the video signals from the external video processing apparatus 330.

XIII. Graphical Display of Chroma Key Parameters

As previously described, one of the functions of the system 10 is the replacement of a first color component in a video signal by a second color component. To that extent, the system 10 first receives a signal representative of the first color component signal within the incoming video signal which is to be replaced.

Figure 23:
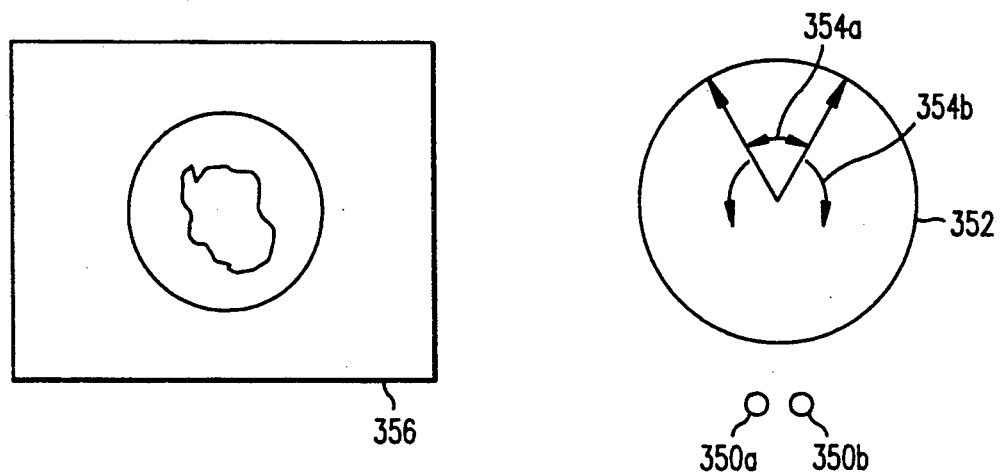
FIG. 23 is a schematic diagram of a graphical display displaying the vectorial components of a user selected color component signal, and the display of the video signal operated upon by the user selected color component signal.

Referring to FIG. 23 there is shown schematically the apparatus to accomplish the foregoing. The user, by varying a plurality of shaft encoders 350, enters the range of the color component in the incoming video signal which is to be replaced. The user first selects a first encoder 350a which sets the angle of separation of the color limits. When the user enters the input on the first encoder 350a, the angle of separation of the color limits is graphically displayed on a vectorscope 352, with the angle of separation shown as 354a. Variation of a second encoder 350b varies the entire angle separation and serves to adjust the color selection. This is shown as 354b.

At the same time, the incoming video signal whose color vector lies within the range selected by the user between the color limits 354a and 354b is then filtered and is displayed on a display 356. Thus, that portion of the incoming video signal having the color component lying between the color limits defined by the limits 354a and 354b is displayed on the display 356. The displayed signal is a key signal. All other color components outside of the range selected by the user are not selected.

As previously described, although the color component signal is filtered, the magnitude of the color component signal is not changed. Thus, the signal which is displayed on the display 356 is a luminance video signal representing the magnitude of the color component lying within the limits described by 354a and 354b.

In addition, as can be appreciated, as the user adjusts the selected color component by changing the limits 354a and 354b, the adjustment of the color limits 354a and 354b automatically result in changes to the video signal displayed on the display 356. Therefore, a convenient graphical manner of displaying the selected color component both vectorially, as well as pictorially is demonstrated. The user can change the selection by varying the encoders 350a and 350b and viewing the changed vectorial color representation as well as the pictorial effect on the input video signal.

XIV. Input FIFO Timing

As previously described, each of the ME units 20 and 22 and DSK unit 24 has an associated variable depth FIFO unit 30, 32 and 34 associated therewith. A particularly useful function for the FIFOs 30, 32, and 34 is for adjustment of the timings of the video signals so that, for example, the signals supplied to each ME unit or DSK unit are synchronous in time. As is well known in the video art, each video signal comprises a plurality of contiguous field signals with each field having a beginning and an end with a vertical sync pulse at the beginning thereof. By synchronization, it is meant that the signals arriving at each ME unit or DSK unit have the vertical sync pulse arriving at the same time.

Figure 24:
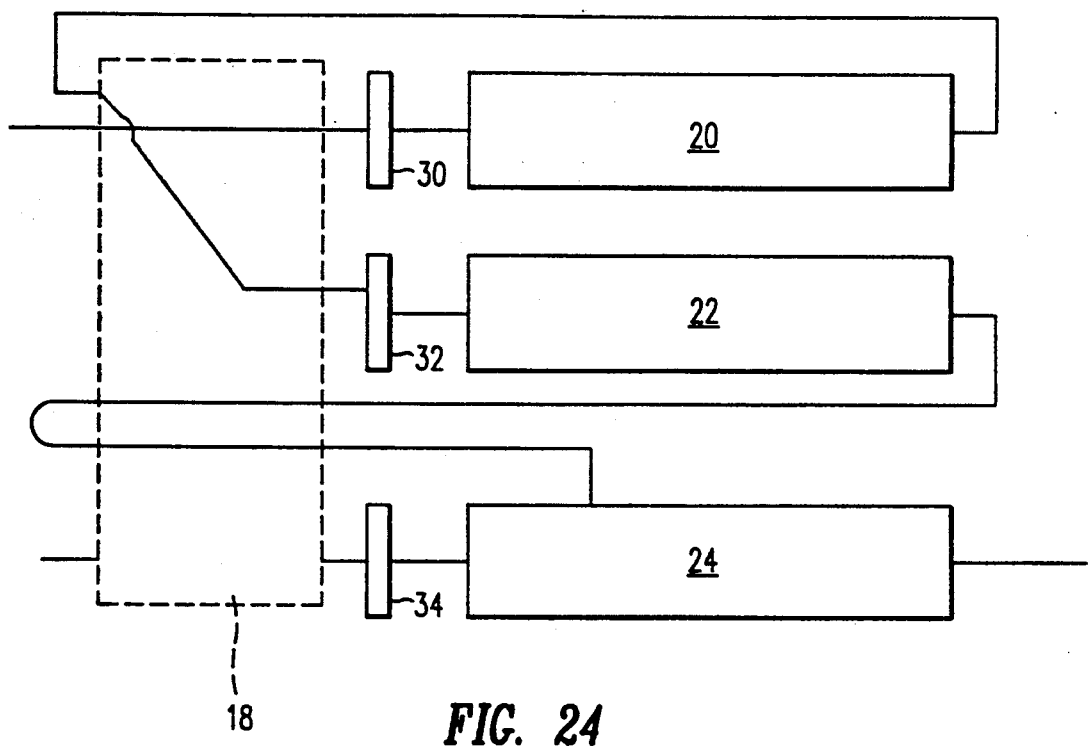
FIG. 24 is a schematic block level diagram of the use of the FIFOs of the present system to synchronize the video signals supplied to a DSK unit.

Referring to FIG. 24, there is shown graphically one example of the use of the input FIFOs 30, 32 and 34 to adjust for the delays in the promulgation of video signals through the system 10. For example, a first video signal can be supplied to the first FIFO 30, and then to the first ME unit 20. The output of the ME unit 20 is rerouted back to the matrix 18 and is supplied to the second FIFO unit 32 which adjusts the delay of the video signal supplied thereto. From the second FIFO unit 32, the signal is supplied to the second ME unit 22. The output of the second ME unit 22 is again routed through the matrix switch 18 and is supplied to the DSK unit 24. A second video signal external to the system 10, is supplied through the matrix 18, through the third FIFO 34 and to the DSK unit 24.

By varying the amount of depth of each of the FIFOs 30, 32 and 34 through which the video signal must pass, the timing of the two video signals supplied to the DSK unit 24 can be adjusted, to account for their respective delays.

XV. Linear Control of Non-Linear Transitions

Figure 25A:
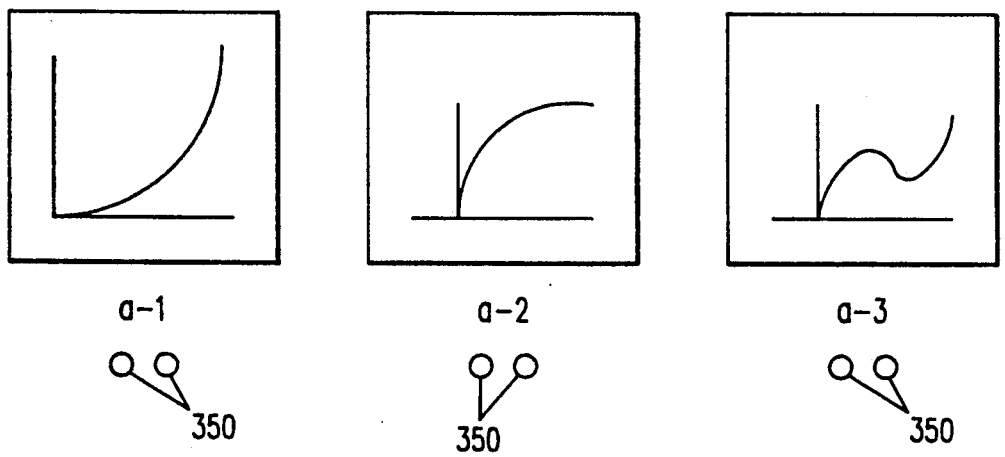
FIGS. 25a(1-3) are displays of non-linear transitions selected by a user.
Figure 25B:
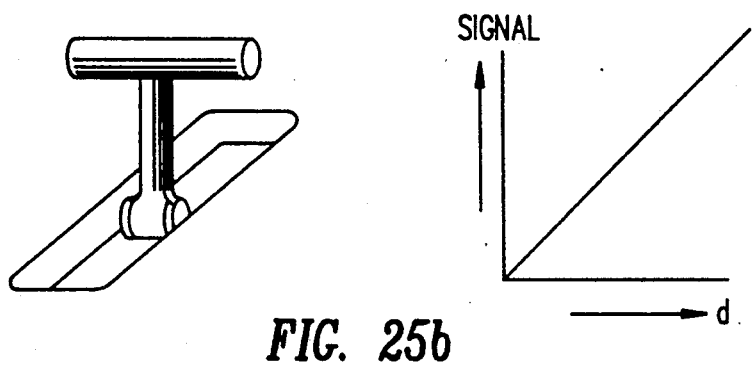
FIG. 25(b) is a graphical display of a T-bar with its linear output signal.
Figures 4, 27A:
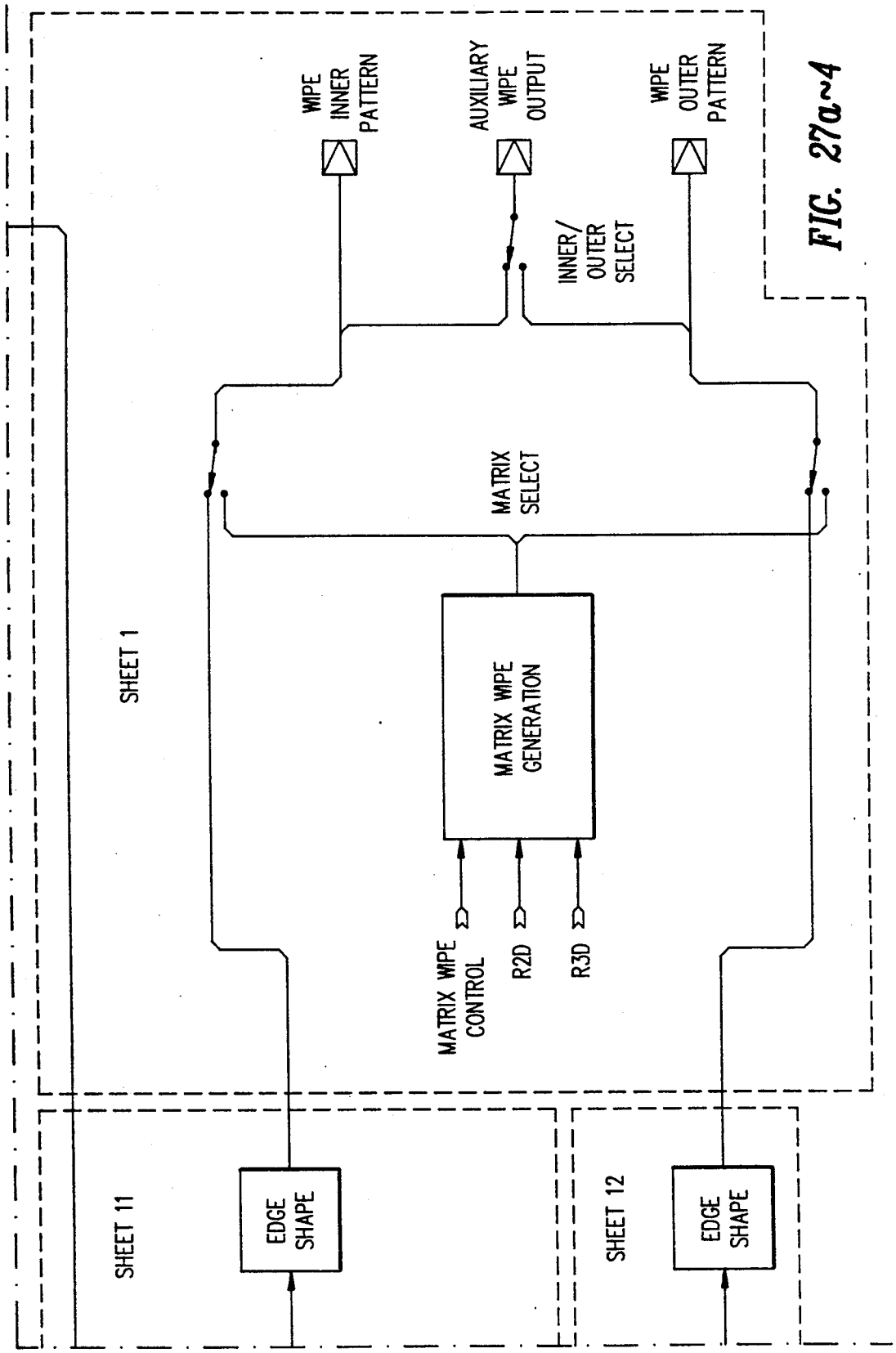
Figures 1, 27B:
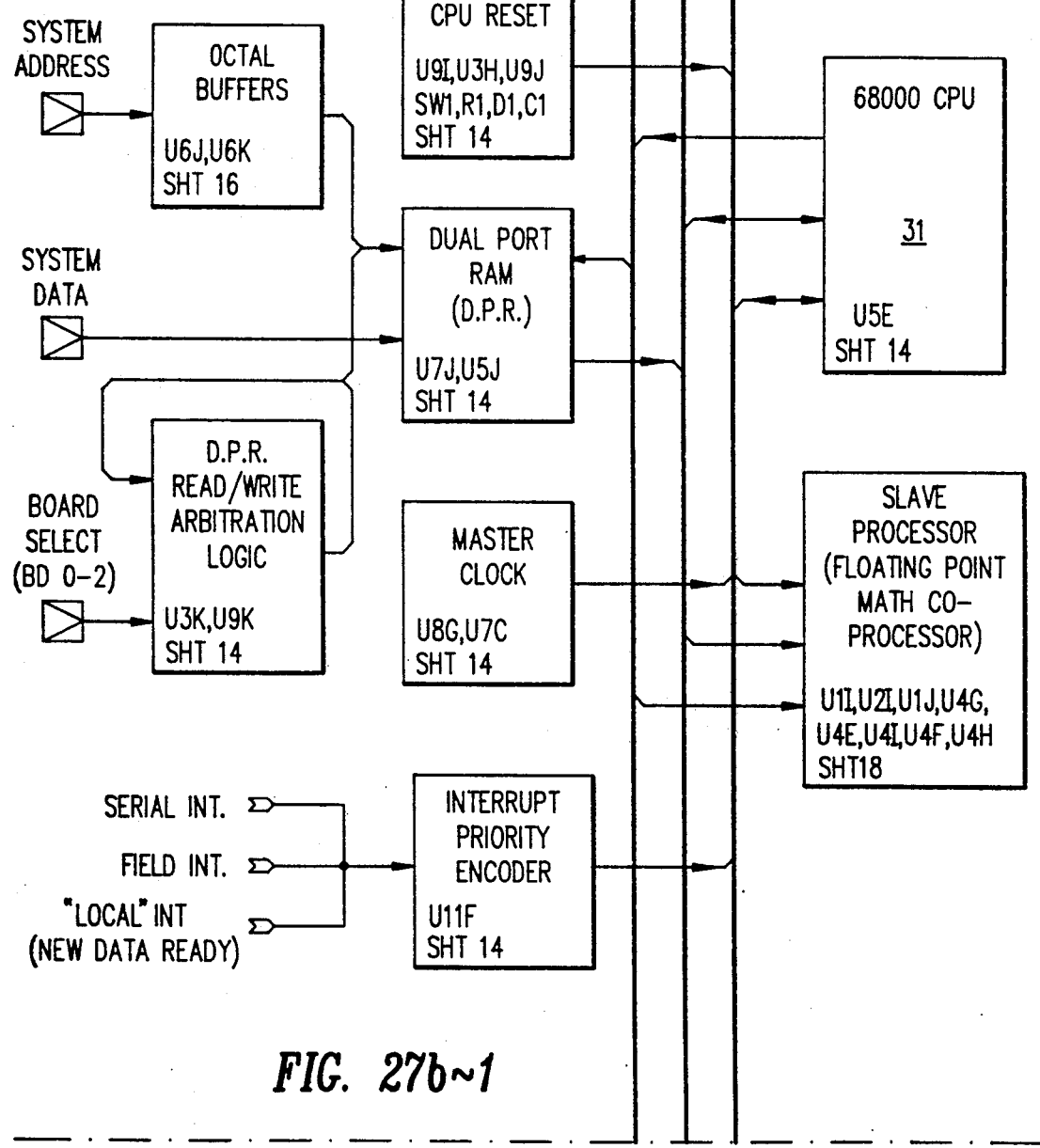
Figures 4, 27B:
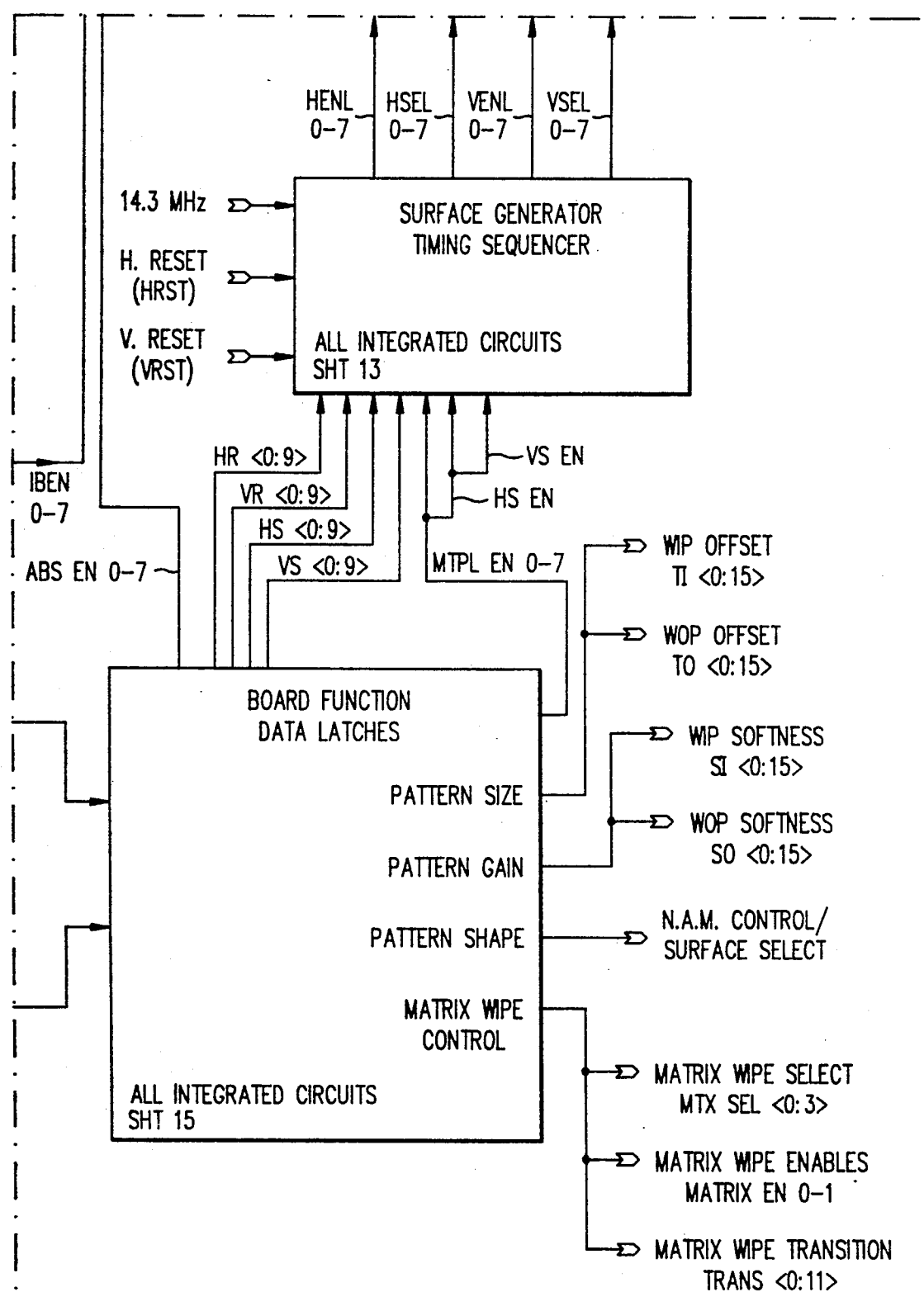
Figure 27E:
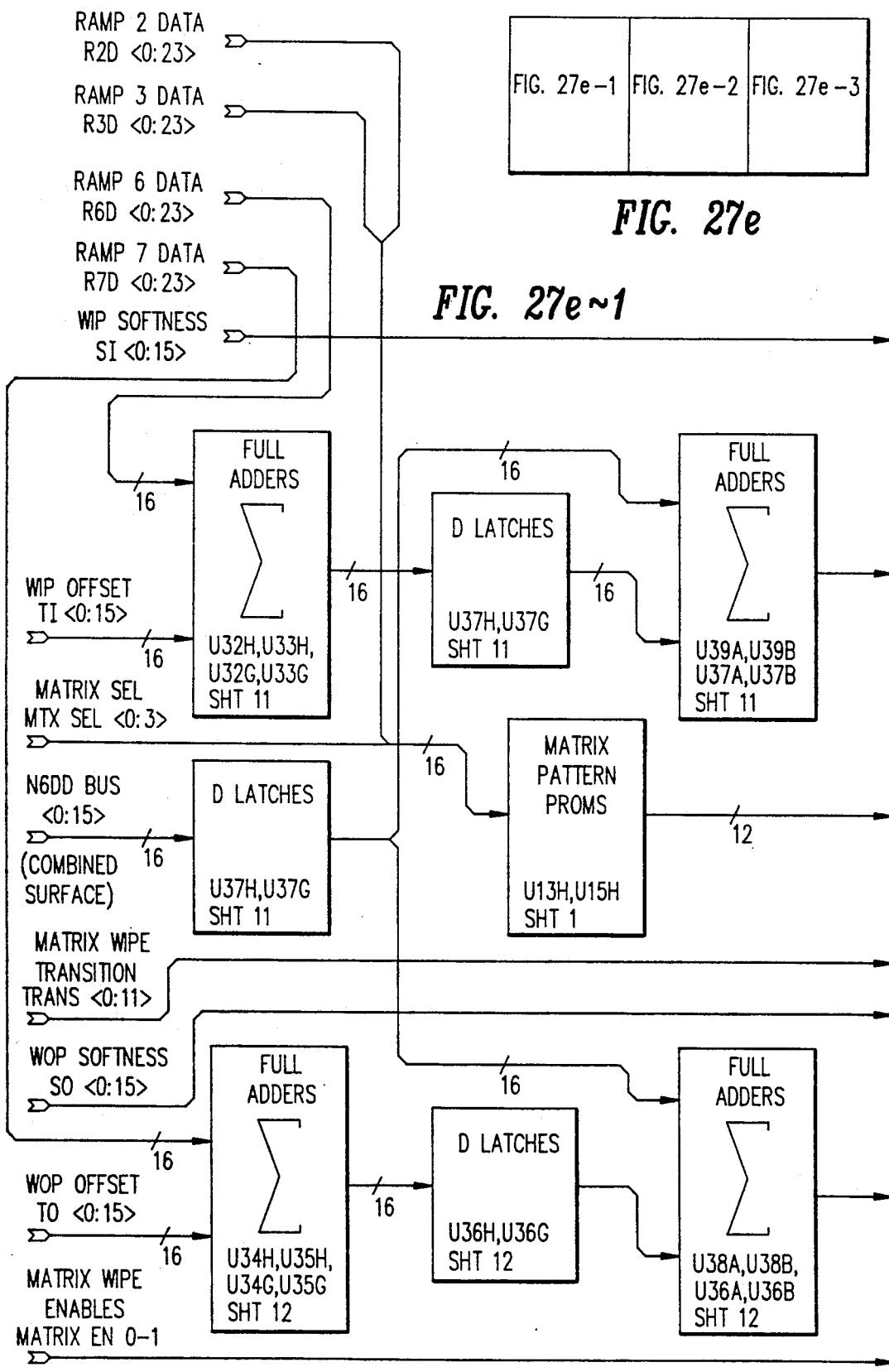
Figures 3, 27E:
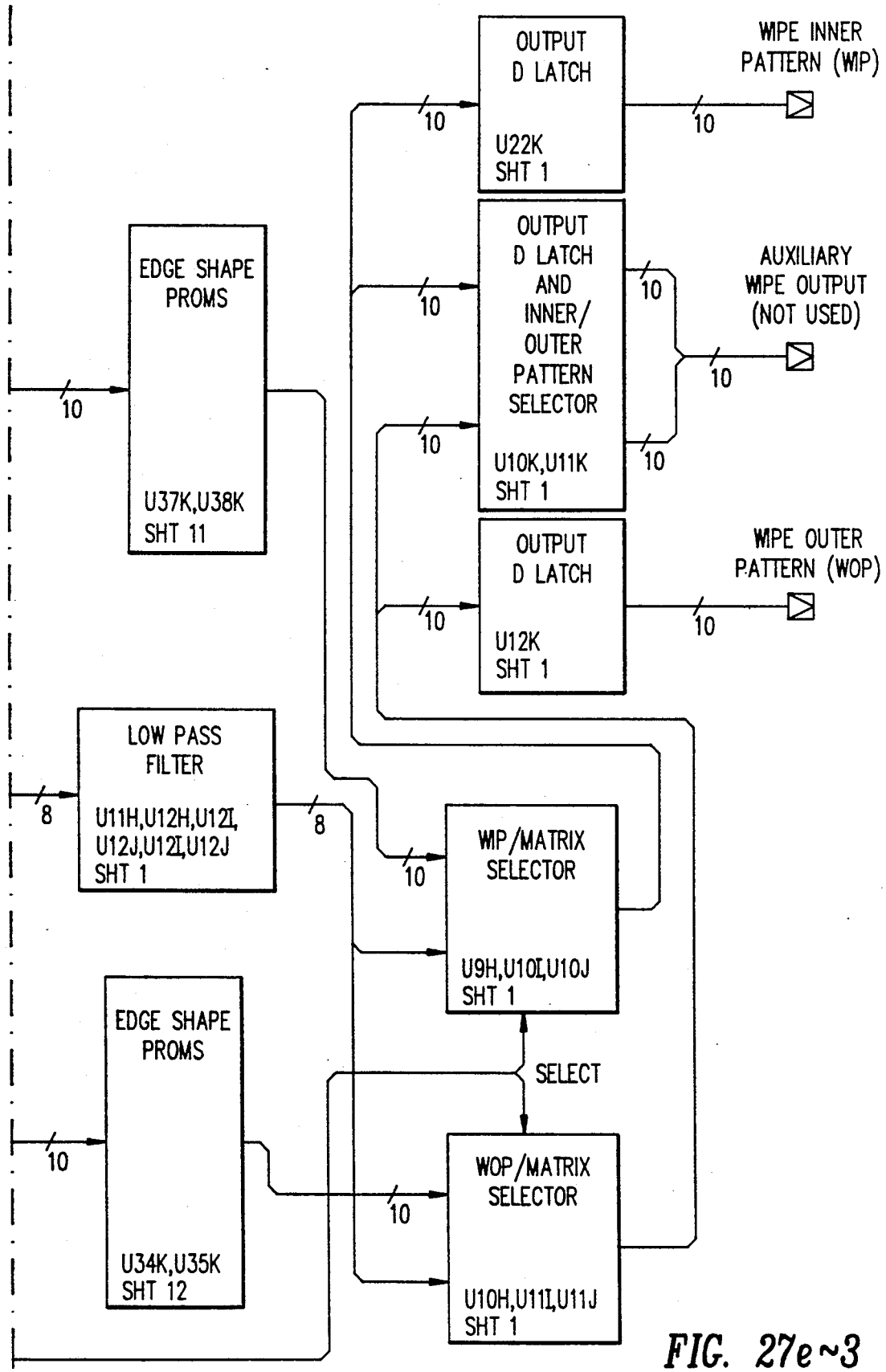

In video processing, it is well known to use a T-bar as a user input device. A T-bar 142 is shown as a part of the system 10. The T-bar 142, however, is a linear device in that the motion of the T-bar progresses from one end to another end in a linear fashion to produce a corresponding linear signal. Referring to FIG. 25b there is shown the motion of a T-bar as a function of distance d travelled by the T-bar and the signal generated therefrom.

With the system 10, the user can also display a plurality of different types of transitions on the display 180. A transition is a change from one source of video signal to another source. The user first selects one of a plurality of pre-stored shapes of non-linear transitions. The pre-stored shapes can include shapes such as a parabola, an exponential or even a spline.

Thereafter, the user, through the encoders 350, can graphically alter the displayed non-linear spline transition. FIGS. 25a-1 through 25a-3 are representative images of non-linear transitions which can be manipulated by the user using the encoders 350 as inputs thereof.

With the user having defined the non-linear transition desired, the HLC processor 110 through its accompanying software, can map the motion of the T-bar 142 to the transition graphically displayed on the display 180. In other words, the HLC processor 110 receives the linear signal generated by the T-bar 142 but converts the linear signal into a non-linear signal, which is graphically represented on the display 180 thereby rendering the effect of a linearly movable switch device, a T-bar 142, having the capability of generating a non-linear signal. The resultant transition signal is used by the mixer 40 to mix the two video signals supplied thereto, to provide the transition.

In addition to generating a linear transition signal from an input device, such as a T-bar 142, the user can also activate a button 156 which in turn generates a linear signal without further user input. The system 10 can receive the linear signal generated by, for example, the button 156, and map the linear signal to the non-linear signal on the display 180. The non-linear signal is then used to provide the transition.

XVI. Synchronous Communication

As previously stated, one of the system chassis 16 acts as a master chassis 16. The master chassis 16 generates a "start of field" pulse upon the detection of a vertical sync from a video signal, to be generated and transmitted across the communication bus 12. The circuit to accomplish the generation of the "start of field" pulse in response to the detection of a vertical sync is shown in FIG. 26a.

Within each system chassis 16, other than the master chassis 16, and each control panel 14, is a programmable timer which uses the "start of field" pulse and receives a timing signal from the clock. The programmable timer begins counting when the "start of field" pulse is received and is incremented by the pulses from the clock. A circuit to accomplish the foregoing is set forth in FIG. 26b. When the counter reaches a predetermined time period which is equal to its associated a priori determined time period the associated control panel or the system chassis 16 is then permitted to communicate with the bus 12.

XVII. Burst Phase Detection and Automatic Phasing

In the preferred embodiment, the system 10 accepts two NTSC composite video signals and converts each to a 10-bit digital data stream at a rate of 4 times subcarrier frequency, all in accordance with the well known D2 specification. Clamp pulses and clocks are derived via an externally supplied D2 reference signal. The digital output stream is timed to this reference. The input signal is clamped to black automatically. Digitally generated syncs and bursts are inserted into the video blanking period.

Figures 28, 28A:
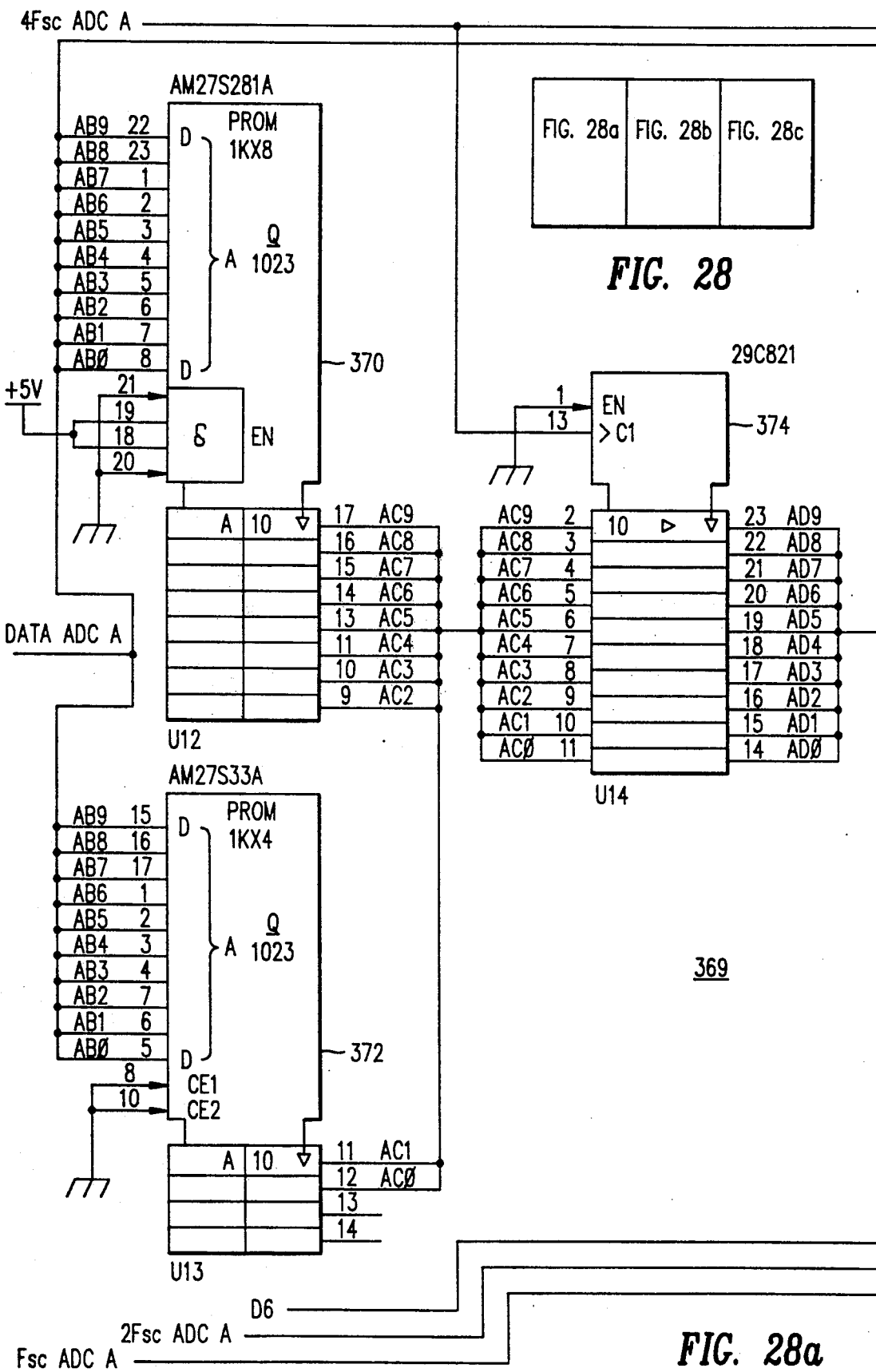
FIGS. 28A-28C are a circuit diagrams of a burst phase detector having automatic phase control.
Figure 28B:
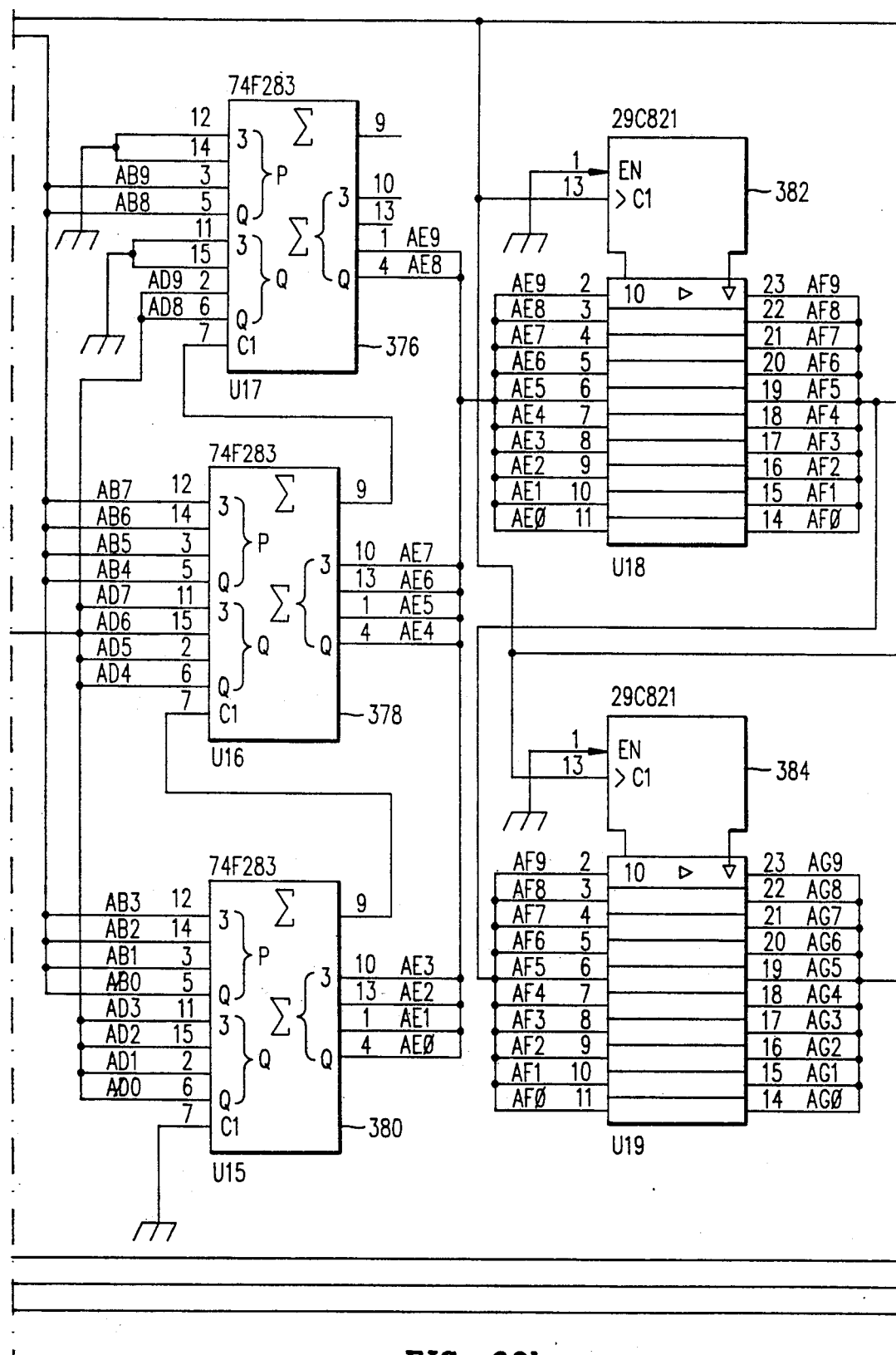
Figure 28C:
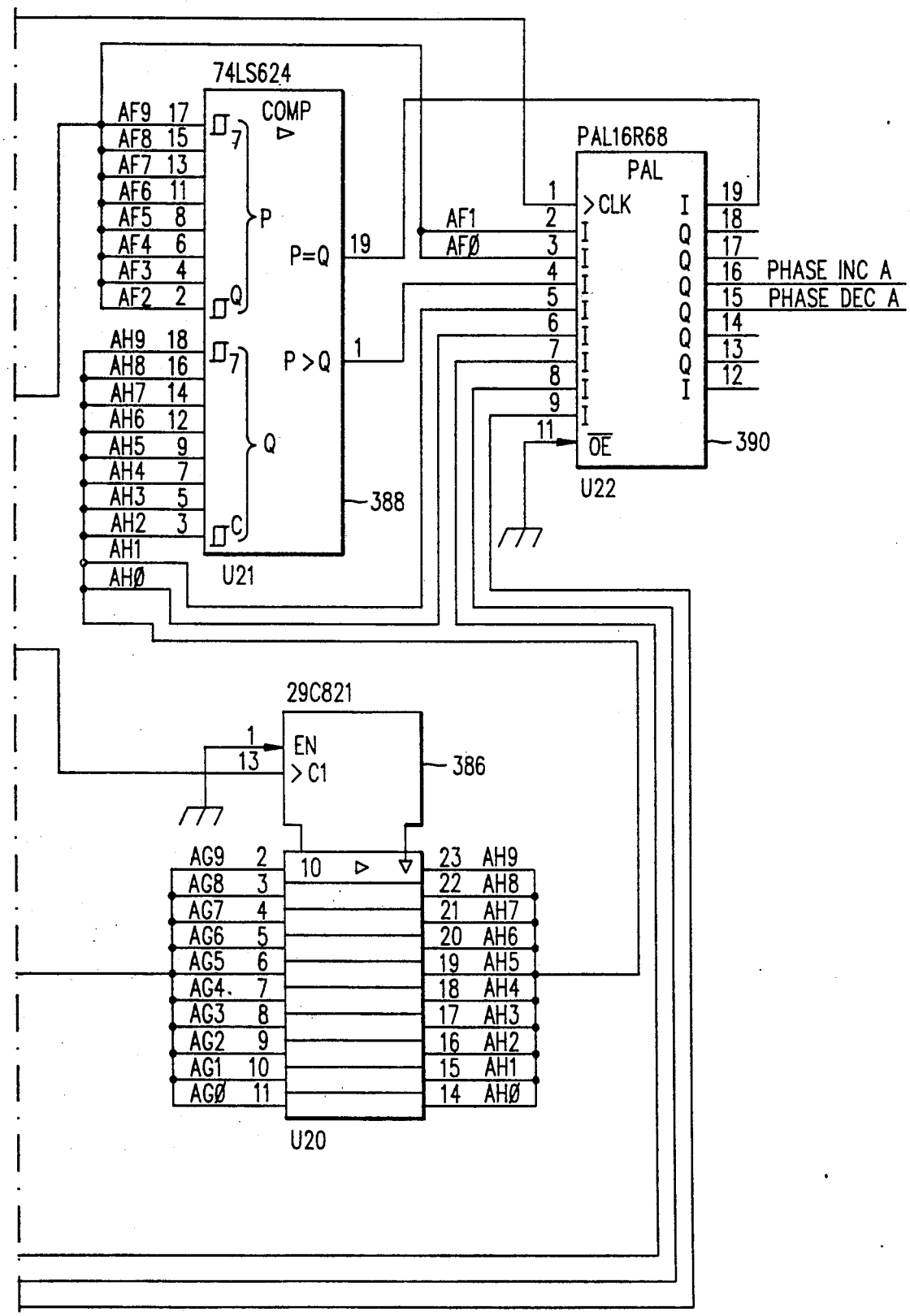

Under the D2 specification, a signal is required to be sampled in a certain phase relationship with respect to the burst. Referring to FIG. 28, there is shown a circuit 369, located in the system chassis 16, which monitors the incoming burst, and automatically adjusts the phase of the sampling clock to conform to the D2 specification. This permits timing latitude between the signal input and the reference signal.

The D2 specification requires that the incoming video signal must be sampled with a clock at 33° with respect to the burst phase. The digital output during the burst consists of a repeating sequence of four values (because the burst repeats every four cycles). Detecting phase errors in the burst is difficult, when it is sampled like this, since all four values are amplitude dependent.

In the circuit 369, the circuit comprises PROMS 370 and 372, a FIFO 374, adders 376, 378 and 380 and a latch 382. Together, the circuit 369 alters the phase of the incoming signal by 33°. Thus, the burst would be sampled at 0°. Every other value is at or around the burst zero crossing point. Thus, comparing values of these "zero" values yields phase information that is independent of signal amplitude.

A single clock delay represents a 90° or quadrature shift of subcarrier information of the signal. By adding an appropriately scaled version of this signal with the undelayed signal, the phase of the signal may be altered by 33°. PROMS 370 and 372 contain constants which scale the incoming signal. FIFO 374 delays the signal by one clock cycle (or 90°). Adders 376, 378 and 380 add the two signals, i.e. the altered delay signal and the original signal, together. Latch 382 latches the output of the adders 376, 378 and 380.

At the output of the latch 382, when the ADC clock is at the right phase, alternate values of the burst will be equal to the black level and will be of "zero burst amplitude". FIFOs 384 and 386 further delay the signal by two additional clock cycles. Comparator 388 compares the top 8 bits of the same signal but two clocks in time apart. This compares the "zero" pairs. The result of the comparator 388 is supplied as input to a logic circuit 390, along with the bottom two bits of each signal. The logic circuit 390 takes the bottom two bits along with the output of the comparator 388 and internally generates a 10 bit comparison result. The comparison error feeds a charge pump circuit (not shown) which steers the ADC clock phase. This whole sequence forms a feedback loop maintaining the clock phase at 33°.

The logic circuit 390 is only active during burst and is fed with a burst gate signal to commence operation. In addition, it is supplied with a group of four successive outputs of the comparator 388 of a valid result.

Thus, as can be seen, the burst phase is detected at a "zero" crossing and is automatically controlled.

What is claimed is:

1. A digital video processing system for processing a first and a second digital video signal, said system comprising:
    means for generating a linear input signal; representative of a profile of a linear transition from said first digital video signal to said second digital video signal;
    means for receiving said linear input signal and for generating a non-linear signal, representative of a profile of a non-linear transition from said first digital video signal to said second digital video signal;
    displaying means for displaying said non-linear signal; and
    means for processing said first and second digital video signals in accordance with said non-linear signal to effectuate said non-linear transition, in response to said linear input signal generating means.

2. The digital video processing system of claim 1 wherein said means for generating said linear input signal comprises:
    a user activatable linearly movable means for generating said linear input signal.

3. The digital video processing system of claim 1 wherein said means for generating said linear input signal comprises:
    a user activatable switch means for generating said linear input signal.

4. The digital video processing system of claim 1 further comprising:
    user activatable control means for adjusting said non-linear signal.

* * * * *